(12) United States Patent
Roach et al.

(10) Patent No.: US 11,726,058 B2
(45) Date of Patent: Aug. 15, 2023

(54) SYSTEMS AND METHODS FOR CAPILLARY ELECTROPHORESIS, ISOELECTRIC POINT, AND MOLECULAR WEIGHT ANALYSIS

(71) Applicant: ProteinSimple, San Jose, CA (US)

(72) Inventors: David J. Roach, Los Gatos, CA (US); Tom Weisan Yang, Cupertino, CA (US); Hui Xu, Palo Alto, CA (US)

(73) Assignee: ProteinSimple, San Jose, CA (US)

( * ) Notice: Subject to any disclaimer, the term of this patent is extended or adjusted under 35 U.S.C. 154(b) by 238 days.

(21) Appl. No.: 17/063,123

(22) Filed: Oct. 5, 2020

(65) Prior Publication Data
US 2021/0231607 A1 Jul. 29, 2021

Related U.S. Application Data

(63) Continuation of application No. 16/033,808, filed on Jul. 12, 2018, now Pat. No. 10,794,860, which is a
(Continued)

(51) Int. Cl.
*G01N 27/453* (2006.01)
*G01N 27/447* (2006.01)
(Continued)

(52) U.S. Cl.
CPC ..... *G01N 27/44791* (2013.01); *G01N 27/447* (2013.01); *G01N 27/44704* (2013.01);
(Continued)

(58) Field of Classification Search
CPC ....... G01N 27/44721; G01N 27/44795; G01N 30/74
See application file for complete search history.

(56) References Cited

U.S. PATENT DOCUMENTS 5,180,475 A 1/1993 Young et al.
5,274,240 A 12/1993 Mathies et al.
(Continued)

FOREIGN PATENT DOCUMENTS

CN 104902817 A 9/2015
EP 0329779 A2 * 11/1989 ............. G01N 27/26
(Continued)

OTHER PUBLICATIONS

Extended European Search Report for European Application No. 17739061.4, dated Jul. 31, 2019, 8 pages.
(Continued)

*Primary Examiner* — Alexander S Noguerola
(74) *Attorney, Agent, or Firm* — Cooley LLP

(57) ABSTRACT

A system includes a housing, a cartridge retainer disposed within the housing, a detection assembly disposed within the housing, and a reagent tray holder movably disposed in the housing. The cartridge retainer configured to receive a capillary cartridge having a capillary. The detection assembly includes at least one emitter, a first detector, and a second detector. The detection assembly is configured to transition between a first configuration, in which the first detector detects a first output of the at least one emitter, and a second configuration, in which the second detector detects a second output of the at least one emitter. The reagent tray holder is configured to move relative to the cartridge retainer to place the capillary of the capillary cartridge in fluid communication with a reagent volume.

21 Claims, 41 Drawing Sheets

Related U.S. Application Data continuation of application No. PCT/US2017/013470, filed on Jan. 13, 2017.

(60) Provisional application No. 62/278,159, filed on Jan. 13, 2016.

(51) Int. Cl.
*G01N 21/05* (2006.01)
*G01N 30/74* (2006.01)

(52) U.S. Cl.
CPC . *G01N 27/44743* (2013.01); *G01N 27/44747* (2013.01); *G01N 21/05* (2013.01); *G01N 27/44721* (2013.01); *G01N 27/44726* (2013.01); *G01N 27/44795* (2013.01); *G01N 30/74* (2013.01)

(56) References Cited

U.S. PATENT DOCUMENTS

| | | | |
|---|---|---|---|
| 5,338,427 A | | 8/1994 | Shartle et al. |
| 5,384,024 A | | 1/1995 | Moring et al. |
| 5,395,502 A | * | 3/1995 | Pawliszyn ........ G01N 27/44721 204/603 |
| 6,083,372 A | | 7/2000 | Grover et al. |
| 6,087,188 A | | 7/2000 | Johansen et al. |
| 6,093,300 A | | 7/2000 | Hayashizaki et al. |
| 6,126,870 A | | 10/2000 | Akhavan-Tafti |
| 6,165,800 A | | 12/2000 | Jiang et al. |
| 6,287,767 B1 | | 9/2001 | Bronstein et al. |
| 6,395,503 B1 | | 5/2002 | Suzuki et al. |
| 6,689,576 B2 | | 2/2004 | Matsuno et al. |
| 7,336,355 B2 | | 2/2008 | Ishibashi et al. |
| 7,935,308 B2 | | 5/2011 | O'Neill et al. |
| 8,778,155 B2 | | 7/2014 | Tsai et al. |
| 10,794,860 B2 | | 10/2020 | Roach et al. |
| 2002/0123073 A1 | | 9/2002 | Amirkhanian et al. |
| 2003/0116436 A1 | | 6/2003 | Amirkhanian et al. |
| 2006/0127275 A1 | | 6/2006 | Holl et al. |
| 2007/0131870 A1 | | 6/2007 | Pang et al. |
| 2010/0140505 A1 | | 6/2010 | Pang et al. |
| 2011/0011740 A1 | | 1/2011 | Roach et al. |
| 2012/0274760 A1 | | 11/2012 | King et al. |
| 2013/0001084 A1 | | 1/2013 | Dolnik |
| 2015/0090591 A1 | | 4/2015 | Yang et al. |
| 2015/0258548 A1 | | 9/2015 | Bird et al. |
| 2015/0346151 A1 | | 12/2015 | Boeke et al. |
| 2016/0077053 A1 | | 3/2016 | Onuma |
| 2018/0202968 A1 | | 7/2018 | Singer et al. |
| 2018/0321189 A1 | | 11/2018 | Roach et al. |

FOREIGN PATENT DOCUMENTS

| | | | | |
|---|---|---|---|---|
| JP | H10197480 A | | 7/1998 | |
| JP | 2000065796 A | | 3/2000 | |
| JP | 2010243498 A | | 10/2010 | |
| WO | WO 02059589 A2 | * | 8/2002 | ............. G01N 27/00 |
| WO | WO-02059589 A2 | | 8/2002 | |
| WO | WO 2012027175 A2 | * | 3/2012 | ........... G01N 27/447 |
| WO | WO-2013181352 A1 | | 12/2013 | |
| WO | WO-2015048458 A2 | | 4/2015 | |
| WO | WO 2015134945 A1 | * | 9/2015 | ........... G01N 27/447 |

OTHER PUBLICATIONS

First Office Action for Chinese Application No. 201780015587.5, dated May 22, 2020, 19 pages.
International Search Report and Written Opinion for International Application No. PCT/US2017/013470, dated Jun. 9, 2017, 14 pages.
Notice of Reasons for Rejection for Japanese Application No. 2018-536474, dated Aug. 25, 2021, 7 pages.
Notice of Reasons for Rejection for Japanese Application No. 2018-536474, dated Nov. 30, 2020, 11 pages.
Office Action for U.S. Appl. No. 16/033,808, dated Feb. 14, 2020, 38 pages.
Second Office Action for Chinese Application No. 201780015587.5, dated Feb. 4, 2021, 7 pages.
Takara, EDTA Buffer Powder (2021), 1 page.
Zhang, J. et al., "Method development and validation of capillary sodium dodecyl sulfate gel electrophoresis for the characterization of a monoclonal antibody," J. Pharm Biomed Anal. Dec. 2010. 15;53(5):1236-1243.

* cited by examiner

SYSTEMS AND METHODS FOR CAPILLARY ELECTROPHORESIS, ISOELECTRIC POINT, AND MOLECULAR WEIGHT ANALYSIS

CROSS REFERENCE TO RELATED APPLICATIONS

This application is a continuation of U.S. patent application Ser. No. 16/033,808, filed Jul. 12, 2018, now U.S. Pat. No. 10,794,860, which is a continuation of international application no. PCT/US2017/013470, filed Jan. 13, 2017, which claims the benefit of provisional U.S. Patent Application No. 62/278,159, filed on Jan. 13, 2016, the disclosure of each of which is hereby incorporated by reference in its entirety.

BACKGROUND

The embodiments described herein relate generally to systems and methods for electrophoretically separating and/or analyzing sample mixtures by molecular weight and/or isoelectric point. Some embodiments described herein relate to separation, detection, identification, classification, and/or quantification of an analyte or analytes present in a sample. More particularly, the embodiments described herein relate to systems and methods configured to perform capillary-based electrophoresis.

Electrophoresis has been used for separating mixtures of molecules based on their different rates of travel in electric fields. Generally, electrophoresis refers to the movement of suspended or dissolved molecules through a fluid or gel under the action of an electromotive force applied to one or more electrodes or electrically conductive members in contact with the fluid or gel. Some known modes of electrophoretic separation include separating molecules based, at least in part, on differences in their mobilities in a buffer solution (commonly referred to as zone electrophoresis), in a gel or polymer solution (commonly referred to as gel electrophoresis), or in a potential of hydrogen (pH) gradient (commonly referred to as isoelectric focusing). The movement of molecules during electrophoresis can be highly variable, making interpretation dependent upon a comparison to electrophoresis standards, whose behavior and identity have been previously characterized. Electrophoresis standards include, for example, molecular weight (MW) standards in sodium dodecyl sulfate polyacrylamide gel electrophoresis (SDS-PAGE) and deoxyribonucleic acid (DNA) size standards in agarose gels. In some instances, biomolecule separation can be carried out in a capillary tube by capillary electrophoresis. In some instances, a biomolecule (e.g., protein) can then be visualized by immobilizing the biomolecule to the wall of the capillary tube. Capillary electrophoresis and biomolecule visualization, however, can be difficult to perform consistently.

Biomolecule visualization can be performed using digital imaging. Such known analysis use an imaging device (e.g., a charge-coupled device, a photodiode, and/or the like) and a lens or microscope to capture an image of and/or otherwise detect a sample. In some instances, a light source is flashed at relatively high speed as the sample flows past the optics to illuminate and/or otherwise allow imaging of flowing biomolecules within a column (e.g., capillary). The captured images are filtered and/or segregated, for example, to create an image of a feature associated with biomolecules, such as labeled fluorescence, native fluorescence, and/or absorbance. The information can then be compared to known data to characterize and/or identify the biomolecules in the sample.

While some methods for performing electrophoresis analysis to determine information associated with an analyte, protein, molecule, or the like, such methods are typically performed in complex and expensive devices capable of performing a single analysis mode. Moreover, some known methods and systems involve extensive and/or time-consuming handling and processing steps that adversely affect reproducibility and make automation difficult.

Thus, a need exists for improved systems and methods configured to perform multiple types of analysis, such as electrophoretic mobility and/or isoelectric focusing, within a single device. It is also desirable to automate such techniques so that multiple samples may be analyzed simultaneously or in rapid succession with ease and robustness while consuming minimal volumes of expensive reagents and/or disposables.

SUMMARY

Systems and methods for capillary electrophoresis and analyte visualization and characterization are described herein. In one aspect, a system includes a housing, a cartridge retainer disposed within the housing, a detection assembly disposed within the housing, and a reagent tray holder movably disposed in the housing. The cartridge retainer is configured to receive a capillary cartridge having a capillary. The detection assembly includes at least one emitter, a first detector, and a second detector. The detection assembly is configured to transition between a first configuration, in which the first detector detects a first output of the at least one emitter, and a second configuration, in which the second detector detects a second output of the at least one emitter. The reagent tray holder is configured to move relative to the cartridge retainer to place the capillary of the capillary cartridge in fluid communication with a reagent volume.

In another aspect, an apparatus includes a cartridge body, a capillary disposed within the cartridge body, a conductive vial disposed within the cartridge body, a first electrode electrically coupled to the conductive vial, and a second electrode. The capillary defines an interior volume that is configured to contain a sample including an analyte. The capillary has a first end defining a first end of the interior volume and a second end defining a second end of the interior volume. The conductive vial contains a buffer and has a first septum and a second septum. The buffer is electrically coupled to the first end of the interior volume of the capillary via the first septum such that, when the interior volume contains the sample, the sample is electrically coupled to the vial. The second electrode is electrically coupled to a second end of the capillary such that the first electrode, the second electrode, and the sample define a portion of a circuit when the interior volume contains the sample.

DETAILED DESCRIPTION

Figure 1:
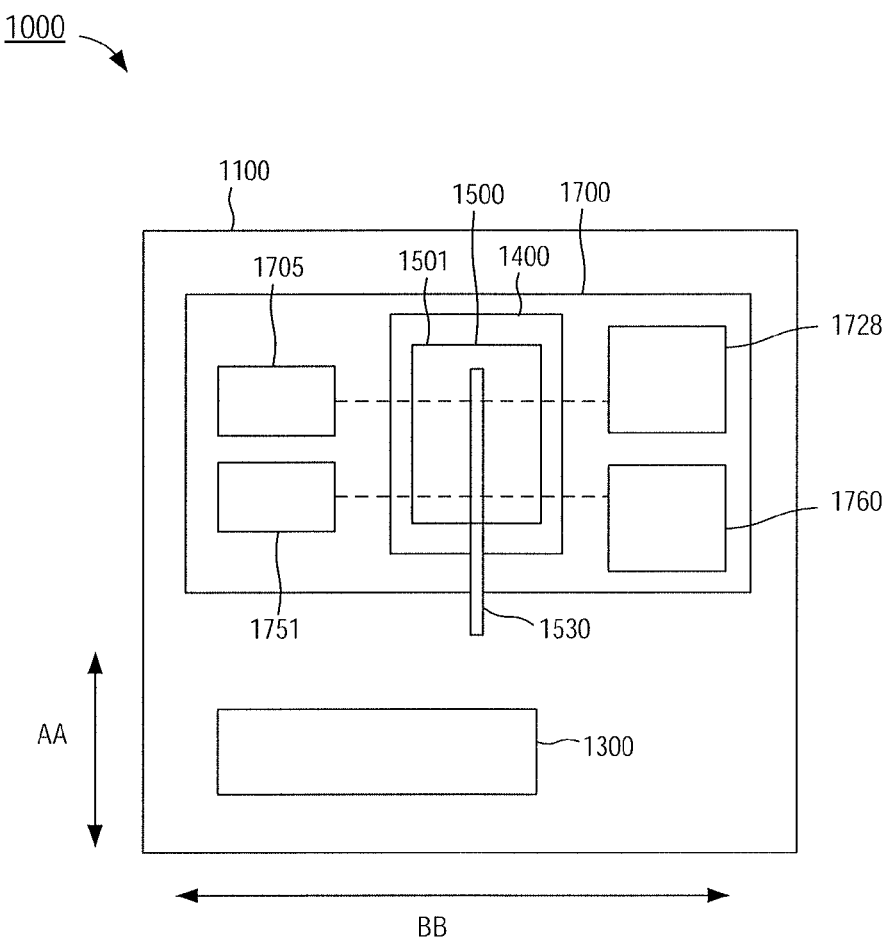
FIG. 1 is a schematic illustration of a portion of a system configured to perform capillary electrophoresis and/or image analytes separated by capillary electrophoresis, according to an embodiment.

Apparatus, methods, and systems for performing capillary electrophoresis, isoelectric point, and/or molecular weight analysis of a sample are described herein. The apparatus and systems are configured to detect analytes within the sample during and/or after electrophoretic separation.

In some embodiments, a system includes a housing, a cartridge retainer disposed within the housing, a detection assembly disposed within the housing, and a reagent tray holder movably disposed in the housing. The cartridge retainer is configured to receive a capillary cartridge having a capillary. The detection assembly includes at least one emitter, a first detector, and a second detector. The detection assembly is configured to transition between a first configuration, in which the first detector detects a first output of the at least one emitter, and a second configuration, in which the second detector detects a second output of the at least one emitter. The reagent tray holder is configured to move relative to the cartridge retainer to place the capillary of the capillary cartridge in fluid communication with a reagent volume.

In some embodiments, a system includes a housing, a cartridge retainer disposed within the housing, a light source disposed within the housing, and a detection assembly disposed within the housing. The cartridge retainer includes a first side portion and a second side portion. The first side portion and the second side portion are substantially parallel and define a space therebetween configured to receive at least a portion of a capillary cartridge. Each of the first side portion and the second side portion defines a first opening and a second opening. The first opening and the second opening of the second side portion are substantially aligned with the first opening and the second opening, respectively, of the first side portion. The light source is configured to emit a first beam of light and a second beam of light. At least a portion of the first beam of light is directed through the first opening of the first side portion and the first opening of the second side portion. At least a portion of the second beam of light is directed through the second opening of the first side portion and the second opening of the second side portion. The detection assembly includes a first detector configured to detect at least a portion of the first beam of light and a second detector configured to detect at least a portion of the second beam of light.

In some embodiments, a system includes a housing, a cartridge retainer disposed within the housing, a detection assembly disposed within the housing, a reagent tray holder movably disposed within the housing, and a control assembly disposed within the housing. The cartridge retainer is configured to receive a capillary cartridge having a capillary. The cartridge retainer includes a plurality of contact surfaces configured to contact the capillary cartridge and to align the capillary cartridge within the cartridge retainer. The detection assembly includes a first emitter and a second emitter, and a first detector and a second detector. The detection assembly is configured to transition between a first configuration and a second configuration based at least in part on one or more characteristics associated with the capillary cartridge. The first detector is configured to detect an output of the first emitter when the detection assembly is in the first configuration. The second detector is configured to detect an output of the second emitter when the detection assembly is in the second configuration. The reagent tray holder is configured to move relative to the cartridge retainer to place a capillary of the capillary cartridge in fluid communication with a reagent volume. The control assembly is configured to receive data associated with the capillary cartridge when the capillary cartridge is disposed within the cartridge retainer. The control assembly is configured to send a signal to the detection assembly to place the detection assembly in the first configuration or the second configuration based on the data associated with the capillary cartridge.

In some embodiments, an apparatus includes a cartridge body, a capillary disposed within the cartridge body, a conductive vial disposed within the cartridge body, a first electrode electrically coupled to the conductive vial, and a second electrode. The capillary defines an interior volume that is configured to contain a sample including an analyte. The capillary has a first end defining a first end of the interior volume and a second end defining a second end of the interior volume. The conductive vial contains a buffer and has a first septum and a second septum. The buffer is electrically coupled to the first end of the interior volume of the capillary via the first septum such that, when the interior volume contains the sample, the sample is electrically coupled to the vial. The second electrode is electrically coupled to a second end of the capillary such that the first electrode, the second electrode, and the sample define a portion of a circuit when the interior volume contains the sample.

In some embodiments, an apparatus includes a cartridge body configured to be disposed within an analyzer, a capillary disposed within the cartridge body, a tube disposed within the cartridge body. The cartridge body defines an opening. The capillary is configured for analyte separation. The tube is coupled to an end of the capillary such that the analyzer can apply at least one of a pressure or a vacuum to the capillary. At least a portion of the tube is exposed via the opening. The opening is configured to receive a portion of a pinch valve from the analyzer. The pinch valve is configured to pinch the tube.

In some embodiments, an apparatus includes a cartridge body configured to be disposed within an analyzer, a capillary disposed within the cartridge body, an outlet tube, an outlet port fluidically coupled to the outlet tube, and a waste receptacle defined within the cartridge body. The capillary is configured for analyte separation. The capillary having an outlet disposed within the cartridge body. The outlet tube is coupled to the capillary output. The waste receptacle is fluidically coupled to the outlet tube and is configured to impede liquid from flowing from the outlet tube to the outlet port.

In some embodiments, an apparatus includes a cartridge body configured to be disposed within an analyzer, a capillary disposed within the cartridge body, a buffer disposed in a vial within the cartridge body, a first septum disposed between the buffer and the capillary, and a second septum disposed between the buffer and the analyzer. The capillary is configured to separate an analyte based on an isoelectric point. The buffer is configured to induce a pH gradient along a length of the capillary. The second septum is configured to be disrupted by the analyzer such that at least one of a pressure or a vacuum can be applied to the vial.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the value stated. For example, about 0.5 would include 0.45 and 0.55, about 10 would include 9 to 11, about 1000 would include 900 to 1100.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the terms "perpendicular" and/or "normal" generally describe a relationship between two geometric constructions (e.g., two lines, two planes, a line and a plane, or the like) in which the two geometric constructions are disposed at substantially 90°. For example, a line is said to be "perpendicular" to another line when the lines intersect at an angle substantially equal to 90°. Similarly, when a planar surface (e.g., a two dimensional surface) is said to be "normal" to another planar surface, the planar surfaces are disposed at substantially 90° (e.g., substantially orthogonal) as the planar surfaces extend to infinity.

As used herein the term "module" refers to any assembly and/or set of operatively-coupled electrical components that can include, for example, a memory, a processor, electrical traces, optical connectors, software (executed in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor) capable of performing one or more specific functions associated with that module.

As used herein, the terms "analyte" and/or "target analyte" refer to any molecule or compound to be separated and/or detected with the methods, apparatus and systems provided herein. Suitable analytes include, but are not limited to, small chemical molecules such as, for example, environmental molecules, clinical molecules, chemicals, pollutants, and/or biomolecules. More specifically, such chemical molecules can include, but are not limited to pesticides, insecticides, toxins, therapeutic and/or abused drugs, antibiotics, organic materials, hormones, antibodies, antibody fragments, antibody-molecule conjugates (e.g., antibody-drug conjugates), antigens, cellular membrane antigen, proteins (e.g., enzymes, immunoglobulins, and/or glycoproteins), nucleic acids (e.g., DNA and/or RNA), lipids, lectins, carbohydrates, whole cells (e.g., prokaryotic cells such as pathogenic bacteria and/or eukaryotic cells such as mammalian tumor cells), viruses, spores, polysaccharides, glycoproteins, metabolites, cofactors, nucleotides, polynucleotides (comprising ribonucleic acid and/or deoxyribonucleic acid), transition state analogs, inhibitors, receptors, receptor ligands (e.g., neural receptors or their ligands, hormonal receptors or their ligands, nutrient receptors or their ligands, and/or cell surface receptors or their ligands), receptor-ligand complexes, nutrients, electrolytes, growth factors and other biomolecules and/or non-biomolecules, as well as fragments and combinations thereof. In some embodiments, the analyte is a protein or a protein complex, and the sample is a cellular lysate or a purified protein. Other suitable analytes can include aggregates, agglomerates, floc, and/or dispersed phase droplets or particles of colloids and/or emulsions.

As used herein, the term "sample" refers to a composition that contains an analyte or analytes to be detected. A sample, in some embodiments, is heterogeneous, containing a variety of components (e.g., different proteins) or homogenous, containing one component (e.g., a population of one protein). In some instances, a sample can be naturally occurring, a biological material, and/or a manufactured material. Furthermore, a sample can be in a native (e.g., a cell suspension) or denatured form (e.g., a lysate). In some instances, a sample can be a single cell (or contents of a single cell, e.g., as a cellular lysate from the single cell, or a purified protein) or multiple cells (or contents of multiple cells, e.g., as a cellular lysate from the multiple cells, or a purified protein from the multiple cells), a blood sample, a tissue sample, a skin sample, a urine sample, a water sample, and/or a soil sample. In some instances, a sample can be from a living organism, such as a eukaryote, prokaryote, mammal, human, yeast, and/or bacterium or the sample can be from a virus.

In some embodiments, the sample is a heterogeneous biological sample or derived from a heterogeneous biological sample, for example a tissue lysate, a cellular lysate or a mixture of biomolecules such as proteins (e.g., a purified protein). In a further embodiment, a protein within the cellular lysate is the analyte to be detected by the methods and systems described herein. In a further embodiment, the apparatus, systems, and methods provided herein provide for the detection of a particular form of a protein, for example, a phosphorylated protein. The cellular lysate, for example, can be the lysate of one cell or a mixture of cells. Moreover, the cellular lysate can include a single cell type, or multiple cell types. The cell type, in some embodiments, includes a stem cell or a cancer cell, or a population of stem cells, or a population of cancer cells. In some embodiments, a sample comprises one or more stem cells (e.g., any cell that has the ability to divide for indefinite time periods and to give rise to specialized cells). Suitable examples of stem cells can include but are not limited to embryonic stem cells (e.g., human embryonic stem cells (hES)), and non-embryonic stems cells (e.g., mesenchymal, hematopoietic, induced pluripotent stem cells (iPS cells), or adult stem cells (MSC)).

In some instances, prior to detecting an analyte in a sample with the apparatus and systems provided herein, processing may be performed on the sample. For example, a sample can be subjected to a lysing step, denaturation step, heating step, purification step (e.g., protein purification), precipitation step, immunoprecipitation step, column chromatography step, centrifugation, etc. In some embodiments, a sample is subjected to a denaturation step prior detecting and/or separating a target analyte in a sample with the methods, apparatus, and systems described herein. The processing step on the sample, in some embodiments, is performed in one of the apparatus or systems described herein. In another embodiment, the processing step is performed prior to introducing the sample into one of the apparatus or systems set forth herein.

As used herein, the terms "standard" and/or "internal standard" refer to a well-characterized substance of known amount and/or identity (e.g., known isoelectric point, molecular weight, electrophoretic mobility profile, number of base pairs in the case of a nucleic acid, molecular composition, etc.) that can be added to a sample comprising the analyte, for comparative purposes. In some embodiments, a known quantity of standard is added to a sample comprising one or more analytes, and both the standard and the molecules in the sample, including the analyte(s) are separated on the basis of isoelectric point by electrophoresis). A comparison of the standard and analyte signal then provides a quantitative or semi-quantitative measure of the amount of analyte originally present in the sample.

In general, isoelectric focusing (IEF) standards are known based on established isoelectric point. Similarly, molecular weight standards are known. In some instances, the standard and/or the analyte(s) can be detected with one or more detection molecules or reagents, such as with an antibody against the analyte or a labeling moiety attached to the standard. In some embodiments, a primary antibody is used to bind the target analyte, and a secondary antibody conjugated to a fluorescent or a chemiluminescent reagent is introduced to bind the primary antibody or the primary antibody-analyte complex. The signal of the fluorescent or chemiluminescent molecule is then detected. In other instances, the standard and/or the analyte(s) can be detected via native fluorescence (e.g., via fluorescence of tryptophan amino acids within the standard and/or analyte(s)) and/or absorbance.

The signal of the standard and the signal of the analyte(s) can then be compared to measure the concentration of the analyte(s) in the sample. In addition or alternatively, a relevant characteristic of the analyte (e.g., isoelectric point, molecular weight, etc.) can be determined by comparison to the standard.

In some embodiments, an internal standard can be a purified form of the analyte itself, which is generally made distinguishable from the analyte in some way. Any method of obtaining a purified form of the analyte can include but is not limited to purification from nature, purification from organisms grown in the laboratory (e.g., via chemical synthesis), and/or the like. The distinguishing characteristic of an internal standard can be any suitable change that can include but is not limited to dye labeling, radiolabeling, or modifying the mobility of the standard during the electrophoretic separation so that it is distinguishable from the analyte. For example, the analyte and the internal standard can each be labeled with fluorescent dyes that are each detectable at discrete emission wavelengths, thereby allowing the analyte and the standard to be independently detectable. In some instances, an internal standard is different from the analyte but behaves in a way similar to or the same as the analyte, enabling relevant comparative measurements. In some embodiments, a standard that is suitable for use can be any of those described in U.S. Patent Application Publication No. 2007/0062813 entitled, "Electrophoresis Standards, Methods and Kits," filed on Sep. 20, 2006, the disclosure of which is incorporated herein by reference in its entirety.

In some instances, multiple analytes are detected and characterized from a single sample in a single capillary tube by the apparatus, systems, and methods provided herein. For example, in some embodiments, the multiple analytes are a population of proteins or a subpopulation of proteins. In this regard, it may not be practical to include a single internal standard corresponding to each of the individual proteins of the population of proteins or subpopulation of proteins. Accordingly, in some embodiments, a general isoelectric point standard is introduced into the systems and apparatus provided herein. The standard, in some embodiments, can be a ladder standard operable to identify different isoelectric points along the capillary tube. Proteins in the sample that migrate during the electrophoresis are compared to the ladder to determine the isoelectric point of the proteins present in the sample. In some embodiments, ladder standards are used.

Analytes and/or standards described above, in some embodiments, are separated by any suitable mobility parameter such as charge, molecular weight, electrophoretic mobility (e.g., influenced by molecular weight, characteristic length, area, or volume, oligonucleotide length, or other suitable characteristic), and/or the like. For example, in some embodiments, a sample is subjected to an electrophoretic separation in a capillary tube comprising a separation matrix, based on a mobility parameter such as an isoelectric point or the like. The capillary tube can include a separation matrix, which can be added in an automated fashion. The separation matrix, in some embodiments, is an isoelectric separation matrix, and has similar or substantially the same properties of a polymeric gel, used in conventional electrophoresis experiments, such as a pH gradient. Capillary electrophoresis in the separation matrix is analogous to separation in a polymeric gel, such as a polyacrylamide gel or an agarose gel, where molecules are separated on the basis of the mobility parameter of the molecules in the sample, by providing a porous passageway through which the molecules can travel.

In some embodiments, once the separation is complete, the components of the separated sample (e.g., including the analytes and/or standards) can be immobilized to a wall(s) of the capillary using any suitable method including but not limited to chemical, photochemical, and heat treatment. In some embodiments, the components of the separated sample are immobilized in a fluid path (e.g., defined by a capillary or the like) after the molecules have been separated by electrophoresis. For example, in some embodiments, immobilization occurs by subjecting the separated sample and the capillaries to ultraviolet (UV) light, which serves to immobilize the analyte(s) (if present in the sample) and molecules in the sample to the walls of the capillary. The immobilization can be via covalent bonds or non-covalent means such as by hydrophobic or ionic interaction. In another embodiment, a reactive moiety can be used to covalently immobilize the resolved analyte or analytes in the fluid path. The reactive moiety can be attached directly or indirectly to the fluid path (e.g., on the wall(s) of the capillary tube). In some embodiments, the reactive moiety can be supplied in solution or suspension, and can be configured to form bridges between the wall of the fluid path and the molecules in the sample upon activation. The reactive moiety can line the fluid path or can be present on a linear or cross-linked polymer in the fluid path, which may or may not be linked to the wall of the fluid path before and/or after activation. The reactive moiety can be and/or can include any reactive group that is capable of forming a covalent linkage with a corresponding reactive group of individual molecules of the sample such as, for example, those described above.

In some embodiments, the reactive moiety comprises a functional group that can be converted to a functionality that adheres to an analyte via hydrophobic interactions, ionic interactions, hydrogen bonding etc. In some embodiments, such reactive moieties can be activated by the UV light, laser, temperature, or any other source of energy in order to immobilize the analytes onto the surfaces of the fluid paths and/or onto the surfaces of particles attached to the surfaces of fluid paths. In some embodiments, the surfaces of the fluid paths are functionalized with thermally responsive polymers that enable changes in hydrophobicity of the surfaces upon changing the temperature. In some embodiments, the analytes are immobilized on such surfaces by increasing hydrophobicity of a temperature responding polymer when a certain temperature is reached within the fluid path. In yet other embodiments, the analyte can be probed for, and/or detected without first being immobilized onto the surfaces of the fluid paths. By way of example, the analytes can be separated based on an isoelectric point (e.g., via isoelectric focusing) and maintained at their respective isoelectric points for at least as long as the sample within the fluid path is subjected to an electric current. In other words, once the analytes and/or standards are separated, the apparatus and/or systems described herein can continue to provide a flow of electric current operable to maintain the analytes and/or standards at their respective isoelectric points (e.g., immobilization).

Immobilized and/or otherwise separated analytes and/or standards are then probed for, and detected with one or more detection agents. A detection agent is capable of binding to or interacting with the analyte and/or standard to be detected. Detection agents allow the detection of a standard and an analyte by any means such as but not limited to fluorescent dye(s), optical dye(s), chemiluminescent reagent(s), radioactivity, particles, magnetic particle(s), paramagnetic particle(s), etc. Detection agents can include any organic or inorganic molecules such as, for example, proteins, peptides, antibodies, enzyme substrates, transition state analogs, cofactors, nucleotides, polynucleotides, aptamers, lectins, small molecules, ligands, inhibitors, drugs, and other biomolecules as well as non-biomolecules capable of binding the analyte to be detected. In some embodiments, the detection agents comprise one or more label moieties (as described above). In some embodiments, the detection agents comprise one or more label moiety(ies). In embodiments employing two or more label moieties, each label moiety can be the same, or some, or all, of the label moieties may differ.

In some embodiments, the detection agent is used as a secondary reagent. For example, in some embodiments, the detection agent is designed to bind a first molecule that is introduced to bind to the analyte and/or standard, or the complex of the first molecule with the analyte and/or standard. For example, in some embodiments, a "primary" monoclonal or polyclonal antibody is first introduced into the capillary tube comprising the immobilized sample. This "primary" antibody binds to the analyte of interest (if present in the sample) and unbound primary antibodies are washed away. Next, a "secondary" antibody is introduced, which is designed to bind either the primary antibody, or a region spanning the primary antibody-analyte complex. The secondary antibody includes a label moiety for detecting and/or visualizing the presence/absence of the analyte of interest.

In some embodiments, a multiplex immunoassay is carried out in the apparatus and systems provided herein, to detect the presence or absence of two or more analytes of interest (for example, two, three, four or five analytes) in the sample, or to quantify the amount of two or more analytes in the sample. In a further embodiment, the detection agent is the same for each of the analytes of interest. For example, the detection agent for each analyte is a secondary antibody conjugated to a chemiluminescent label such as horseradish peroxidase. Differentiation between the analytes occurs by initially introducing distinct primary antibodies into the capillary tube, where each primary antibody is specific for a unique analyte of interest.

The label moiety, conjugated to the secondary antibody, can be any suitable label. For example, general labels can include optical dyes (e.g., colored or fluorescent dyes); chemiluminescent labels, phosphorescent labels, enzymatic labels (e.g., alkaline phosphatase and/or horseradish peroxidase), bioluminescent labels, isotopic labels (e.g., radioactive isotopes or heavy isotopes), mass labels, and/or particle labels (e.g., colloids, magnetic particles, etc.). In some embodiments, the label moiety is a chemiluminescent moiety. In a further embodiment, the chemiluminescent moiety is horseradish peroxidase (HRP). In some embodiments, the HRP is conjugated to a secondary antibody, and is used in an immunoassay to detect an analyte or a plurality of analytes in a sample. In some embodiments, a label moiety can be a single isomer dye. In some embodiments, the label moiety can be a fluorescent dye that can include any entity that provides a fluorescent signal. For example, a fluorescent dye can include a resonance-delocalized system or aromatic ring system that absorbs light at a first wavelength and emits fluorescent light at a second wavelength in response to the absorption event. A fluorescent dye can be any of a variety of classes of fluorescent compounds, for example, xanthenes, rhodamines, fluoresceins, cyanines, phthalocyanines, squaraines, bodipy dyes, coumarins, oxazines, and carbopyronines. In some embodiments, the fluorescent dye is 5-carboxytetramethylrhodamine (5-TAMRA), and/or any other suitable class of fluorescent compound.

In some embodiments, the label moiety can be and/or can include a chemiluminescent label. Suitable labels moieties can include enzymes capable of reacting with a chemiluminescent substrate in such a way that photon emission by chemiluminescence is induced. For example, enzymes can induce chemiluminescence in other molecules through enzymatic activity. Such enzymes can be and/or can include peroxidase, for example, horseradish peroxidase (HRP), β-galactosidase, phosphatase, etc. In some embodiments, the chemiluminescent label can be selected from any of a variety of classes of luminol label, an isoluminol label, etc. In some embodiments, a detection agent can include chemiluminescent-labeled antibodies, for example, a secondary antibody covalently bound to HRP. In some embodiments, the detection agents comprise chemiluminescent substrates such as, for example, Galacton substrate available from Applied Biosystems of Foster City, Calif. or SuperSignal West Femto Maximum Sensitivity substrate available from Pierce Biotechnology, Inc. of Rockford, Ill., or any other suitable substrates. In some embodiments, a detection agent can be any of those described in U.S. Pat. Nos. 6,689,576, 6,395,503, 6,087,188, 6,287,767, 6,165,800, and 6,126,870, the disclosures of which are incorporated herein by reference in their entireties.

In some embodiments, the label moiety can be and/or can include a bioluminescent compound (e.g., found in biological systems in which a catalytic protein increases the efficiency of the chemiluminescent reaction). The presence of a bioluminescent compound is determined by detecting the presence of luminescence. Suitable bioluminescent compounds include, but are not limited to luciferin, luciferase, and aequorin.

In some embodiments, the label moiety can be and/or can include a fluorescent dye. Such fluorescent dyes can include a resonance-delocalized system or aromatic ring system that absorbs light at a first wavelength and emits fluorescent light at a second wavelength in response to the absorption event. Fluorescent dyes can be any of a variety of classes of fluorescent compounds such as but not limited to xanthenes, rhodamines, fluoresceins, cyanines, phthalocyanines, squaraines, bodipy dyes, coumarins, oxazines, and carbopyronines. In some embodiments, for example, where detection agents contain fluorophores, such as fluorescent dyes, their fluorescence is detected by exciting them with an appropriate light source, and monitoring their fluorescence by a detector sensitive to their characteristic fluorescence emission wavelength.

As provided above, in some embodiments, two or more different agents can be used to bind to or interact with two or more different analytes to enable more than one type of analytes to be detected simultaneously. In some embodiments, two or more different detection agents, which bind to or interact with the one analyte, can be detected simultaneously. In various embodiments, using two or more different detection agents, one agent, for example a first primary antibody, can bind to or interact with one or more analytes to form a first agent-analyte complex, and a second reagent, the detection agent, for example a secondary antibody, can be used to bind to or interact with the first agent-analyte complex.

In another embodiment, two different detection agents, for example antibodies for both phospho- and non-phospho-forms of analyte of interest can enable detection of both forms of the analyte of interest. In some embodiments, a single specific detection agent, for example an antibody, can allow detection and analysis of both phosphorylated and non-phosphorylated forms of an analyte. In some embodiments, multiple detection agents can be used with multiple substrates to provide color multiplexing. For example, different chemiluminescent substrates can be used to emit photons of differing color. Selective detection of different colors (e.g., via a diffraction grating, a prism(s), a series of colored filters, and/or the like) can allow determination of which color photons are being emitted at any position along a fluid path (e.g., along a molecular weight gradient), and therefore determination of which detection agents are present at each emitting location. In some embodiments, different chemiluminescent reagents can be supplied sequentially, allowing different bound detection agents to be detected sequentially.

In general, during the standard immunoassay process carried out in the apparatus and systems described herein, a portion of the internal standard will be lost due to the various wash processes. Thus, it is generally desirable to load a sufficient amount of internal standard in the sample at the beginning of the assay so that enough signal can be generated by the internal standard that remains in the capillary after the immunoassay to provide coordination to calibrate the curve and analyze the molecular weight and/or identity (e.g., amino acid number or number of oligonucleotide base pairs) of the analyte. A relatively large amount of internal standard, however, may interfere with the capture of the analyte if the standard and the analyte are located in the same position. As such, some standards do not locate with the analyte during and/or at the end of the electrophoresis. Such a standard, however, may not produce a reliable calibration curve for the detection of the analyte. Therefore, in some embodiments, a sample can include more than one standard. For example, an internal standard can be formed by and/or include a first standard (referred to as a "bright standard" or a "registration standard") and a second standard (referred to as a "dim standard"). The bright standard can be a standard that has characteristics (such as an isoelectric point) that differs from that of the analyte. As such, after electrophoresis, the location of registration standard and the analyte are located apart from each other in the capillary. Thus, the fluorescence emitted from the bright standard and the analyte will not overlap and interfere with each other. The dim standard can be a standard that has characteristics (such as an isoelectric point) that are similar to that of the analyte. As such, after electrophoresis, the location of the registration standard and the analyte are located close to each other in the capillary.

The bright standard can locate at a position along a flow path (e.g., defined by a capillary or the like) that is different from the position of the analyte and provides a coordinate (e.g., an anchor point) for the dim standard to locate close to or at the same position as the analyte, thereby providing an accurate calibration curve. Generally, the bright standard produces a fluorescence that is brighter than the fluorescence emitted by the dim standard after the internal standard and the analyte have been separated. The difference of the brightness between the bright standard and dim standard can be attributed to the difference in the nature of emission and/or to the difference in the amounts of the two standards contained in the internal standard. For example, a large quantity of bright standard and a small quantity of dim standard can be mixed to form a standard that can produce a "bright" signal from the bright standard and a "dim" signal from the dim standard. Thus, a "bright" signal due to the bright standard and a "dim" signal due to the dim signal are detected after the separation step by electrophoresis. In some embodiments, an internal standard can include a bright standard and a dim standard such as, for example, those described in U.S. Patent Application Publication No. 2011/0011740, the disclosure of which is incorporated herein by reference in its entirety.

The embodiments described herein can be used to facilitate one or more analyses (e.g., via molecular weight analysis and/or isoelectric focusing) of one or more analytes in a single system followed by visualization and detection analytes within a sample. Embodiments described herein can provide the functionality of pipettes and microfluidic paths, thereby enabling the analysis of very small volume samples. Such apparatus and/or systems can include any suitable device, mechanism, assembly, subassembly, electronic device, actuator, and/or the like that can enable the apparatus and/or system to, for example, separate, immobilize, and/or detect any suitable target analytes. More specifically, the apparatus and systems described herein are configured to receive a cartridge including one or more capillaries and to expose at least a portion of the cartridge to negative pressure differential (e.g., produced by a vacuum source) operable to draw a volume of fluid (e.g., one or more reagents, samples, buffers, washes, detectors, analytes, ampholytes, and/or the like) from one or more wells or trays included in the apparatus and/or system into the capillary(ies) of the cartridge.

In some embodiments, such a cartridge can have at least one capillary that is fixedly coupled to a cartridge body. The capillary(ies) (referred to henceforth in the singular, for simplicity) are configured to be placed in fluid communication with one or more fluid reservoirs (e.g., disposed in the cartridge body and/or disposed in or defined by a reagent tray or the like). In some embodiments, the one or more fluid reservoirs can be wells or the like containing a fluid with constituents having any of the chemistries described above. In some embodiments, at least a part of the cartridge can be electrically conductive (e.g., formed from copper, platinum, stainless steel, electrically conductive microplate plastic, carbon-infused plastic, an electrically conductive polymer, and/or any other suitable material). In some embodiments, such portions of the cartridge can have a volume resistivity of less than 25 ohm*centimeters (ohm·cm) and a surface resistivity of 1000 ohms (or 1 kilo-ohm (kΩ)) to 100 kΩ. In other embodiments, the cartridge and/or portions thereof is/are substantially nonconductive.

The capillary of the cartridge defines a lumen that receives at least a portion of a sample, solution, reagent, analyte, and/or any other suitable fluid or gel. The capillary can be any suitable shape, size, or configuration and can be formed from any suitable material (e.g., glass, plastic, silicon, fused silica, gel, PYREX™ (amorphous glass), and/or the like) that allows a liquid and/or dissolved molecules to flow through the lumen. For example, in some embodiments, the length of the capillary can be based at least in part on factors such as sample size or volume and the extent of sample separation when resolving the analyte or analytes of interest (e.g., between about 2 centimeters (cm) and about 20 cm), where a longer capillary can result in increased separation of samples, which in turn, can improve resolution of complex mixtures and/or mixtures having a low abundance of analytes. In some embodiments, the capillary of a cartridge can be an elongate member having a rounded or circular cross-sectional shape or a polygonal cross-sectional shape (e.g., trapezoidal, rectangular, square, pentagonal, octagonal, etc.). In some embodiments, the shape and/or size of the lumen defined by the capillary can be based at least in part on the sample, the sample volume, and/or the type of analysis (e.g., with an inner diameter of about 10 micrometers or "microns" (µm) to about 1000 µm). For example, a capillary having a relatively small inner diameter can be associated with and/or otherwise used for relatively low sample volumes, which can be suitable for expensive samples or reagents. Conversely, a capillary defining a relatively larger inner diameter can be associated with and/or otherwise used for relatively high sample volumes, which in some instances, can result in improved signal detection or the like. In other embodiments, the inner diameter can be based at least in part on the analysis to be performed (e.g., molecular weight-based separation, isoelectric focusing, etc.).

FIG. 1 is a schematic illustration of a portion of a system 1000 configured to perform capillary electrophoresis (e.g., based on molecular weight and/or isoelectric point) according to an embodiment. For example, in some instances, a user can load a capillary cartridge into the system 1000 and can initiate and/or otherwise provide instructions to the system 1000 to cause the system to at least semi-automatically separate analytes (e.g., proteins) within the sample by molecular weight. In such instances, the system 1000 captures digital or analog images associated with a detection of analytes within a sample (e.g., including any suitable agent, reagent, protein, analyte, buffer, lysate, etc.) drawn into a capillary of the capillary cartridge. As such, the system 1000 can analyze the images and/or other data associated with the detection and can provide molecular weight and/or morphological data of the constituents of the sample. In other instances, a user can load a capillary cartridge into the system 1000 and can initiate and/or otherwise provide instructions to the system 1000 to cause the system 1000 to at least semi-automatically separate analytes within the sample by isoelectric point. In such instances, the system 1000 draws a sample (e.g., including any suitable agent, reagent, protein, analyte, buffer, lysate, etc.) into a capillary, separates and/or focuses analytes in the sample within the capillary, and detects the presence or the absence of a target analyte and/or detects the location of analytes within the sample (e.g., analytes that have migrated to different positions along the capillary associated with their isoelectric points). Optionally, the system 1000 can immobilize at least some constituents of the sample within the capillary (e.g., via heat, UV exposure, and/or the like) before detecting the target analyte.

As shown in FIG. 1, the system 1000 includes a housing 1100, a reagent tray assembly 1300, a capillary cartridge retainer 1400, and a detection assembly 1700. Although not shown in FIG. 1, in some embodiments, the system 1000 can include any suitable electronic system or assembly with at least a power source, a processor, and a memory that can be configured and/or otherwise programmed to perform one or more processes (e.g., hardware module and/or software module stored in the memory and executed in the processor) associated with performing at least a semi-automatic electrophoretic separation. Similarly, the system 1000 can include any suitable fluid flow system or assembly that defines one or more fluid flow paths configured to receive a fluid such as, for example, a sample, one or more reagents, air, and/or the like, which can flow through the system 1000 as described in further detail herein with reference to specific embodiments.

As described above, the system 1000 is configured to receive a capillary cartridge 1500 (also referred to herein as "cartridge"). The cartridge 1500 can include at least a body portion 1510 that is fixedly coupled to at least one capillary 1530. The cartridge 1500 can be any suitable shape, size, or configuration. In some embodiments, cartridge 1500 can be associated with and/or otherwise configured for use in a particular analysis. For example, in some instances, the system 1000 can receive a cartridge configured for use in a molecular weight analysis. In other instances, the system 1000 can receive a cartridge configured for use in an isoelectric focusing process. In some embodiments, the cartridge 1500 can have a size, shape, and/or configuration that makes the cartridge suitable for either analysis. Moreover, the cartridge 1500 can include any suitable identification tag, code, and/or device, which can be detected by the system 1000 automatically as the user positions the cartridge 1500 within the system 1000.

The housing 1100 of the system 1000 can be any suitable shape, size, or configuration and can be arranged to at least partially enclose or at least partially house any suitable component of the system 1000. For example, the housing 1100 can at least partially enclose the reagent tray assembly 1300, the capillary cartridge retainer 1400, and the detection assembly 1700. Although not shown in FIG. 1, in some embodiments, the housing 1100 can be configured to form one or more portions, chambers, inner volumes, etc. that are configured to allow at least some of the components of the system 1000 to be disposed therein. In some embodiments, the housing 1100 can include a door configured to provide access to the inner volume defined thereby. For example, a user can open the door of the housing 1100 to position a capillary cartridge 1500 within the capillary cartridge retainer 1400, as described in further detail herein. In some embodiments, at least a portion of the housing 1100 can be light tight such that no substantial quantity of light leaks through the housing into a chamber defined by the housing. In some embodiments, the housing 1100 can define at least one climate controlled chamber. Similarly stated, the system 1000 can be operable to maintain a chamber of the housing at a constant and/or preset temperature, humidity, and/or other environmental parameter (e.g., illumination, etc.).

The capillary cartridge retainer 1400 (also referred to herein as "cartridge retainer") is fixedly disposed within the housing 1100. For example, in some embodiments, the cartridge retainer 1400 can be coupled to a frame or the like that maintains the cartridge retainer 1400 in a substantially fixed position within the housing 1100. In some embodiments, the cartridge retainer 1400 can also be coupled to and/or otherwise disposed in a fixed position relative to the detection assembly 1700, as described in further detail herein.

The cartridge retainer 1400 can be any suitable shape, size, or configuration. For example, the cartridge retainer 1400 can include, for example, a set of sidewalls that define an inner volume configured to receive at least a portion of a capillary cartridge 1500 (also referred to herein as "cartridge"). More particularly, the cartridge retainer 1400 can have or define a substantially C-shaped cross-section with at least one side of the cartridge retainer 1400 being substantially open. As such, a user can insert the cartridge 1500 through the substantially open side of the cartridge retainer 1400 to position at least a portion of the cartridge 1500 within the inner volume. In some embodiments, the cartridge retainer 1400 can include a latch mechanism suitable to form a friction fit, a snap fit, a threaded coupling, and/or the like with at least a portion of the cartridge 1500 to couple the cartridge 1500 to the cartridge retainer 1400. In other words, the cartridge retainer 1400 at least temporarily couples to the cartridge 1500 when the portion of the cartridge 1500 is inserted into the inner volume to maintain the cartridge 1500 in a substantially fixed position relative to the cartridge retainer 1400.

The cartridge retainer 1400 is configured to receive the cartridge 1500 in a predetermined orientation (e.g., only one orientation or way). Although not shown in FIG. 1, the cartridge retainer 1400 can include any suitable alignment feature or sensor configured to engage and/or sense a portion of the cartridge 1500 as the cartridge 1500 is positioned within the cartridge retainer 1400. More particularly, the cartridge retainer 1400 can include, for example, any number of features (e.g., protrusions, openings, grooves, etc.), assemblies, mechanisms, sensors, and/or the like, each of which engage and/or sense a portion of the cartridge 1500 to ensure the cartridge 1500 is retained within the cartridge retainer 1400 at a desired position and/or with a desired orientation.

In some embodiments, the cartridge retainer 1400 can include and/or otherwise can be coupled to any suitable assembly, mechanism, device, and/or the like configured to engage the cartridge 1500 to control, for example, a flow of fluid through at least a portion of the cartridge 1500. For example, in some embodiments, the cartridge retainer 1400 can include and/or can be coupled to a vacuum source or assembly configured to produce a negative pressure within a volume of the cartridge 1500 such as, for example, a lumen of a capillary or the like. The vacuum source can be fluidically coupled to a portion of the cartridge retainer 1400 via a port or the like that places the vacuum source in fluid communication with the cartridge when the cartridge 1500 is retained by the cartridge retainer 1400. In some instances, the vacuum source can be activated (e.g., by a manual switch and/or by an electrical switch included in an electrical circuit and controlled by a processor) to produce a negative pressure within the cartridge 1500, as described in detail below with reference to specific embodiments. In some embodiments, the cartridge retainer 1400 can include a device or mechanism configured to engage the cartridge 1500 to selectively limit a bulk flow of fluid through a portion of the cartridge 1500. For example, the cartridge retainer 1400 can include an actuator or the like that is selectively placed in contact with a pinch valve or the like included in the cartridge 1500 to limit and/or substantially prevent a bulk flow of fluid through, for example, a lumen of a capillary included in the capillary cartridge 1500.

The cartridge retainer 1400 can also include any number of electrical contacts or the like configured to electrically couple a portion the cartridge 1500 to an electrical or electronic assembly included in the system 1000. For example, in some embodiments, the cartridge retainer 1400 includes one or more electrically conductive contact members, clips, surfaces, etc. that are placed in contact with an associated electrically conductive contact member, clip, surface, etc. of the cartridge 1500 when the cartridge 1500 is retained therein. In some embodiments, at least a portion the cartridge 1500 can be formed from an electrically conductive material such as stainless steel, electrically conductive plastic or the like. Thus, when the cartridge 1500 is retained in a desired position within the cartridge retainer 1400 the one or more electrically conductive members or the like of the cartridge retainer 1400 contact one or more predetermined electrically conductive portions of the cartridge 1500, which in turn, places the cartridge 1500 in electrical or electronic communication with the electrical and/or electronic assembly included in the system 1000. By way of example, the cartridge retainer 1400 can electrically connect a conductive capillary of the cartridge 1500 and/or a conductive fluid within a lumen of a capillary to the electrical and/or electronic assembly of the system 1000, as described in further detail herein.

The reagent tray assembly 1300 of the system 1000 can be any suitable shape, size, or configuration and can be arranged to receive, house, and/or store at least a portion of a reagent tray (not shown in FIG. 1). The reagent tray assembly 1300 can receive and/or can include any suitable reagent tray (not shown in FIG. 1). For example, the reagent tray can hold and/or otherwise define a set of wells, well plates, microwell plates, troughs, and/or the like. The wells and/or microwells can be any suitable size and can be disposed along and/or otherwise defined by a surface of the reagent tray in any suitable arrangement. Although specific examples of reagent trays are described herein, the reagent tray assembly 1300 can be configured to receive and/or include any suitable reagent tray of similar size and/or shape that can define any number and/or any arrangement of wells and/or microwells. The wells and/or microwells included in or defined by the reagent tray can receive any suitable volume of a solution, fluid, gel, lysate, buffer, sample, analyte, ampholyte, agent, reagent, protein, matrix, and/or the like. In some embodiments, the wells and/or microwells can receive a vial or the like containing a volume of any suitable fluid. In some embodiments, the reagent tray assembly 1300 and/or a portion of the reagent tray assembly 1300 is electrically conductive and electrically coupled to the electrical and/or electronic assembly included in the system 1000. In such embodiments, the reagent tray and/or a portion of the reagent tray can also be electrically conductive and can facilitate an electrical connection to a fluid disposed within the reagent tray through the coupling of the reagent tray to the reagent tray assembly 1300.

At least a portion of the reagent tray assembly 1300 is movably disposed within and/or movably coupled to the housing 1100. For example, the reagent tray assembly 1300 can be movably coupled to one or more tracks, racks, lead screws, slides, pistons, and/or the like that can be operable to move the reagent tray assembly 1300 relative to the housing 1100. The reagent tray assembly 1300 (or at least a reagent tray included therein) can be moved in a direction closer to or further from the cartridge retainer 1400, as indicated by the arrow AA in FIG. 1. In other words, the reagent tray assembly 1300 can be moved in a direction parallel to an axis defined by the capillary 1530 of the cartridge 1500 when the cartridge 1500 is retained by the cartridge retainer 1400. In addition, the reagent tray assembly 1300 can be moved in one or more directions along a plane normal to the cartridge retainer 1400, as indicated by the arrow BB. That is to say, the reagent tray assembly 1300 (or at least the reagent tray included therein) can be moved along a plane normal to the axis defined by the capillary 1530 of the cartridge 1500 when the cartridge 1500 is retained by the cartridge retainer 1400. Said another way, the reagent tray assembly 1300 (or at least the reagent tray included therein) can be moved within the housing 1100 in the X-direction (e.g., left or right), the Y-direction (e.g., up or down), and the Z-direction (e.g., front or back) relative to the cartridge retainer 1400.

In this manner, the reagent tray assembly 1300 is configured to move at least the reagent tray (not shown in FIG. 1) relative to the cartridge 1500 retained by the cartridge retainer 1400 to dispose at least an end portion of the one or more capillaries 1530 of the cartridge 1500 in the wells, microwells, vials, and/or the like of the reagent tray. Moreover, the reagent tray assembly 1300 can move at least the reagent tray through any suitable number of positions relative to the cartridge 1500 and/or cartridge retainer 1400 to place the one or more capillaries 1530 in any of the wells, microwells, and/or vials included in the reagent tray, or any suitable combination thereof. Thus, with the capillary 1530 in fluid communication with the vacuum source (as described above), a negative pressure can be produced within the capillary 1530 that is operable to draw a volume of fluid, such as those described above, from any suitable well or wells of the reagent tray and into the capillary 1530. In addition or alternatively, a well, microwell, vial, etc., can be fluidically coupled to a positive pressure source via a pressure conduit (not shown in FIG. 1) inserted into the well, microwell, vial etc. with the capillary 1530. The reagent tray assembly 1300, the capillary 1530, and/or a portion of the cartridge 1500 can be operable to seal the well, microwell, vial, etc. against the cartridge 1500 such that a positive pressure can urge fluid from the well, microwell, vial etc. into the capillary 1530.

The detection assembly 1700 of the system 1000 is fixedly disposed within the housing 1100. As described above, the detection assembly 1700 is also disposed in a predetermined and fixed position relative to the cartridge retainer 1400. For example, the detection assembly 1700 can be arranged within the housing 1100 such that predetermined portions of the detection assembly 1700 are aligned with and/or otherwise disposed in a desired position relative to predetermined portions of the cartridge retainer 1400. In some embodiments, the detection assembly 1700 and/or cartridge retainer 1400 can include any suitable adjustment mechanism or the like to ensure a desired alignment between the detection assembly 1700 and the cartridge retainer 1400.

The detection assembly 1700 can be any suitable device, mechanism, and/or assembly that is configured to capture and/or detect digital or analog data (e.g., images) of, for example, an analyte and/or standard and/or to detect a signal emitted by the analyte and/or standard. For example, in some embodiments, the detection assembly 1700 includes a first emitter 1705, a second emitter 1751, a first detector 1728, and a second detector 1760. The first emitter 1705 of the detection assembly 1700 can be any suitable device, member, mechanism, assembly, and/or the like that is configured to release energy (e.g., heat, photons, radiation, etc.). For example, in some embodiments, the first emitter 1705 can be one or more LEDs, a deuterium lamp, a laser, an incandescent light source, a fluorescent light source, or any other suitable light source. The first emitter 1705, in some embodiments, can be optically coupled to the cartridge retainer 1400, the cartridge 1500, and/or the capillary 1530 via one or more lenses, mirrors, prisms, fiber optics, and/or the like. The first emitter 1705 can be powered and/or excited to emit photons having, for example, a predetermined wavelength and/or range of wavelengths. In some embodiments, the detection assembly 1700 can include one or more mirrors, lenses, filters or the like configured to direct, focus, and/or convert the wavelength of photons emitted by the first emitter 1705. For example, the detection assembly 1700 can include any suitable lens and/or filter (e.g., a TAMRA filter) that is associated with chemiluminescence, fluorescence (e.g., native fluorescence, fluorescence of label moieties, etc.), absorbance, and/or the like.

Similarly, the second emitter 1751 can be any suitable device, member, mechanism, assembly, and/or the like configured to release energy in the form of photons, heat, radiation, etc. In some embodiments, the second emitter 1751 can be, for example, an array of LEDs and/or any of the light sources described with reference to the first emitter 1705. In some embodiments, the first emitter 1705 is configured to emit photons during, for example, a molecular weight analysis, and the second emitter 1751 is configured to emit photons during, for example, isoelectric focusing. In such embodiments, the first emitter 1705 can be, for example, a single fiber optic output (e.g., a single, focused beam of light), while the second emitter 1751 can be, for example, a grid array of fiber optic outputs, LEDs, or the like (e.g., a column of light rather than a single, focused beam of light). In other embodiments, a single emitter can be used during molecular weight analysis and isoelectric focusing (e.g., via one or more apertures, filters, blockers, reflectors and/or refractors, etc.). In still other embodiments, the detection assembly 1700 can include more than the first emitter 1705 and the second emitter 1751. As described in further detail herein, the first emitter 1705 (or emitters) and the second emitter 1751 (or emitters) can emit energy that interacts with at least a portion of a sample contained within the capillary 1530 of the cartridge 1500 when the cartridge 1500 is retained by the cartridge retainer 1400.

The first detector 1728 and the second detector 1760 can be any suitable digital or analog detector. For example, in some embodiments, the first detector 1728 and/or the second detector 1760 can be and/or can include a photodiode, an array of photodiodes, a charged coupled device (CCD) array, and/or the like. The detectors 1728 and 1760 can be used to capture an image and/or signal associated with the analyte and/or standard within a sample. In some embodiments, the detectors 1728 and 1760 can be operable to capture images and/or signals emitted from the analyte and/or standard periodically and/or continuously. In some embodiments, the detectors 1728 and 1760 can be operable to monitor the analyte and/or standard, in real time or substantially in real time, which can allow a user to rapidly determine whether an analyte is present in the sample, an amount or activity of the analyte, a molecular weight of the analyte, and/or the like. In some embodiments, for example, the first detector 1728 can be used during a molecular weight analysis to detect and/or image, substantially in real time, a flow of a sample through the capillary 1530 of the cartridge 1500 (in this instance, configured for use in molecular weight analysis) when the cartridge 1500 is retained by the cartridge retainer 1400. In some embodiments, the second detector 1760 can be used during and/or after isoelectric focusing. For example, the second detector 1760 can be used to detect the separation of analytes substantially in real time as analytes separate and focus and/or after analytes have been focused and, optionally, immobilized. Similarly stated, the second detector 1760 detect a signal (e.g., fluorescence, absorbance, etc.) associated with one or more analytes included in a sample that has be separated within the capillary 1530 of the cartridge 1500 (in this instance, configured for use in isoelectric focusing) when the cartridge 1500 is retained by the cartridge retainer 1400. Moreover, the detection assembly 1700 can be operably coupled to any suitable electrical or electronic circuit and configured to send and/or receive signals from a processor or the like (e.g., the detection assembly 1700 can send one or more signals to the processor or the like to cause data associated with the captured images and/or detected signals to be stored, for example, in a memory or database). Although the detection assembly 1700 is described as including the first detector 1728 and the second detector 1760, in other embodiments, the detection assembly 1700 can include a single detector or multiple detectors (e.g., more than two) configured to detect a portion of energy (e.g., photons) produced by the emitters 1705 and/or 1751.

In use, for example, the system 1000 can be set, programed, and/or otherwise placed in a configuration to perform molecular weight analysis of a sample, which can include, for example, preparing samples and/or reagents as well as preparing the cartridge 1500. A user can then insert the cartridge 1500 into the cartridge retainer 1400 in a single, predetermined orientation, as described above. The cartridge retainer 1400, in turn, at least temporarily couples to the cartridge 1500 to retain the cartridge 1500 in a substantially fixed position. The arrangement of the cartridge retainer 1400 and the detection assembly 1700 within the housing 1100 is such that predetermined portions of the detection assembly 1700 (e.g., the first emitter 1705 and the first detector 1728) are aligned with predetermined portions of the cartridge retainer 1400 (e.g., a first set of openings or the like). Thus, by aligning the detection assembly 1700 with the cartridge retainer 1400 and with the cartridge retainer 1400 retaining the cartridge 1500 in a predetermined, fixed position, the first emitter 1705 and the first detector 1728 can be aligned with, for example, a portion of the capillary 1530 of the cartridge 1500. Therefore, energy and/or photons emitted by the first emitter 1705 can be directed to a predetermined portion of the capillary 1530.

As described above, the cartridge 1500 (e.g., including the capillary 1530) is fluidically coupled to the vacuum source when positioned within the cartridge retainer 1400. Accordingly, the vacuum source can then be activated (e.g., at least semi-automatically) to produce negative pressure differential within the capillary 1530 that is operable to draw a substantially continuous flow of sample through the capillary 1530. In this manner, with the sample flowing through the capillary 1530, the first emitter 1705 can emit the energy or photons, which in turn, illuminates and/or energizes a volume of sample flowing through the predetermined portion of the capillary 1530 (at which the energy or photons are directed). The first detector 1728, in turn, can capture and/or detect one or more images, image data, and/or signals associated with the illuminated and/or energized analytes, standards, etc. within that volume of sample. In addition or alternatively, the first detector 1728 can capture and/or detect one or more images, image data, and/or signals associated with light absorbed by analytes, standards, etc. The images and/or data can then be analyzed to determine molecular weight-based data, electrophoretic mobility, size-based data, and/or morphological data associated with the analytes in the sample.

In a similar manner, the system 1000 can be set, programed, and/or otherwise placed in a configuration to perform capillary electrophoresis and/or to detect a signal of one or more analytes included in a sample that has be separated and/or focused within the capillary 1530 of the cartridge 1500 (in this instance, configured for use in isoelectric focusing) when the cartridge 1500 is retained by the cartridge retainer 1400. In such instances, a user can insert the cartridge 1500 (in this instance, configured for use in isoelectric focusing) into the cartridge retainer 1400 in the single, predetermined orientation, as described above. Thus, by aligning the detection assembly 1700 with the cartridge retainer 1400 (e.g., such that the second emitter 1751 and the second detector 1760 are aligned with, for example, a second set of openings) and with the cartridge retainer 1400 retaining the cartridge 1500 in a predetermined, fixed position, the second emitter 1751 and the second detector 1760 can be aligned with, for example, a portion of the capillary 1530 of the cartridge 1500. Therefore, the second emitter 1751 can emit energy or photons that is/are directed to a predetermined portion of the capillary 1530 (e.g., a predetermined length or corresponding column of the capillary 1530).

In some instances, the second emitter 1751 and the second detector 1760 can collectively capture "full-column" images and/or perform "full-column" detection of the sample within the capillary 1530. Similarly stated, the second emitter 1751 and the second detector 1760 can be operable to capture and/or detect more than a single-point along the capillary 1530. For example, the second emitter 1751 and the second detector 1760 can be operable to capture a sufficient length to visualize separation and/or focusing of analytes during the electrophoresis process. The second emitter 1751, the second detector 1760 and, optionally additional optical components, can be operable to define an optical path with a length of about 1 cm, about 3 cm, about 5 cm, about 10 cm, about 20 cm, about 50 cm, or any other suitable length of the capillary 1350. In addition or alternatively, the second emitter 1751 and the second detector 1760 can be operable to capture native fluorescence, label fluorescence, and/or absorbance of analytes, standards, and so forth within the capillary 1530. For example, a filter wheel (not shown in FIG. 1) can be operable to change the optical signal presented to the second detector 1760 while analytes are being separated and/or focused within the capillary 1530. Thus, during a single run, a sample can be characterized for native fluorescence, label fluorescence, absorbance, and/or any other suitable optical characteristic along the full-column while the analytes separate and/or are focused.

As described above, a volume of a mixture (e.g., one or more reagents, samples, buffers, washes, detectors, analytes, ampholytes, antibodies, labels, and/or the like) can be drawn into the capillary 1530 in response to a negative pressure differential produced by the vacuum source. With the system 1000 configured to perform isoelectric focusing, however, once a desired volume of sample or other desired fluid is drawn into the capillary 1530, the cartridge retainer 1400 and/or any other suitable portion of the system 1000 can engage a portion of the cartridge 1500 to, for example, transition a pinch valve or the like to a closed position, which in turn, limits and/or substantially prevent a bulk flow of fluid through the capillary 1530. Moreover, the system 1000 can apply an electric field to an electrically conductive portion of the cartridge 1500 (e.g., fluid within the capillary 1530 and/or the capillary 1530, as described above). Thus, electrical current can flow along the capillary 1530 separating analytes in the mixture are separated by isoelectric point gradient (e.g., along a length of each capillary). Optionally, in some embodiments, once the molecules are sufficiently separated and/or focused, the system 1000 can be configured to immobilize the molecules within the capillaries of the cartridge 1500. For example, the second emitter 1751 can emit energy or photons (e.g., a column of light or fluorescence) that is/are directed to a predetermined portion of the capillary 1530 (e.g., a predetermined length or corresponding column of the capillary 1530) such that the volume of separated sample or mixture within the corresponding column of the capillary 1530 is illuminated, energized, and immobilized within the capillary 1530.

With the sample components (e.g., comprising one or more analytes) separated, the separated analyte(s) and/or standard(s) included in the sample are probed with one or more reagents, which can include a detection agent (e.g., any suitable agent, reagent, analyte-specific antibody, HRP-conjugated secondary antibody, and/or the like or any combination thereof, as described in detail above). The detection reagent is then used to create a signal from one or more label moieties (e.g., isotopic labels, immune labels, optical dyes, enzymes, particles or combination of particles such as chemiluminescent-labeled antibodies, fluorescent-labeled antibodies, and/or the like), which in turn, is captured or detected by the second detector 1760. In other embodiments, native fluorescence and/or absorbance characteristics of analytes can create a signal captured by the second detector 1760. For example, an analyte (e.g., a protein and/or a portion of a protein, such as constituent tryptophan amino acids) can be excited by the second emitter 1751 and detected by the second detector 1760. In other instances, a decrease in light emitted from the second emitter 1751 characteristic of analyte absorbance peaks can be detected by the second detector 1760. In this manner, the system 1000 can be used to at least semi-automatically perform a molecular weight analysis and/or isoelectric focusing.

While described above as immobilizing the molecules in the sample, in other embodiments, the system 1000 need not immobilize the molecules within the sample. For example, after the sample is separated and/or focused, the first detector 1728 and/or the second detector 1760 can capture a final image of the capillary 1530 and/or can detect molecules in the sample before the sample is washed into a waste receptacle, and/or the sample is recaptured or otherwise disposed of. In such an embodiment, the cartridge 1500 may be reusable such that a subsequent sample can be separated and/or focused using the same cartridge 1500 and/or capillary 1530.

FIGS. 2-44 illustrate a system 2000 configured to perform a capillary electrophoresis such as molecular weight and/or isoelectric focusing measurements, according to an embodiment. The system 2000 includes a housing 2100 and/or support structure (FIGS. 2-8), an electronics assembly 2200 (FIG. 8), a reagent assembly 2300 (FIGS. 9-13), a cartridge retainer 2400 (FIGS. 14-20), and an optics assembly 2700 (FIGS. 20-28). The system 2000 is configured to receive a cartridge, such as a molecular weight cartridge 2500' (FIGS. 29-37) and/or an isoelectric focusing cartridge 2500" (FIGS. 38-44). As described in further detail herein, the system 2000 can at least semi-automatically characterize analytes within a sample by molecular weight and/or isoelectric point. The system 200 can be operable to draw a sample (e.g., including any suitable agent, reagent, protein, analyte, buffer, lysate, and/or any other material described herein) into one or more capillaries of the cartridge 2500' and/or 2500" (generically referred to herein as "cartridge 2500" (see e.g., FIG. 7)) and imaging a volume of the sample as it flows therethrough. In addition, the system 2000 can at least semi-automatically separate the sample (via capillary electrophoresis), image the sample during and/or after the separation, for example, via full-column detection.

Figure 2:
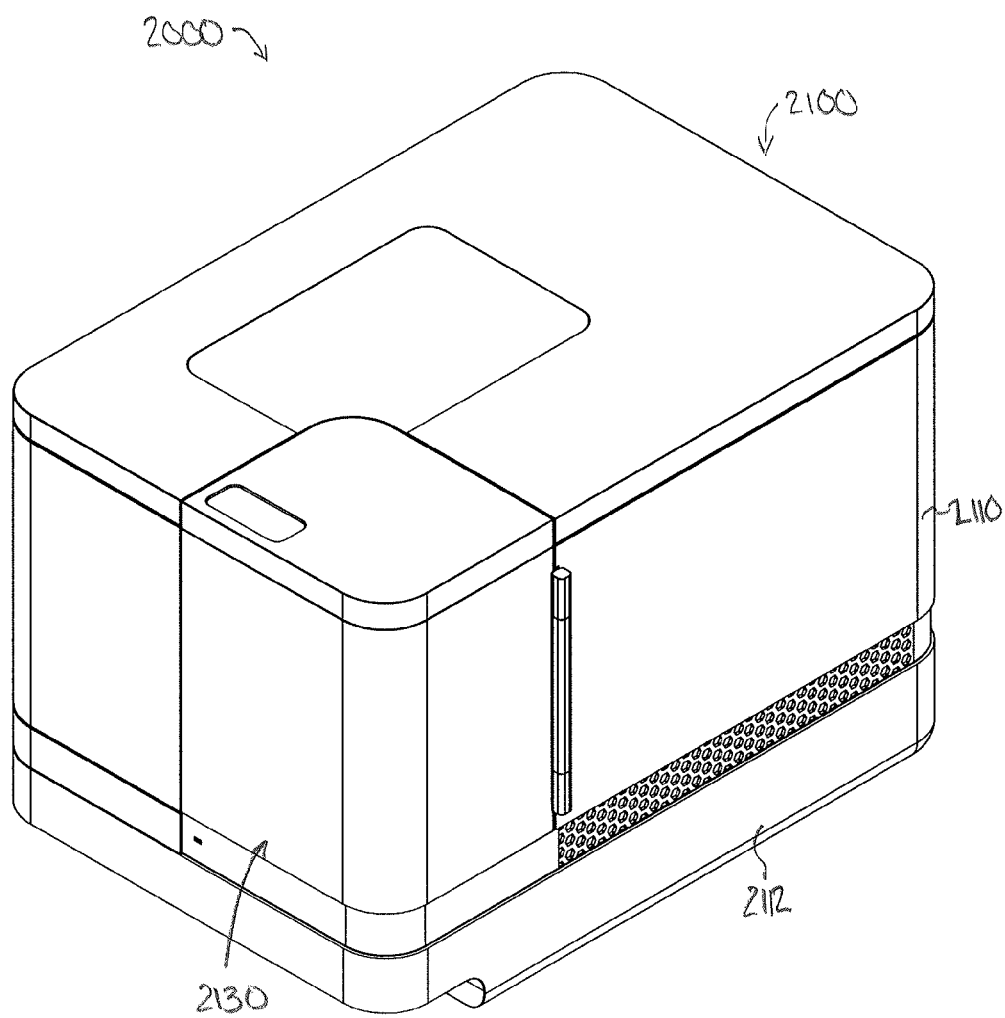
FIG. 2 is a perspective view of a system configured to perform capillary electrophoresis and/or image analytes separated by capillary electrophoresis, according to an embodiment.

As shown in FIGS. 2-8, the housing 2100 and/or support structure (referred to henceforth as "housing") can be any suitable shape, size, and/or configuration and can be arranged to at least partially enclose or at least partially support any suitable component of the system 2000. The housing 2100 includes a cover 2110, a base 2112, a theater cover 2114, a frame 2120, a door 2130, and a door retention assembly 2140. As shown in FIG. 2, the cover 2110 is coupled to the base 2112 to collectively cover, house, and/or otherwise enclose at least a portion of the system 2000.

Figure 3:
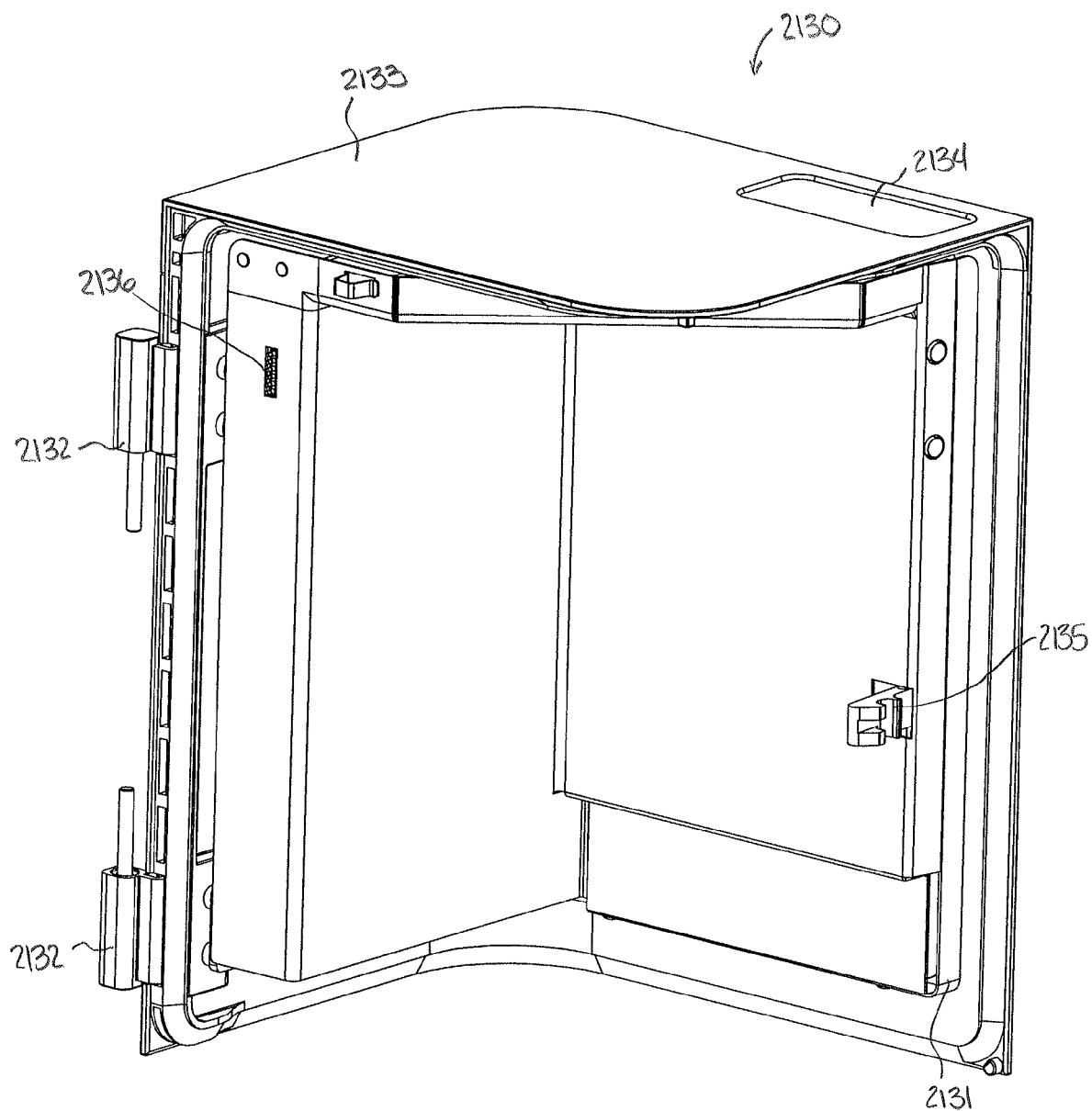
FIGS. 3 and 4 are a perspective view and an exploded view, respectively, of a door assembly included in a housing of the system illustrated in FIG. 2.
Figure 4:
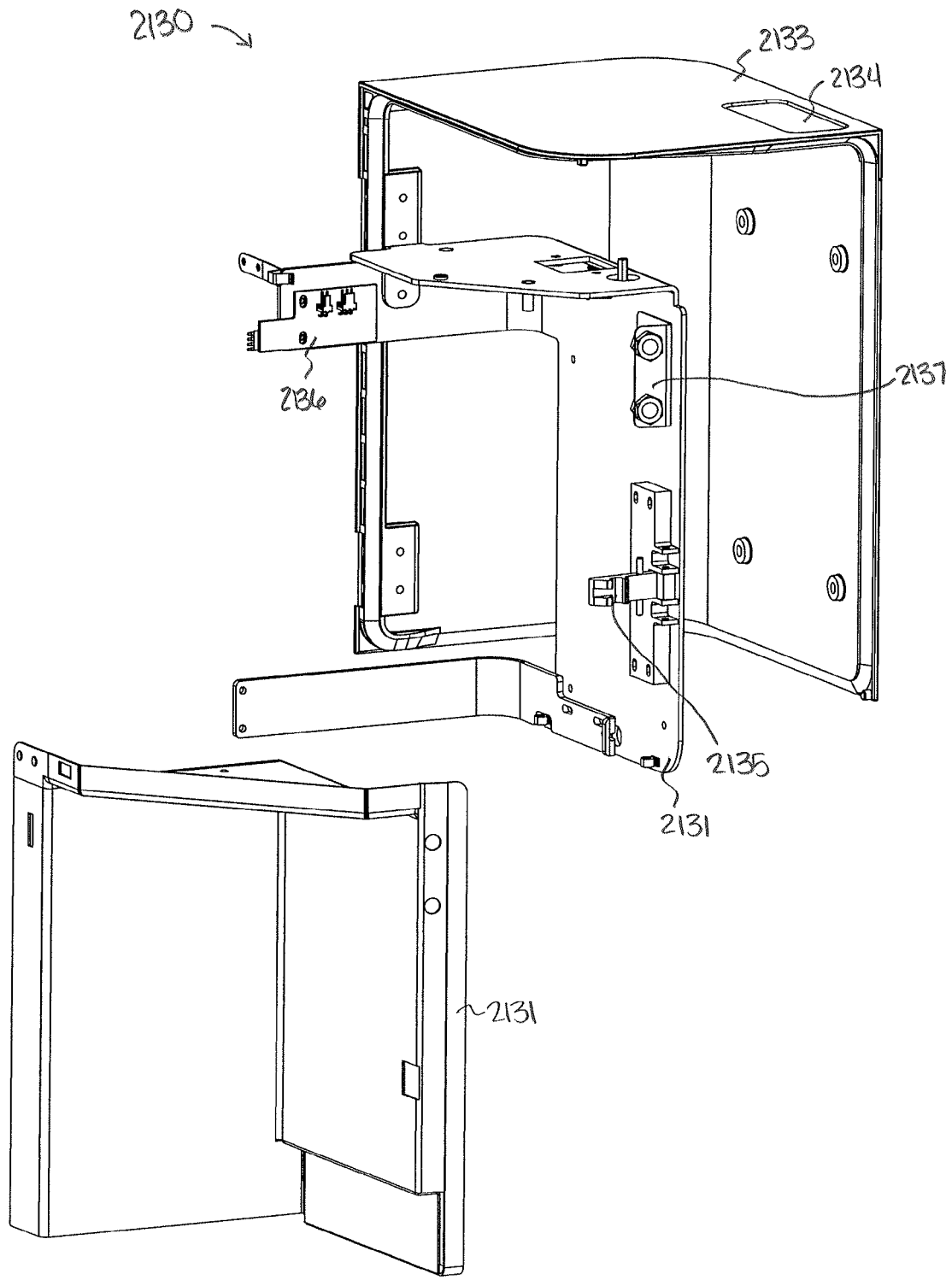
Figure 5:
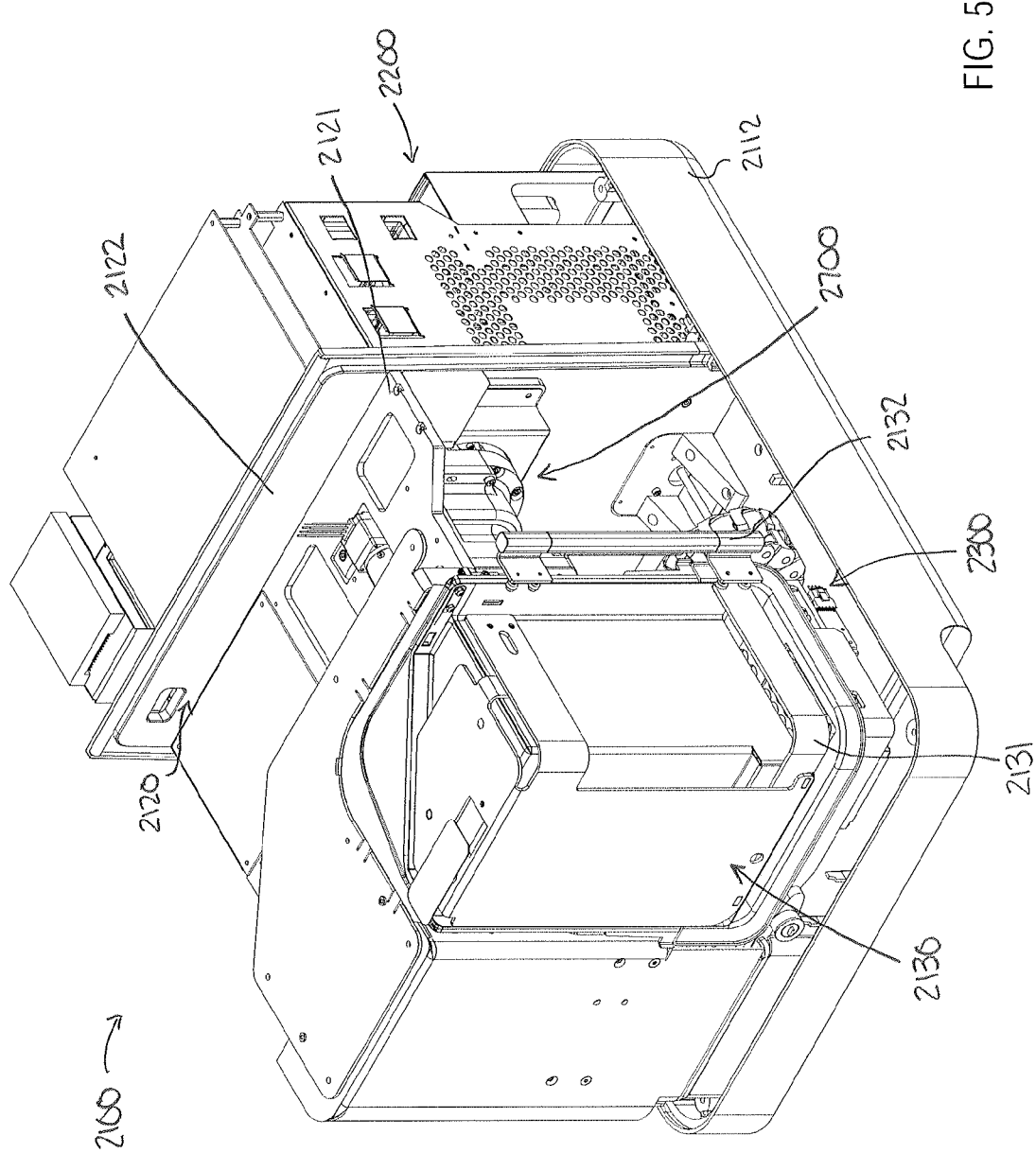
FIGS. 5 and 6 are front perspective views of a portion of the system illustrated in FIG. 2, shown without a portion of the housing and with the door assembly of FIG. 3 in an open configuration and a closed configuration, respectively.

The door 2130 of the housing 2100 is coupled to the cover 2110 and/or a portion of the frame 2120 and can be moved relative to the cover 2110 between a closed configuration and an open configuration to isolate or gain access to, respectively, portions of the system 2000 disposed within the cover 2110. As shown in FIGS. 3 and 4, the door 2130 of the housing 2100 includes a door frame 2131, a hinge 2132, a door cover 2133, a handle 2134, a latch 2135, a sensor 2136, and a sensor plate 2137. The door frame 2131 supports the door 2130 and provides structural rigidity thereto. The hinge 2132 is coupled to the door frame 2131 and a portion of the frame 2120 of the housing 2100. The hinge 2132 can include, for example, a first portion that is rotatably coupled to a second portion. In this manner, the first portion and/or the second portion can be configured to rotate and/or pivot about an axis (not shown) to transition the door 2130 between the closed configuration (e.g., FIG. 5) and the open configuration (e.g., FIG. 6).

The door cover 2133 is disposed about the door fame 2131. In some embodiments, the door cover 2133 can be opaque and configured to limit an amount of light allowed into an inner volume defined by the cover 2110. In other embodiments, the door cover 2133 can include a viewing window and/or the like configured to allow a user to visualize a portion of the system 2000 disposed within the cover 2110. The handle 2133 of the door 2110 is operatively coupled to the latch 2135 and can be manipulated by a user to transition the latch 2135 between a first configuration (e.g., a latched or locked configuration) and a second configuration (e.g., an unlatched or unlocked configuration). The latch 2135 is configured to selectively engage the door retention assembly 2140 to selectively prevent movement of the door 2130 relative to the cover 2110. The sensor 2136 is configured to sense and/or detect a relative position of the door 2130, as described in further detail herein.

Figure 6:
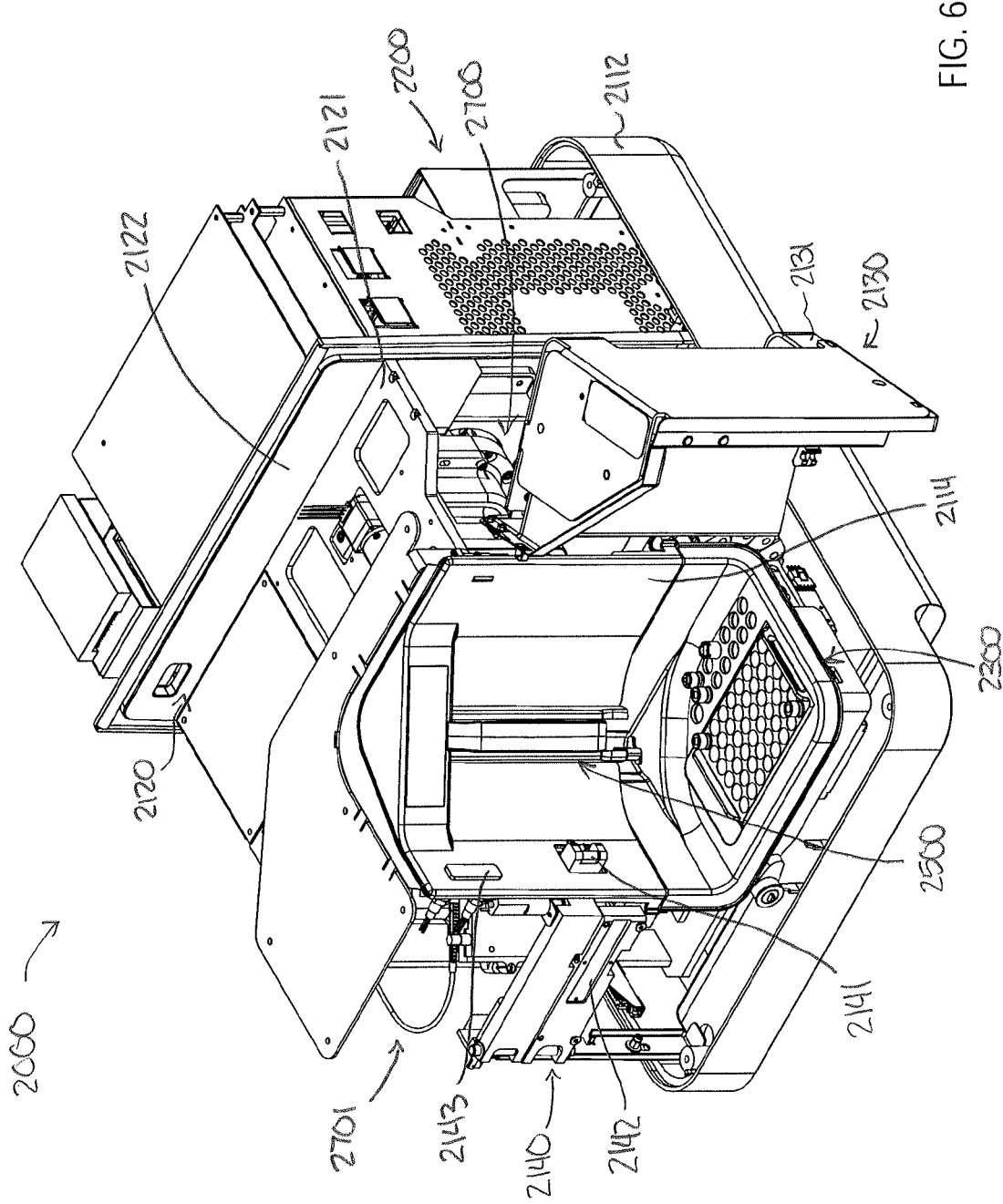
Figure 7:
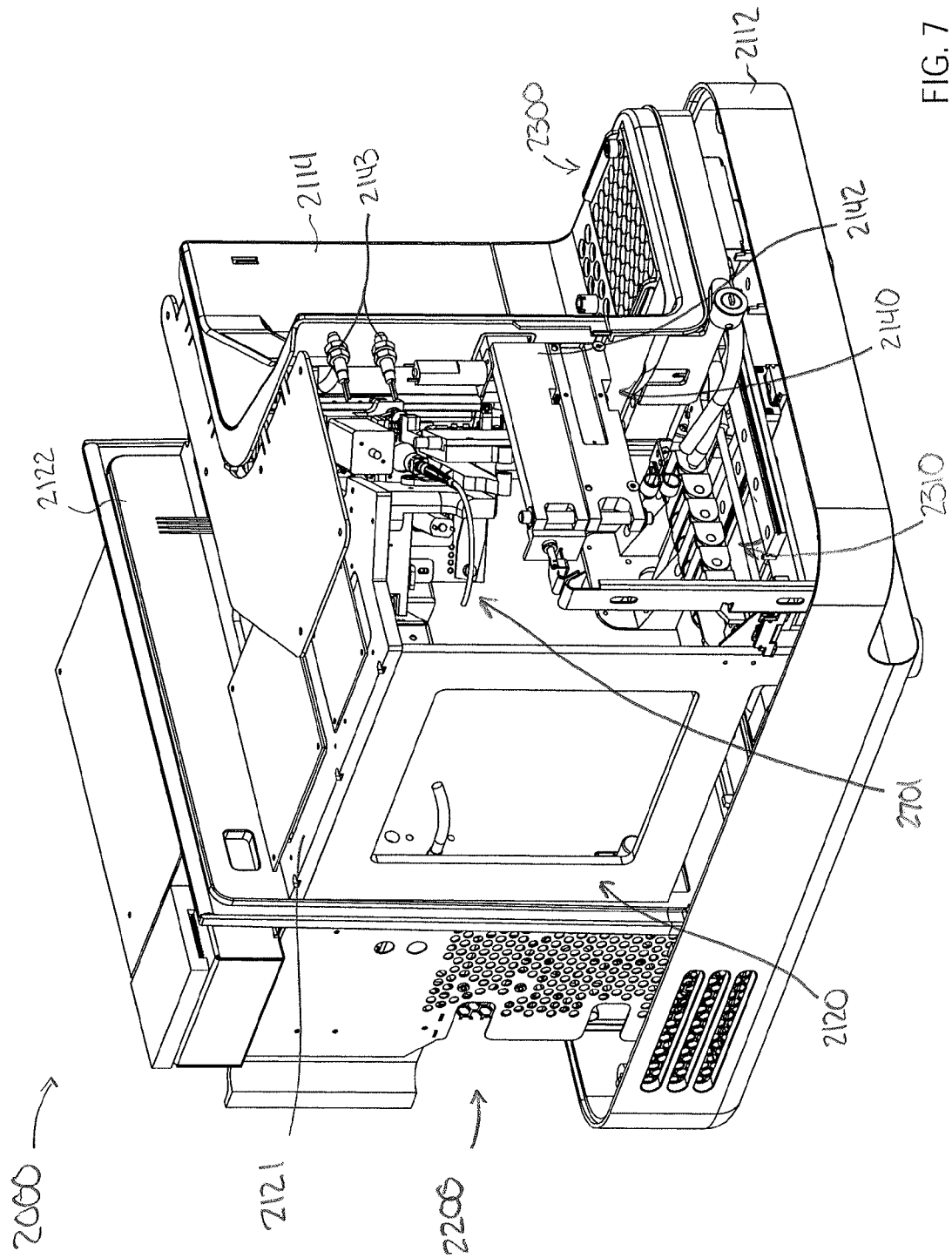
FIGS. 7-9 are various perspective views, each of which illustrates different portions of the system illustrated in FIG. 2.

As shown, for example, in FIGS. 6 and 7, the door retention assembly 2140 includes release mechanism 2141 and one or more actuators 2142. The release mechanism 2141 is configured to selectively engage the latch 2135 of the door 2130 to selectively retain the latch 2135 in a fixed position (e.g., at least temporarily retain the door 2130 in the closed configuration). The actuator 2142 can be any suitable actuator or the like configured to transition the release mechanism 2141 between a first configuration in which the release mechanism 2141 engages the latch 2135 and a second configuration in which the release mechanism 2141 disengages the latch 2135. For example, in some embodiments, the actuator 2142 can be an electromechanical actuator or the like configured to mechanically move a portion of the release mechanism 2141 in response to a signal or instructions received, for example, from the electronics assembly 2200 or other controller.

The door retention assembly 2140 further includes one or more proximity sensors 2143 configured to detect a relative position of the door 2130. For example, in some embodiments, the one or more proximity sensors 2143 can be configured to detect the proximity of and/or detect contact with a portion of the sensor plate 2137 of the door 2130. In this manner, the sensor 2136 of the door 2130 and the proximity sensors 2143 of the door retention assembly 2140 can collectively sense and/or detect a position and/or configuration of the door 2130 relative to, for example, the cover 2110 and/or other portions of the housing 2100. Moreover, in some instances, the sensors 2136 and/or 2143 can be configured to send a signal to, for example, the electronics assembly 2200 and/or other control device associated with the position and/or configuration of the door 2130, which in turn, can activate a portion of the system 2100 (e.g., when the door 2130 is in the closed configuration) and/or prevent a portion of the system 2100 from being activated (e.g., when the door 2130 is in the open configuration).

The frame 2120 is configured to support one or more portions of the system 2100. For example, the frame 2120 includes at least an optics support member 2121 configured to support at least a portion of the optics assembly 2700 and an electronic assembly support member 2122 configured to support at least a portion of the electronics assembly 2200 and/or the optics assembly 2700. The theater cover 2114 is coupled to the frame 2120 and is configured to at least partially isolate a portion of the system 2100 (see e.g., FIGS. 6 and 7). In some embodiments, the theater cover 2114 can be a shield or the like configured to block, limit, and/or substantially prevent a portion of the system 2000 from undesired exposure to light (e.g., from outside of the cover 2110.

Figure 8:
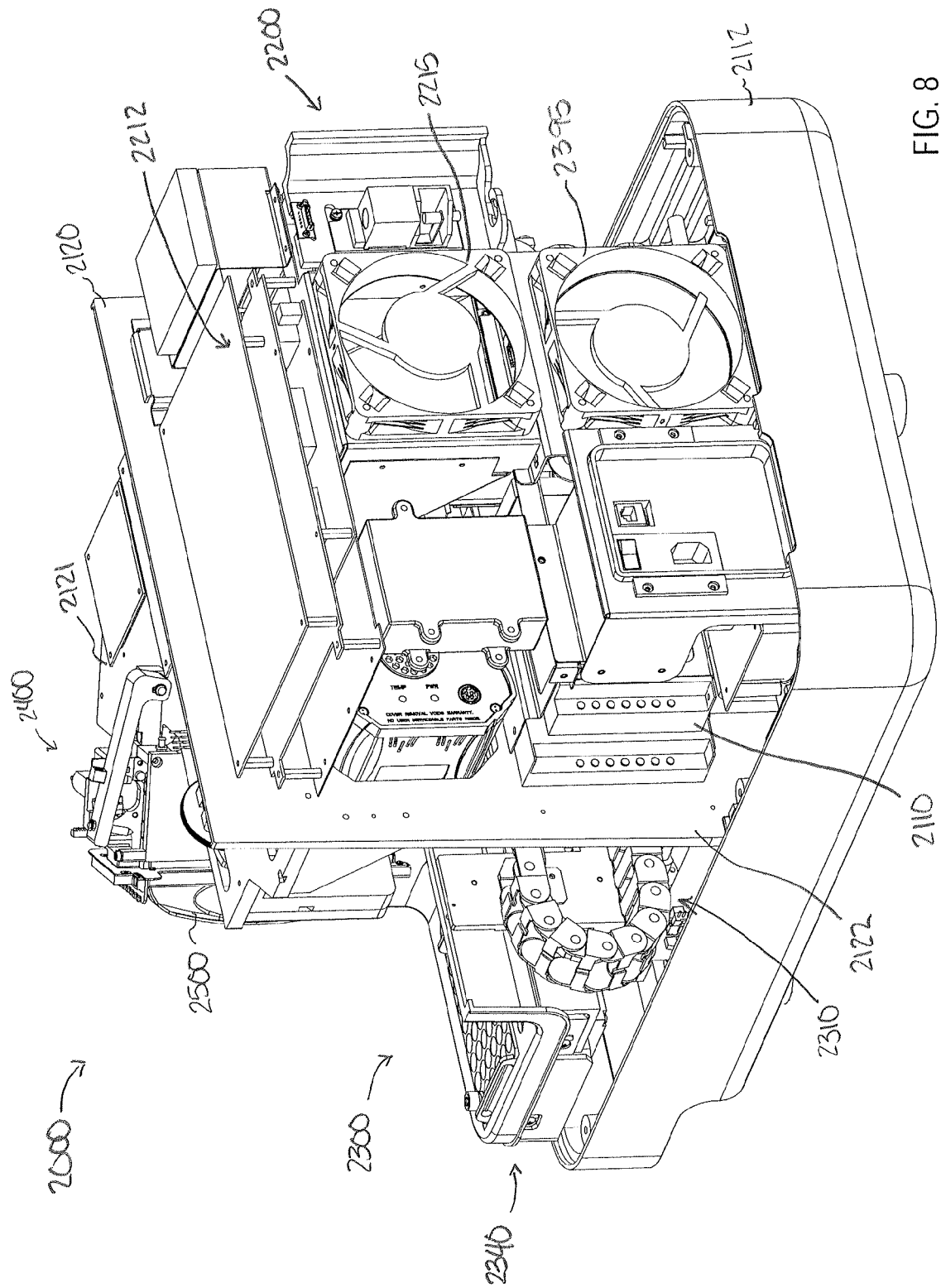
Figure 9:
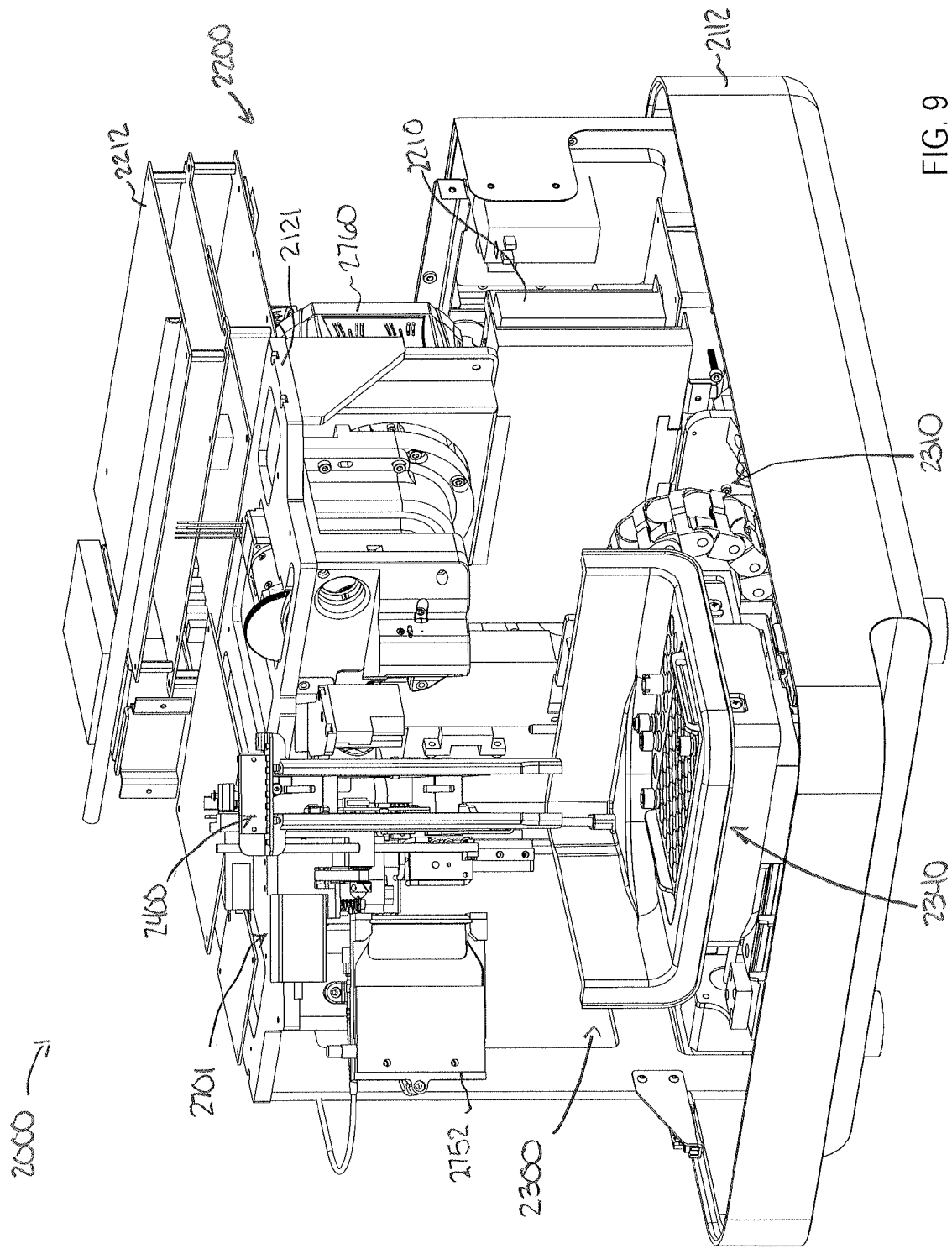

The electronics assembly 2200 can be any suitable configuration and can include any suitable component to enable the electronics assembly 2200 to at least partially control the system 2000. For example, as shown in FIG. 8 the electronics assembly 2200 includes at least a power source 2210, a printed circuit board assembly (PCBA) 2212, and one or more fans 2215 configured to cool the components of the electronics assembly 2200. As described in further detail herein, the PCBA 2212 is in electrical communication with one or more system components such as, for example, pumps, lights, cameras, detectors, motors, sensors, auxiliary PCBAs, and/or any other suitable device. Although not shown in FIG. 8, the power source 2210 can be electrically connected to an external electrical circuit (e.g., "plugged in") to receive a flow of current from a power grid. In turn, the power source 2210 can condition, transform, and/or convert the flow of current prior to being delivered to the electronic PCBA 2212 (e.g., converted from alternating current (AC) to direct current (DC)). Moreover, the power source 2210 can be configured to supply a flow of electrical current to one or more pumps, motors, actuators, lights, detectors, cameras, sensors, and/or the like, as described in further detail herein.

The PCBA 2212 can include any suitable electronic device or component. For example, the PCBA 2212 includes at least a memory and a processor (not shown). The memory can be, for example, a random access memory (RAM), a memory buffer, a hard drive, a read-only memory (ROM), an erasable programmable read-only memory (EPROM), and/ or so forth. In some embodiments, the memory can stores instructions to cause the processor to execute modules, processes, and/or functions associated with controlling at least a portion of the system 2000. The processor can be any suitable processing device that can run and/or execute a set of instructions or code. For example, the processor can be a general purpose processor, a central processing unit (CPU), an accelerated processing unit (APU), an application specific integrated circuit (ASIC), and/or the like. The processor can run and/or execute a set of instructions or code stored in the memory associated with controlling at least a portion of the system 2000. For example, the processor can execute a set of instructions or code stored in the memory associated with controlling one or more pumps, motors, actuators, sensors, lights, cameras, etc. Furthermore, the processor can execute a set of instructions or code stored in memory associated with sending a flow of current to a portion of the cartridge assembly 2500 to initiate and/or perform electrophoresis, as described in further detail herein.

Figure 10:
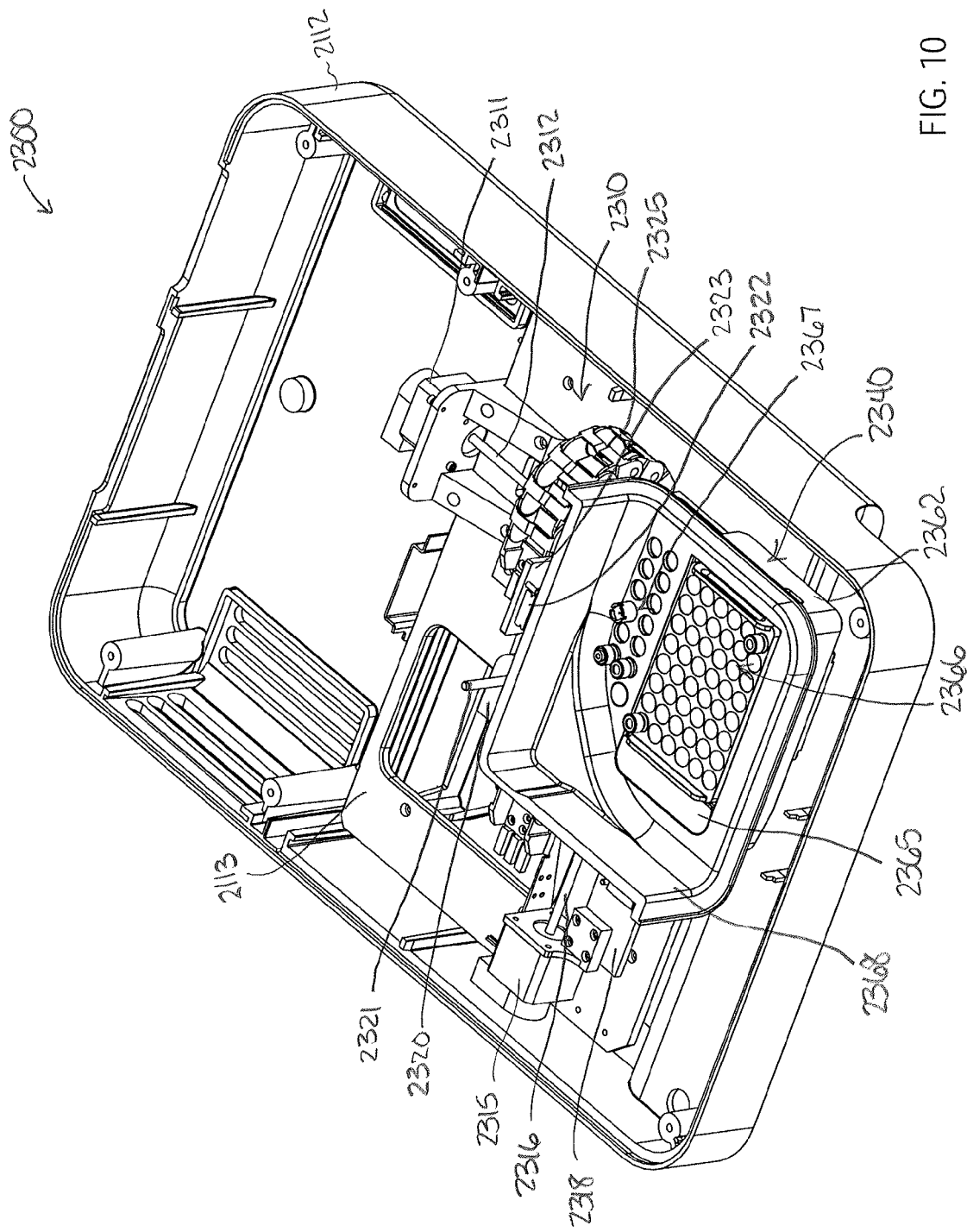
FIGS. 10 and 11 are a front perspective view and a rear perspective view, respectively, of a reagent assembly and a portion of the housing of the system illustrated in FIG. 3.
Figure 11:
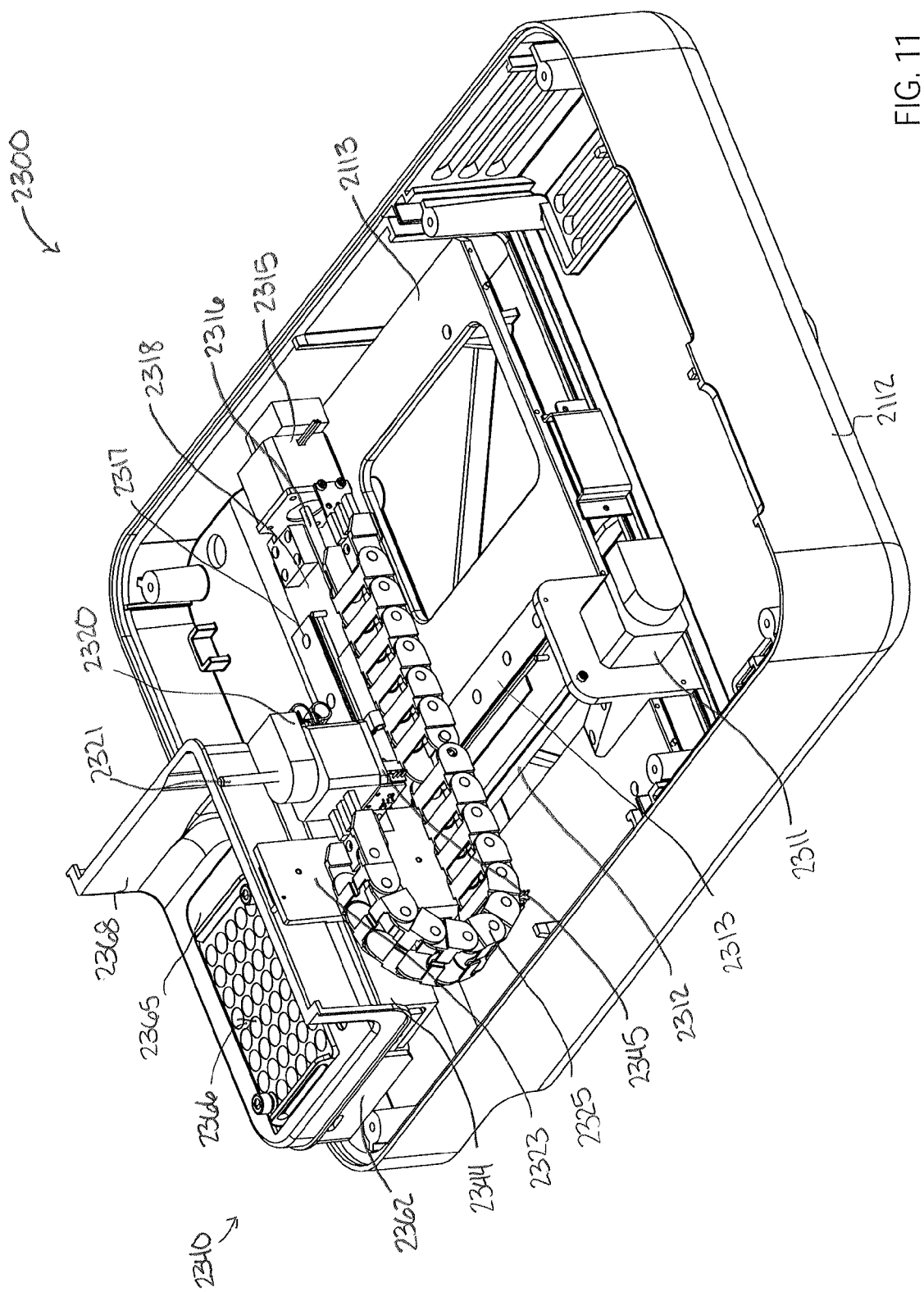

As shown in FIGS. 9-13, the reagent assembly 2300 of the system 2000 includes at least a drive portion 2310 and a tray portion 2340. The drive portion 2310 is configured to move the tray portion 2340 of the reagent assembly 2300 in response to one or more signals received from, for example, the electronics assembly 2200. As shown in FIGS. 10 and 11, the drive portion 2310 includes a first motor 2311 coupled to a first drive screw 2312, a second motor 2315 coupled to a second drive screw 2316, and a third motor 2320 coupled to a third drive screw 2321. The drive portion 2310 further includes a first slide track 2313, a second slide track 2317, and a third slide track 2322. The first motor 2311 is fixedly coupled to a base plate 2113, which in turn, is coupled to a portion of the frame 2120 to support at least the drive portion 2310 of the reagent assembly 2300. In other words, the first motor 2311 is coupled to the base plate 2113 and maintained in a substantially fixed position.

Although not shown in FIGS. 9-13, the first slide track 2313 is configured to slidably receive a slide block. For example, in some embodiments, the first slide track 2313 can include one or more grooves, channels, slots, tracks, etc. configured to receive and/or slidably engage a portion of the slide block (not shown). The slide block, in turn, is coupled to a slide plate 2318. In other embodiments, the slide block and slide plate 2318 are monolithically or unitarily formed. In addition, the slide plate 2318 is coupled to an end portion of the first drive screw 2312. For example, in some embodiments, the slide plate 2318 can include and/or can be coupled to (e.g., via one or more mechanical couplers, a weld, an adhesive, and/or the like) a mounting plate or bracket, which in turn, forms a threaded coupling with the first drive screw 2312. As such, when the first motor 2311 is activated, an output of the first motor 2311 rotates the first drive screw 2312 relative to the mounting plate or bracket of the slide plate 2318 and thus, moves the slide plate 2318 in a linear direction along a length of the first slide track 2312 (e.g., closer to or further from the first motor 2311), as described in further detail herein.

The second motor 2315 and the second slide track 2317 of the drive portion 2310 are each coupled to the slide plate 2318. More specifically, the second slide track 2317 is coupled to and/or otherwise included in the slide plate 2318 and extends along a length of the slide plate 2318 in a direction perpendicular to the first slide track 2313. As described above with reference to the first slide track 2313, the second slide track 2317 is configured to slidably receive a slide block (not shown), which in turn, is coupled to a slide bracket 2323. The slide bracket 2323 is further coupled to an end portion of the second drive screw 2316. As such, when the second motor 2315 is activated, an output of the second motor 2315 rotates the second drive screw 2316 relative to the slide bracket 2323 and thus, moves the slide bracket 2323 in a linear direction along a length of the second slide track 2316 (e.g., closer to or further from the second motor 2315), as described in further detail herein.

Figure 12:
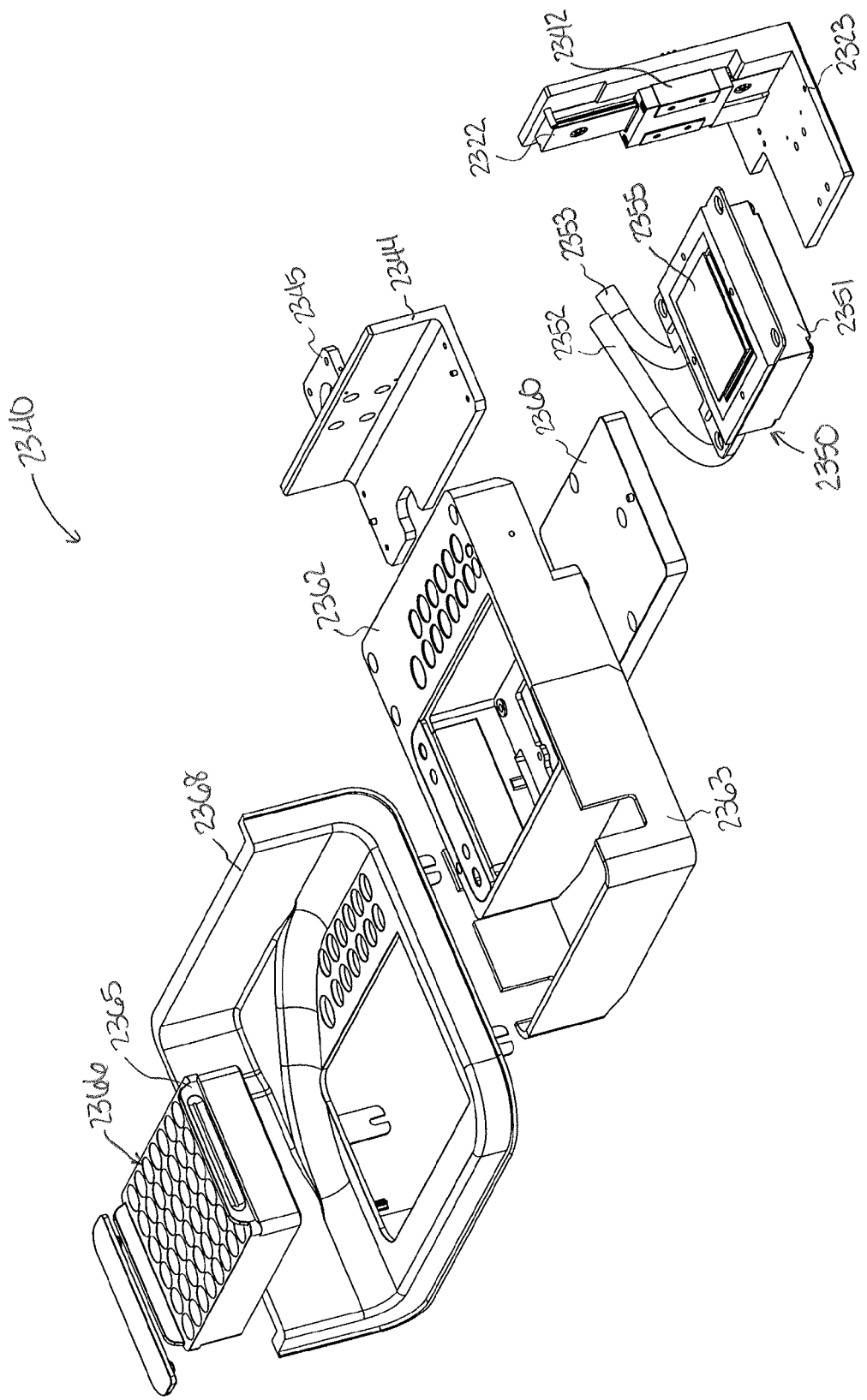
FIG. 12 is an exploded view of a tray portion of the reagent assembly illustrated in FIG. 10.

The third slide track 2322 is coupled to the slide bracket 2323 and is configured to extend along a length of the slide bracket 2323 in a direction perpendicular to each of the first slide track 2313 and the second slide track 2316, as shown in FIGS. 10 and 12. As described above with reference to the first slide track 2313 and the second slide track 2316, the third slide track 2322 is configured to slidably receive a slide block 2342 (FIG. 12), which in turn, is coupled to a mounting plate 2344 of the tray portion 2340. The third motor 2320 is coupled to a motor mount 2345 of the mounting plate 2344 such that an end portion of the third drive screw 2321 extends through the motor mount 2345 to be rotatably coupled to the slide bracket 2323. As shown in FIGS. 10 and 11, the third drive screw 2321 extends in a direction substantially parallel to the third slide track 2322 (e.g., in a direction normal to the base plate 2113 and/or perpendicular to both the first drive screw 2312 and the second drive screw 2316). When the third motor 2320 is activated, an output of the third motor 2320 rotates the third drive screw 2321 relative to the third motor 2320 and, as such, the third motor 2320 is moved along a length of the third drive screw 2321. Therefore, with the third motor 2320 coupled to the mounting plate 2344, the movement of the third motor 2320 along a length of the third drive screw 2321 results in the mounting plate 2344 (and the slide block 2342) being moved in a linear direction along a length of the third slide track 2322 (e.g., closer to or further from the slide plate 2318).

The arrangement of the drive portion 2310 is such that, in response to one or more signals from the electronic assembly 2200, the drive portion 2310 can move the tray portion 2340 of the reagent assembly 2300 in any suitable direction along a plane parallel to the base plate 2113 as well as in a direction perpendicular or normal to that plane. In other words, the drive portion 2310 can move the tray portion 2340 in an X-direction, a Y-direction, and a Z-direction. Moreover, by coupling the second motor 2315 to the slide plate 2318, which is movably coupled to the first slide track 2313, and coupling the third motor 2320 to the mounting plate 2344, which is movably coupled (at least indirectly) to the second slide track 2316 and the third slide track 2322, the drive portion 2310 can be configured to activate the first motor 2311, the second motor 2315, and the third motor 2322 concurrently to move the tray portion 2340 in any suitable direction within the X-Y plane, the X-Z plane, and/or the Y-Z plane. As shown in FIGS. 10 and 11, the drive portion 2310 also includes a cable track 2325 that can receive one or more wires and/or conduits. In this manner, the one or more wires and/or conduits can move relative to the slide plate 2318 and the slide bracket 2323 (e.g., within and/or concurrently with the cable track 2325) in response to an activation of the first motor 2311, the second motor 2315, and/or the third motor 2320.

The tray portion 2340 of the reagent assembly 2300 can be any suitable shape, size, and/or configuration. As shown in FIG. 12, the tray portion 2340 includes the mounting plate 2344, a chiller 2350, a cold block 2360, a tray holder 2362, a reagent tray 2365, and a shroud 2368. Each of the chiller 2350, the cold block 2360, the reagent tray 2365, and the shroud 2368 is coupled to the tray holder 2362, which in turn, is coupled to and/or otherwise supported by the mounting plate 2344. Therefore, with the mounting plate 2334 coupled to the slide block 2342 (as described above), the mounting plate 2344 and the slide block 2342 slidably couple the tray portion 2340 of the reagent assembly 2300 to the drive portion 2310 of the reagent assembly 2300. In some embodiments, the drive portion 2310 can place the tray portion 2310 in a default or otherwise predetermined position when the system 2000 in not in use and/or prior to or after moving the tray portion 2310. In some embodiments, the shroud 2368 can be coupled to the tray holder 2362 such that the at least a portion of the shroud 2368 is substantially aligned with an associated portion of the theater cover 2114 (see e.g., FIG. 6). In this manner, the shroud 2368 and the theater cover 2114 can collectively isolate a portion of the system 2000 within the housing 2100.

The reagent tray 2365 is configured to be at least temporarily coupled to the tray holder 2362. For example, the reagent tray 2365 can be removably coupled to the tray holder 2362, which can allow a user to remove and/or replace the reagent tray 2365 (e.g., for cleaning or the like). The reagent tray 2365 can be coupled to the tray holder 2362 such that a surface of the reagent tray 2365 is in contact with a surface of the cold block 2360, as described in further detail herein. The reagent tray 2365 can be any suitable tray or the like. For example, the reagent tray 2365 can hold and/or otherwise define a set of wells 2366 configured to receive any suitable solution, fluid, gel, lysate, buffer, sample, analyte, ampholyte, agent, reagent, protein, matrix, and/or the like. In other embodiments, the wells 2366 can receive one or more vials 2367 or the like that can contain any of the samples and/or mixtures described herein. The wells 2366 can be any suitable shape, size, or configuration and can be disposed in any suitable arrangement. For example, the wells 2366 can be well plates, microwell plates, and/or the like. As shown in FIG. 12, the reagent tray 2365 includes forty-two wells 2366. In other embodiments, a reagent tray can include any number of wells (e.g., more than forty-two wells or less than forty-two wells). In some embodiments, the reagent tray 2365 is removably coupled to the tray holder 2362 such that a reagent tray having any suitable number and/or arrangement of wells can be at least temporarily coupled to the tray holder 2362. Moreover, the drive portion 2310 of the reagent assembly 2300 can move the tray portion 2340 within the housing 2100 to selectively place one or more wells 2366 of the reagent tray 2365 in fluid communication with a portion of the cartridge retainer 2400 and/or the cartridge 2500 disposed within the cartridge retainer 2400, as described in further detail herein.

Figure 13:
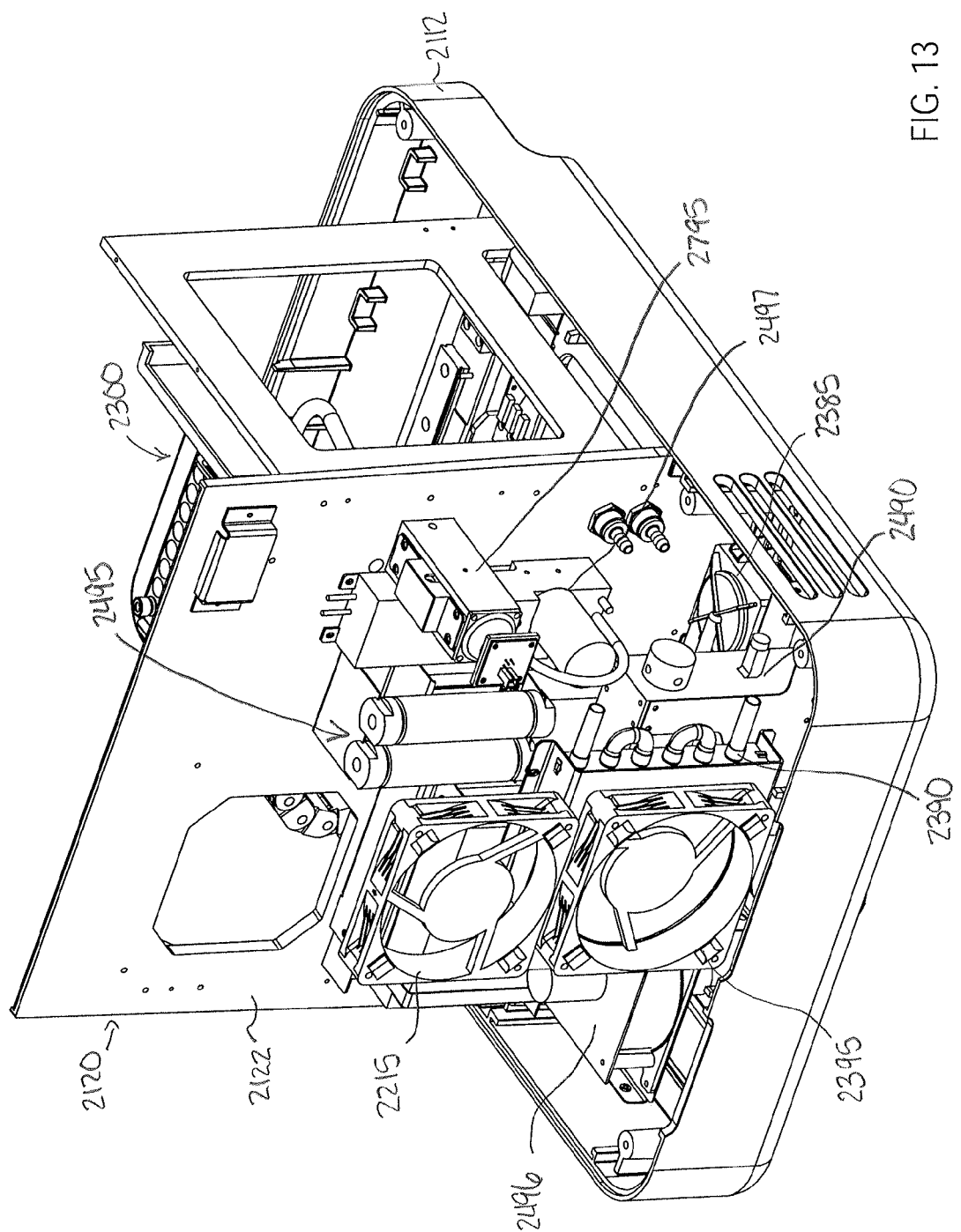
FIG. 13 is a rear perspective view illustrating a portion of the system illustrated in FIG. 2.

The chiller 2350 of the tray portion 2340 is coupled to the tray holder 2362. The chiller 2350 can be any suitable device, mechanism, assembly, and/or the like that is configured to transfer thermal energy to or from the chiller 2350. For example, as shown in FIG. 12, the chiller 2350 includes a fluid block 2351 and a thermoelectric chilling device 2355. The fluid block 2351 has an inlet 2352 configured to receive an inlet flow of fluid into the fluid block 2351 and an outlet 2353 configured to receive an outlet flow of fluid from the fluid block 2351. As shown in FIG. 13, the fluid block 2351 is fluidically coupled to a pump 2385, which in turn, is fluidically coupled to a heat exchanger 2390 (e.g., a shell and tube heat exchanger, radiator, and/or the like). In this manner, the pump 2385 can receive a flow of relative hot or heated fluid (e.g., water, coolant, and/or the like) from the outlet 2353 of the fluid block 2351 and can pump a volume of the fluid into the heat exchanger 2390. The heat exchanger 2390 includes and/or is coupled to a fan 2395 configured to supply a flow of a bulk fluid (e.g., air) across an outer surface(s) of the heat exchanger 2390, thereby removing thermal energy from the fluid flowing within the heat exchanger 2390. The relative cold or cooled fluid can then flow into the inlet 2352 of the fluid block 2351. As such, the fluid flowing through the fluid block 2351 can be configured to transfer thermal energy from or to the fluid block 2351.

The thermoelectric chilling device 2355 (also referred to herein as "chilling device") can be any suitable chilling device such as, for example, a Peltier device and/or the like configured to produce a temperature gradient in response to an electric input (e.g., a voltage or change in voltage). In some embodiments, the chilling device 2355 has a hot surface in at least thermal communication with the fluid flowing through the fluid block 2351 and a cold surface in at least thermal communication with the cold block 2360. As such, the chilling device 2355 can receive a flow of electric current (e.g., from the power source 2210 of the electronic assembly 2200) that is operable to produce the temperature gradient between the cold surface and the hot surface of the chilling device 2355. Therefore, with the cold block 2360 in contact with the reagent tray 2365 (as described above), thermal energy can be transferred from the reagent tray 2365 to the cold surface of the chilling device 2355 via the cold block 2360, through the chilling device 2355, and to the fluid flowing within the fluid block 2351. At least a portion of the thermal energy is then removed from the fluid as the fluid flows through the heat exchanger 2390, as described above. Thus, the tray portion 2340 of the reagent assembly 2300 can cool, chill, and/or otherwise regulate a sample and/or other mixture within the reagent tray 2365.

Alternatively, the hot surface of the chilling device 2355 can be in thermal communication with the cold block 2360 and the cold surface of the chilling device 2355 can be in thermal communication with the fluid through the fluid block 2351 such that the chilling device is operable to transfer thermal energy to the reagent tray 2365 (e.g., operable to function as a heater). For example, by changing the polarity of a voltage applied to the chilling device 2355, the chilling device 2355 can be operable to alternate between a heating device and a cooling device. In some instances, a controller, such as a proportional-integral-derivative (PID) controller can be operable to vary the polarity, duty cycle, duration, electric potential, etc. supplied to the chilling device 2355 to maintain the temperature of the reagent tray 2365 within a particular temperature range. In some embodiments, such a controller can be and/or can include a set of instructions stored in the memory and executed in the processor of the PCBA 2212 of the electronic assembly 2200.

Figure 14:
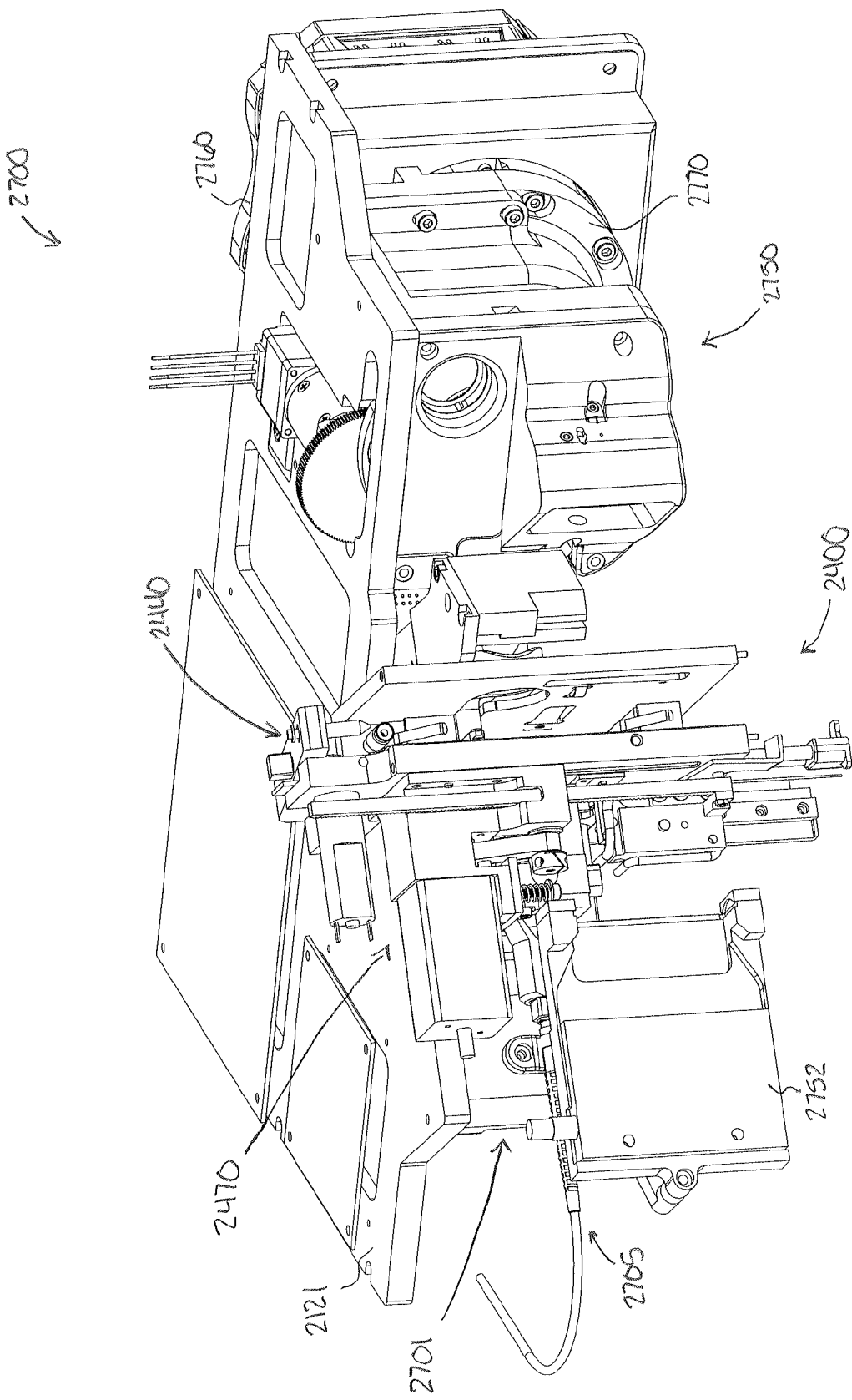
FIG. 14 is a front perspective view of a capillary cartridge retainer and an optics assembly included in the system of FIG. 2.

The capillary cartridge retainer 2400 (also referred to herein as "cartridge retainer") of the system 2000 is disposed within the housing 2100. For example, as shown in FIG. 14, a portion of the cartridge retainer 2400 is fixedly coupled to the optics support member 2121 of the frame 2120. In this manner, at least a portion of the cartridge retainer 2400 maintained in a substantially fixed position within the housing 2100. More specifically, a portion of the cartridge retainer 2400 is coupled to the optics support member 2121 and maintained within a fixed position relative to the detection assembly 2700, thereby maintaining a desired alignment therebetween, as described in further detail herein.

The cartridge retainer 2400 can be any suitable shape, size, or configuration. For example, as shown in FIGS. 15-20, the cartridge retainer 2400 includes a frame 2410, a vacuum portion 2440, a latch mechanism 2455, and a pipet portion 2470. As described in further detail herein, the frame 2410 is configured to couple the cartridge retainer 2400 to the optics support member 2121 and to receive and selectively engage at least a portion of the cartridge 2500. Moreover, as shown in FIGS. 15-18, each of the vacuum portion 2440, the latch mechanism 2455, and the pipet portion 2470 is coupled to and/or otherwise supported by the frame 2410.

Figure 15:
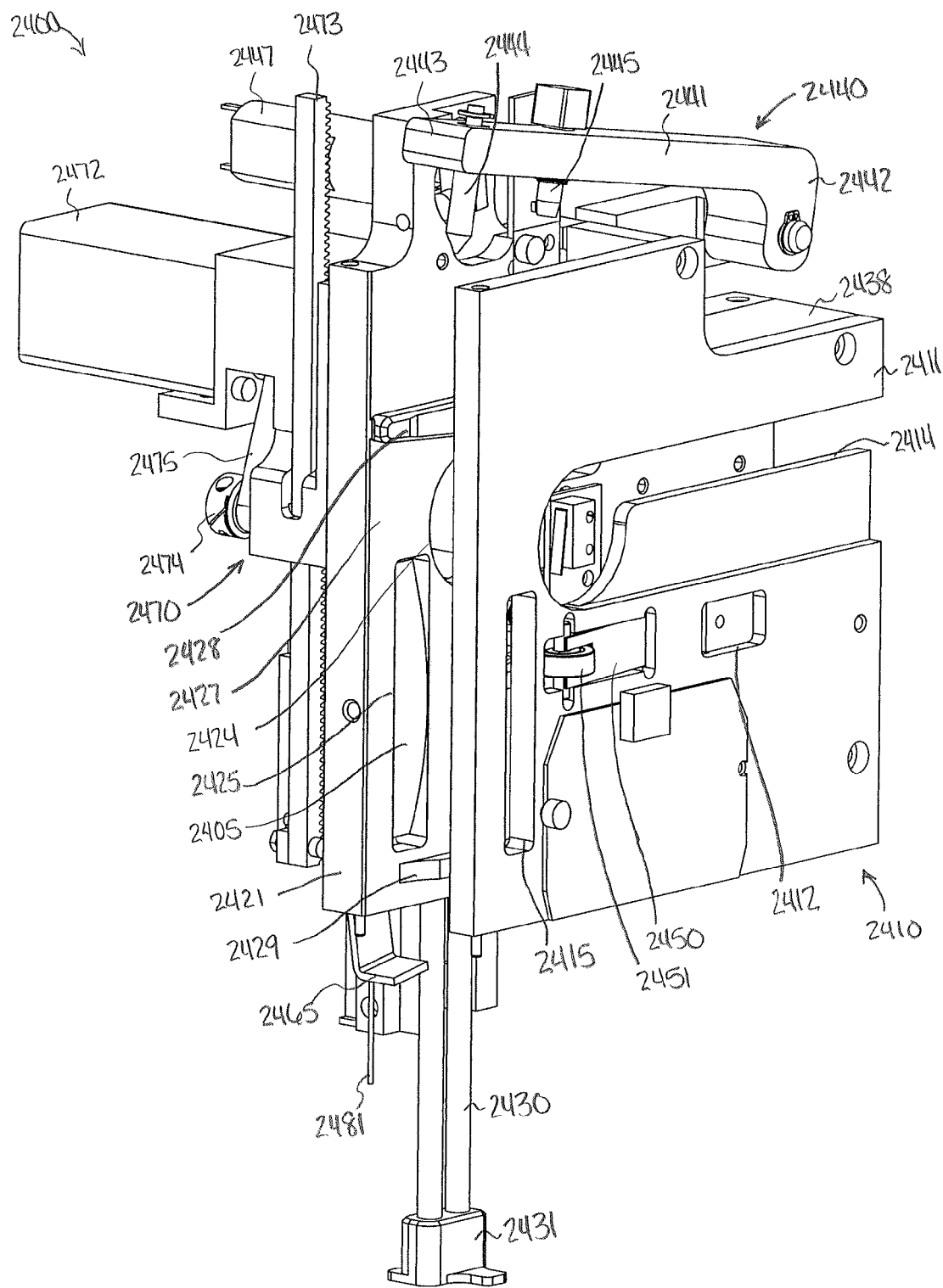
FIG. 15 is a front perspective view of the capillary cartridge retainer illustrated in FIG. 14.
Figure 16:
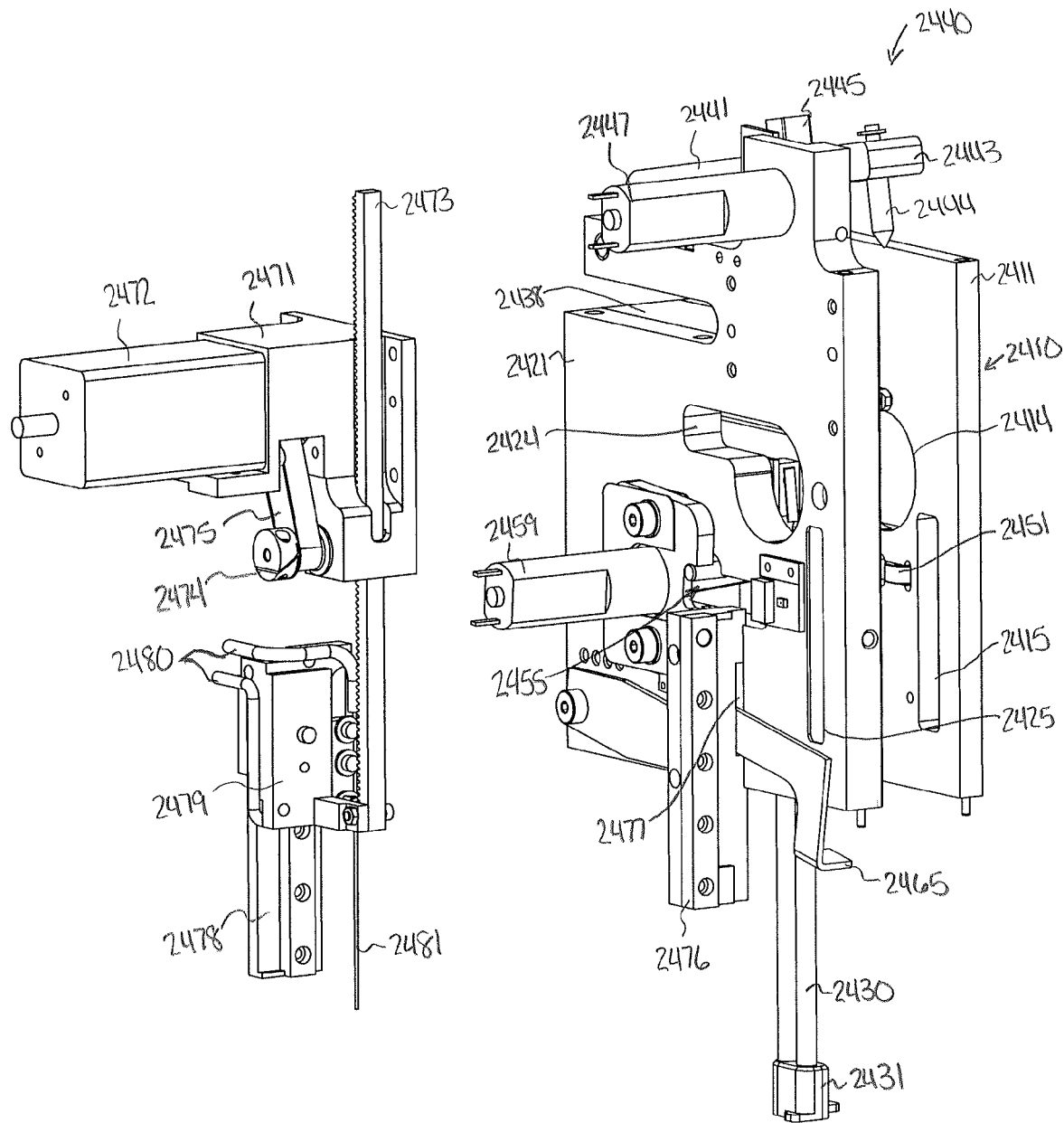
FIG. 16 is a partially exploded view of the capillary cartridge retainer illustrated in FIG. 14.

As shown in FIGS. 15 and 16, the pipet portion 2470 is coupled to a sidewall of the frame 2410 (e.g., a second sidewall 2421, as described in further detail herein) and includes a pipet 2481 configured to be moved in a linear direction relative to the frame 2410. The pipet portion 2470 further includes a mounting block 2471, a motor 2472, a rack 2473, a pinion 2474, a belt 2475, a support member 2476, a slide track 2478, and a slide block 2479. The mounting block 2471 and the support member 2476 are each configured to couple to the second sidewall 2421 of the frame 2410. The motor 2472 couples to the mounting block 2471 and includes an output (not shown). The output of the motor 2472 is operatively coupled to the pinion 2474 via the belt 2475. The pinion 2474 is rotatably coupled to the mounting block 2471 and is configured to be rotated by the belt 2475 in response to a rotation of the output of the motor 2472. The rack 2473 is configured to engage a gear or the like (not shown) of the pinion 2474 to be moved in a linear motion relative to the mounting block 2471. As shown in FIG. 16, an end portion of the rack 2473 and the pipet 2481 are coupled to the slide block 2479. The slide block 2479 is slidably disposed about a portion of the slide track 2478, which in turn, is configured to be coupled to the support member 2476 and maintained in a substantially fixed position relative to the frame 2410. Moreover, the support member 2476 defines a notch 2477 configured to movably receive a portion of the latch mechanism 2455, as described in further detail herein.

This arrangement of the pipet portion 2470 is such that when the motor 2472 is activated, the belt 2475 rotates the pinion 2474 relative to the rack 2473. With the pinion 2474 rotatably coupled to the mounting block 2471 and with a gear portion of the pinion 2474 engaged with the rack 2473, the rotation of the pinion 2474 advances the rack 2473 relative to the pinion 2474. With the end portion of the rack 2473 coupled to the slide block 2479, the advancement of the rack 2473 relative to the pinion 2474 results in a linear motion of the slide block 2479 along a length of the slide track 2478. Thus, with the pipet 2481 coupled to the slide block 2479, the pipet 2481 moves concurrently with the slide block 2479 as the slide block 2479 is moved along a length of the slide track 2478. In this manner, the electronic assembly 2200 can send a signal and/or electric power to the motor 2472 to move the pipet 2481 in a linear direction along a length of the slide track 2478 (e.g., along a length of a centerline defined by the pipet 2481).

In some instances, the pipet 2481 can be moved from a first position to a second position to be placed in one or more wells 2366 of the reagent tray 2365. For example, in some instances, the motor 2472 can be activated (e.g., in response to a signal and/or electric power received from the electronic assembly 2200) to position a first end portion of the pipet 2481 in a well 2366 of the reagent tray 2465. Moreover, as shown in FIG. 16, a second end portion of the pipet 2481 opposite the first end portion is in fluid communication with at least one fluid conduit 2480. Thus, the pipet 2481 can be configured to deliver fluid to and/or receive fluid from the well 2366 within which it is disposed. For example, in some embodiments, the one or more fluid conduits 2480 are in fluid communication with a pump 2490 or the like (see e.g., FIG. 13). The pump 2490 is further in fluid communication with at least one fluid reservoir 2495. In this manner, the electronic assembly 2200 and/or other control device can send a signal to the pipet assembly 2470 to activate the motor 2472 such that the first end portion of the pipet 2481 is placed in a desired well 2366. The electronic assembly 2200 can also send a signal to the pump 2490 (e.g., a syringe pump or other suitable pump) and in response, the pump 2490 can draw a predetermined volume of fluid from the one or more fluid reservoirs 2495 and can deliver the predetermined volume of the fluid to the well 2366 via the one or more fluid conduits 2480 and the pipet 2481. In some embodiments, this arrangement can be such that the system 2000 at least semi-automatically fills and/or otherwise prepares one or more wells 2366 of the reagent tray 2365 with a desired sample, or mixture such as those described herein.

In some embodiments, the fluid reservoir(s) 2495 can be sized to contain relatively small quantity of fluid, such as 20 milliliter (mL), 50 mL, 100 mL, etc. The fluid reservoir(s) 2495 can store a quantity of fluid sufficient for a single or a few (e.g., 2, 5, 10, etc.) runs. In some instances, the interior of the housing 2100 can be climate controlled such that the fluid reservoir(s) 2495 are maintained at a pre-set and/or substantially constant temperature. For example, fans 2215 and/or 2395 can be cycled such heat generated from system components (e.g., electric components, power sources, transformers, the chilling device 2355, etc.) is expelled at a controlled rate to maintain the pre-set and/or substantially constant temperature. The fluid reservoir(s) 2495 can be sized to contain a relatively small quantity of fluid whose temperature may be more easily controlled than, for example, a multi-liter bulk fluid reservoir.

In some instances, the fluid reservoir(s) 2495 can be fluidically coupled to bulk fluid container(s) (not shown) located, for example, outside the housing 2100. The fluid reservoir(s) 2495 can be operable to draw and/or otherwise receive fluid the from bulk fluid container(s). In some embodiments, the fill level of bulk fluid container(s) having a known volume can be determined by supplying a known quantity of gas at a known pressure to the bulk fluid container(s). By calculating the change of pressure in the bulk fluid container(s), the volume of head-space can be determined (e.g., within the fluid reservoir(s) 2495 and/or within the bulk fluid container(s). That is, the change in pressure in the bulk fluid container decreases as the head-space increases. The head-space can be subtracted from a known volume of the bulk fluid container(s) to calculate a fill level. In some embodiments, the system 2000 may prompt the user to refill one or more bulk fluid containers when the fill level falls below a predetermined level and/or otherwise modify run behavior (e.g., the system 2000 may prevent the performance of an assay until bulk fluid container(s) are refilled).

The frame 2410 of the cartridge retainer 2400 can be any suitable shape, size, and/or configuration. As shown in FIGS. 16-19, for example, the frame 2410 includes a first sidewall 2411, the second sidewall 2421, a first contact bracket 2438 (e.g., an upper contact bracket), and a second contact bracket 2489 (e.g., a lower contact bracket). The first contact bracket 2438 and the second contact bracket 2439 are each disposed between the first sidewall 2411 and the second sidewall 2421 and are configured to couple to the first sidewall 2411 and the second sidewall 2421. More specifically, the first contact bracket 2438 and the second contact bracket 2439 are coupled to and disposed between the first sidewall 2411 and the second sidewall 2421 such that the sidewalls 2411 and 2421 are spaced apart by a predetermined distance (see e.g., FIG. 19). In some embodiments, the predetermined distance can be associated with, for example, a width of the cartridge 2500. In other words, the first contact bracket 2438 and the second contact bracket 2439 couple the sidewalls 2411 and 2421 together such that a space sufficient to receive at least a portion of the cartridge 2500 is defined therebetween. As described in further detail herein, each of the first contact bracket 2438 and the second contact bracket 2439 is coupled to a contact member 2485 that is placed in contact with a portion of the cartridge 2500 when the cartridge 2500 is disposed between the second sidewall 2421 and the first sidewall 2411.

Figure 17:
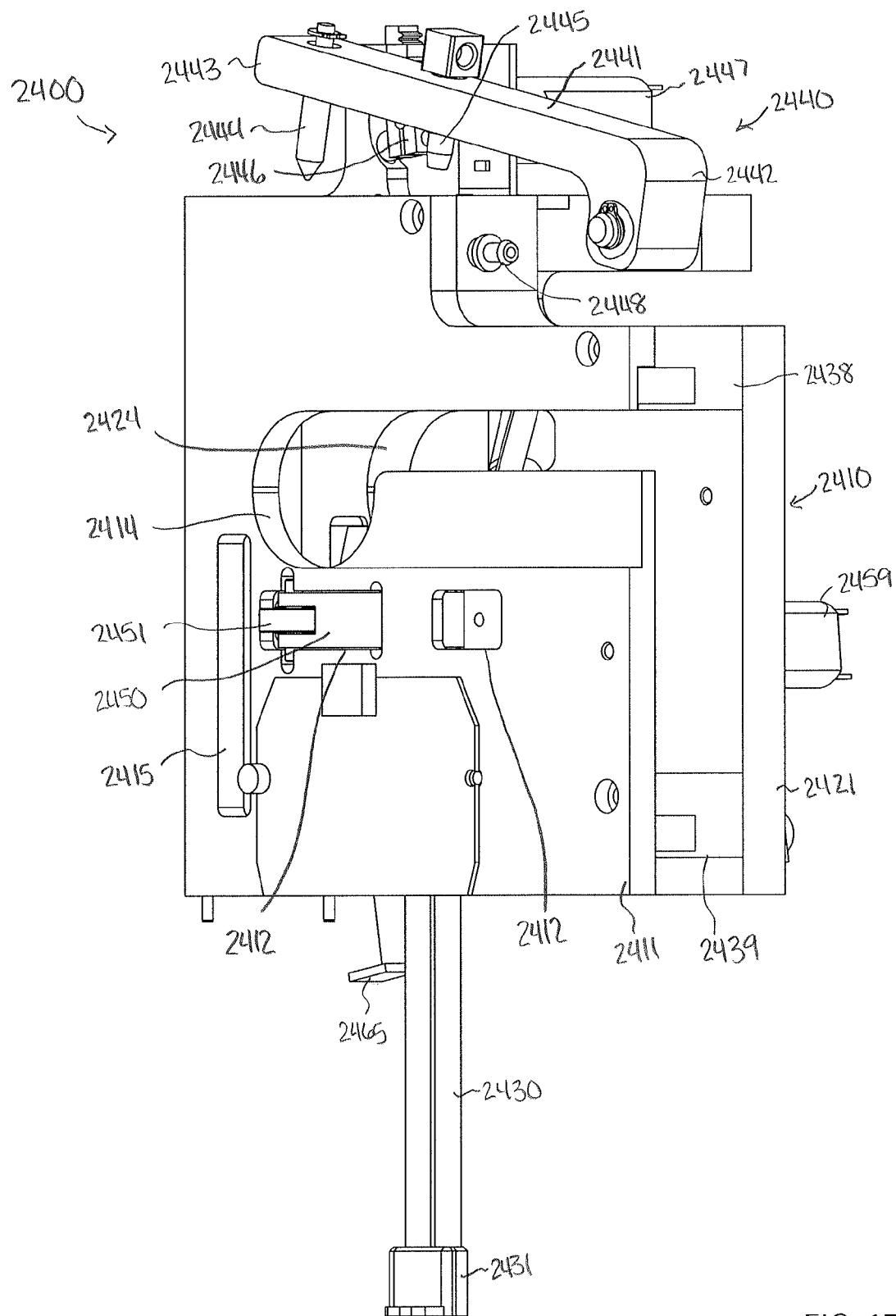
FIGS. 17-19 are a rear right-side perspective view, a front left-side perspective view, and a front view, respectively, of a portion of the capillary cartridge retainer illustrated in FIG. 14.

As shown in FIG. 17, the first sidewall 2411 defines one or more spring openings 2412, a first optics opening 2414, and a second optics opening 2415. The first optics opening 2414 is configured to be aligned with a first portion of the optics assembly 2700 (e.g., a size imaging portion 2701, as described in further detail herein) to allow for visualization of a first portion of the cartridge 2500 when the cartridge 2500 is retained by the cartridge retainer 2400. Similarly, the second optics opening 2415 is configured to be aligned with a second portion of the optics assembly 2700 (e.g., an full-column detection portion 2750, as described in further detail herein) to allow for visualization of a second portion of the cartridge 2500 when the cartridge 2500 is retained by the cartridge retainer 2400.

The one or more spring openings 2412 defined by the first sidewall 2411 are configured to receive a portion of a spring 2450. For example, as shown in FIG. 17, the first sidewall 2411 defines two spring openings 2412 that receive different portions of the spring 2450. The spring 2450 (e.g., a leaf spring or the like) can be a relatively thin, elongate member that can be bent, deformed, biased, and/or otherwise reconfigured and, in response, can exert a reaction force. In this manner, the portions of the spring 2450 can be disposed within the spring openings 2412 to place the spring 2450 in a biased configuration configured to convert potential energy into kinetic energy in response to a force exerted on at least a portion of the spring 2450. As shown, the spring 2450 includes a roller 2451 disposed at an end portion of the spring 2450 that is placed in contact with a surface of the cartridge 2500 as the cartridge 2500 is inserted into the cartridge retainer 2400. In some embodiments, the cartridge 2500 exerts a force on the spring 2450 sufficient to bias or temporarily deform the spring 2450 when the cartridge 2500 is placed in contact with the roller 2451.

Figure 18:
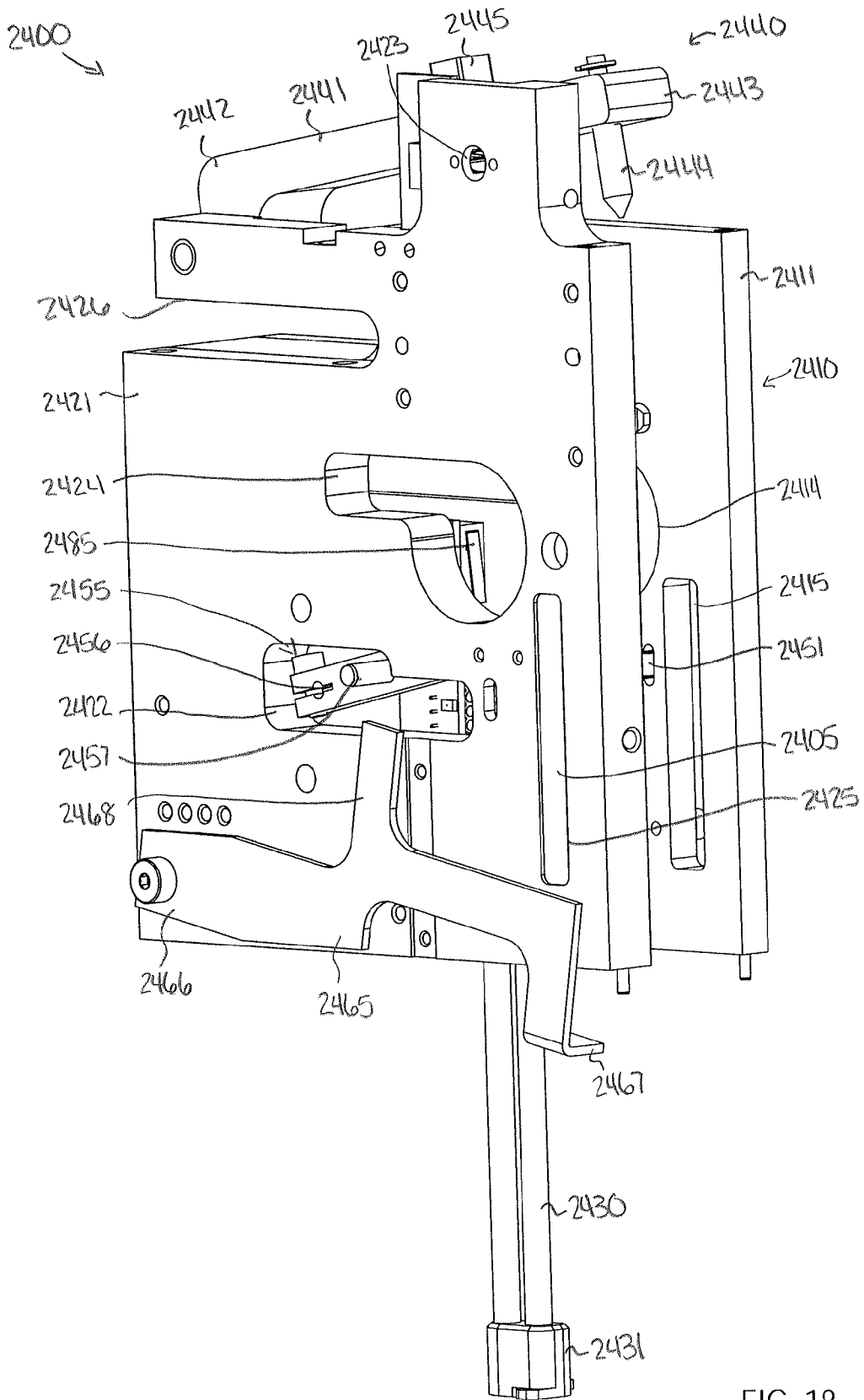
Figure 19:
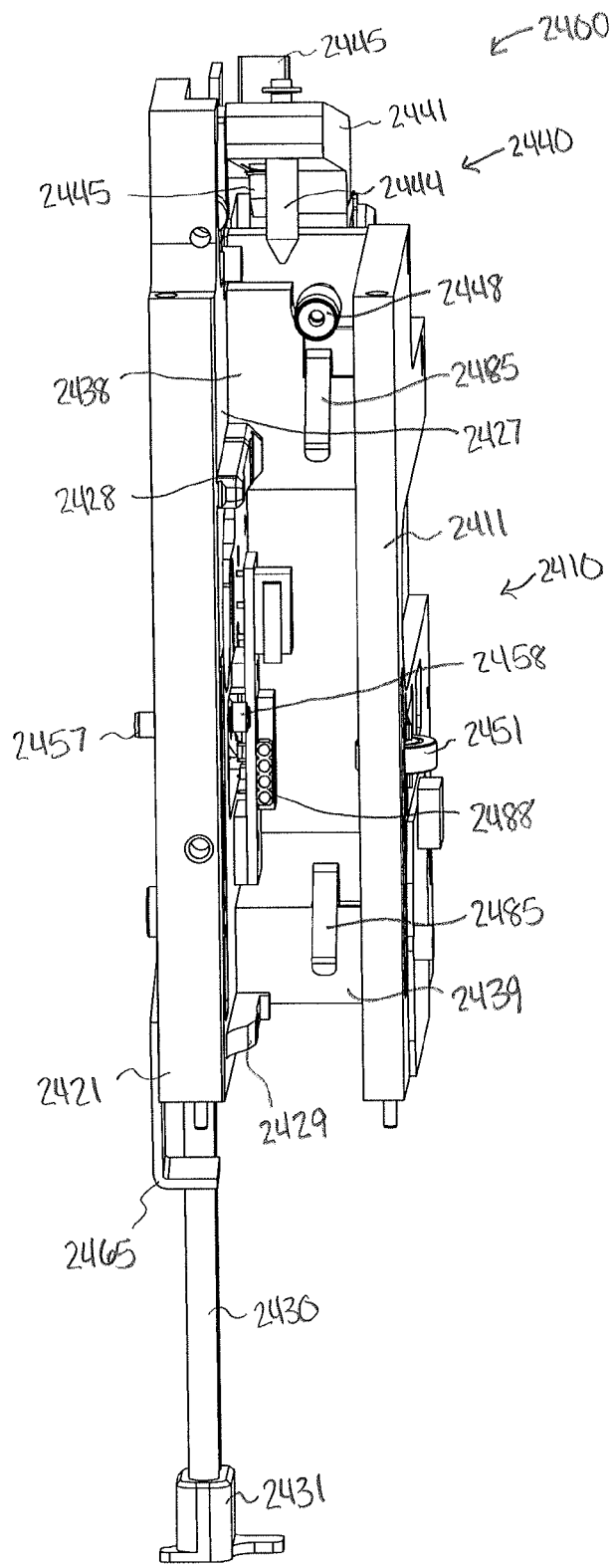

As shown in FIGS. 18 and 19, the second sidewall 2421 has an inner surface 2427 that includes and/or that forms a first guide rail 2428 (e.g., an upper guide rail) and a second guide rail 2429 (e.g., a lower guide rail). The first guide rail 2428 and the second guide rail 2429 are configured to selectively engage, guide, and/or support an associated portion of the cartridge 2500 when the cartridge 2500 is disposed within the space defined between the first sidewall 2411 and the second sidewall 2421. More particularly, the first guide rail 2428 and the second guide rail 2429 can engage and/or guide a portion of the cartridge 2500 to ensure the cartridge 2500 is retained within the cartridge retainer 2400 at a desired position and/or with a desired orientation. For example, in some embodiments, the alignment of the cartridge 2500 within the cartridge retainer can have a tolerance of 1.0 micron (μm) to about 500 μm (0.5 millimeters (mm)) or less.

As described in further detail herein, the second sidewall 2421 defines a latch opening 2422, a vacuum motor opening 2423, a first optics opening 2424, a second optics opening 2425, and a notch 2426. The notch 2426 defined by the second sidewall 2421 is configured to receive and/or otherwise disposed about a portion of the optics support member 2121 of the frame 2120 to facilitate the coupling of the cartridge retainer 2400 to the optics support member 2121. The latch opening 2422 and the vacuum motor opening 2423 are configured to receive a portion of the latch mechanism 2455 and a portion of a vacuum motor 2447, respectively. As described above with reference to the first sidewall 2411, the first optics opening 2424 and the second optics opening 2425 of the second sidewall 2421 are configured to be aligned with the first portion and the second portion, respectively, of the optics assembly 2700 to allow for visualization of the first portion and/or the second portion, respectively, of the cartridge 2500 when the cartridge 2500 is retained by the cartridge retainer 2400. Moreover, at least the second optics opening 2425 can include and/or can receive a focusing lens 2405 and/or any other suitable optical component.

The second sidewall 2421 also includes and/or is couple to a shaft 2430 and an engagement member 2431. The shaft 2430 is an elongate member having a first end portion movably coupled to and/or movably disposed in the second sidewall 2421 and a second end portion, opposite the first end portion, coupled the engagement member 2431. The shaft 2430 is configured to move relative to the second sidewall 2421 in response to an applied force. For example, in some embodiments, the reagent tray 2365 can be moved in a vertical direction such that a portion of the reagent tray 2365 and/or a sample vial contained therein is placed in contact with the engagement member 2431. As such, further movement of the reagent tray 2365 (in the same direction) exerts a force of the engagement member 2431 that is sufficient to move the shaft in the vertical direction relative to the second sidewall 2421. More particularly, in some embodiments, a portion of the shaft 2430 is movably disposed in an opening defined by the second sidewall 2421. In such embodiments, the force exerted on the engagement member 2431 can be sufficient to increase the portion of the shaft 2430 disposed in the opening, thereby compressing and/or otherwise reducing a length of the shaft 2430 that extends from the second sidewall 2421. In some embodiments, the arrangement of the shaft 2430 and engagement member 2431 can be configured to limit movement of the reagent tray 2365 in the vertical direction to substantially prevent damage to the cartridge 2500 and/or cartridge retainer 2400 that may otherwise result from the absence thereof. In other embodiments, the shaft 2430 and/or the engagement member 2431 can include and/or can be operably coupled to a sensor or the like (e.g., a proximity sensor, pressure sensor, accelerometer, and/or the like) configured to sense and/or detect a position and/or force associated with the movement of the shaft 2430 (and/or the reagent tray 2365) relative to the cartridge retainer 2400. Thus, based at least in part on data sensed and/or determined by such a sensor, the system 2000 can control movement of the reagent tray 2365 and/or any other suitable portion of the system 2000 relative to the cartridge retainer 2400.

As described above, the vacuum portion 2440 and the latch mechanism 2455 are coupled to the frame 2410. As shown in FIGS. 16-19, the vacuum portion 2440 of the cartridge retainer 2400 includes a lever arm 2441, a pinch valve actuator 2444, a pressure nozzle 2445, a motor 2447, and a vacuum port 2448. The lever arm 2441 has a first end portion 2442 and a second end portion 2443. The first end portion 2442 of the lever arm 2441 is rotatably coupled to the second sidewall 2421 of the frame 2410, for example, via a bearing or pin (see e.g., FIG. 17). The second end portion 2443 of the lever arm 2441 is coupled to a connector 2446 or the like configured to connect and/or couple the second end portion 2443 of the lever arm 2441 to the motor 2447. More specifically, the motor 2447 is coupled to the second sidewall 2421 of the frame 2410 such that an output member or the like extends through the vacuum motor opening 2423 (see e.g., FIG. 18) and couples to the connector 2446. Thus, the connector 2446 operably couples the lever arm 2441 to the motor 2447. In this manner, the motor 2447 can rotate its output in response to a signal and/or electric power (e.g., sent from the electronic assembly 2200), which in turn, rotates and/or pivots the lever arm 2441 about an axis defined by the first end portion 2442 (e.g., about a pin, axle, pivot point, etc.).

The pinch valve actuator 2444 and the pressure nozzle 2445 are each coupled to the lever arm 2441 and are configured to move with the lever arm 2441 in response to an activation of the motor 2447. More specifically, the pinch valve actuator 2444 is coupled to and/or otherwise disposed at or near the second end portion 2443 of the lever arm 2441 while the pressure nozzle 2445 is disposed closer to and/or substantially at a central portion of the lever arm 2441. As described in further detail herein, the pinch valve actuator 2444 and the pressure nozzle 2445 are each configured to selectively engage a predetermined portion of the cartridge 2500 when the cartridge 2500 is retained by the cartridge retainer 2400 and the motor 2447 is activated to rotate the lever arm 2441. For example, in some embodiments, the pinch valve actuator 2444 can be configured to actuate a pinch valve included in the cartridge 2500 to control a flow of fluid through one or more fluid flow paths. Similarly, the pressure nozzle 2445 can be configured to engage and/or actuate a portion of the cartridge 2500 configured to regulate a pressure within one or more fluid flow paths and/or capillaries. For example, the pressure nozzle 2445 can be fluidically coupled to a pump 2497 or the like (e.g., via any suitable fluid conduit, tubing, pipe, and/or the like) that can be activated to produce a positive pressure. As such, the pressure nozzle 2445 can engage a portion of the cartridge 2500 to transfer at least a portion of the positive pressure to the portion of the cartridge 2500, as described in further detail herein.

As shown in FIGS. 17 and 19, the vacuum port 2448 is coupled to the first contact bracket 2438. As described in further detail herein, the vacuum port 2448 is configured to engage and/or contact a portion of the cartridge 2500 when the cartridge 2500 is disposed within the cartridge retainer 2400. Although not shown, the vacuum port 2448 can be coupled to any suitable fluid conduit, tubing, pipe, and/or the like, which in turn, places the vacuum port 2448 in fluid communication with a vacuum source. For example, the fluid conduit or the like can be configured to place the vacuum port 2448 in fluid communication with a vacuum source 2496 (see e.g., FIG. 13). The vacuum source 2496 can be any suitable device and/or the like configured to create a negative pressure differential between the vacuum source 2496 and, for example, the vacuum port 2448. In some embodiments, the vacuum source 2496 can include an impeller or the like configured to spin within a chamber to produce the negative pressure. In other embodiments, the vacuum source 2496 can be a piston pump or other suitable pump. In this manner, the vacuum source 2496 can be activated (e.g., in response to a signal and/or electric power received from the electronic assembly 2200) to produce a negative pressure within a portion of the cartridge 2500 when the cartridge 2500 is in contact with the vacuum port 2448, as described in further detail herein.

The latch mechanism 2455 of the cartridge retainer 2400 can be any suitable member, device, mechanism, and/or assembly. For example, as shown in FIGS. 16, 18, and 19, the latch mechanism 2455 includes a latch arm 2456, a motor 2459, and a manual release member 2465. The latch arm 2456 can be any suitable shape, size, and/or configuration. A first end portion of the latch arm 2456 is configured to be coupled to an output of the motor 2459 (not shown) such that a rotation of the output results in a similar and/or corresponding rotation of the latch arm 2456. As shown in FIGS. 18 and 19, the latch arm 2456 includes a pin 2457 and a latch member 2458. The pin 2457 is configured to be placed in contact with a stop and/or a portion of the frame 2410 to limit a rotation of the latch arm 2456. The latch member 2458 is coupled to an end portion of the latch arm 2456 opposite the end portion coupled to the motor 2459. The latch member 2458 can be any suitable pin, roller, knob, tab, protrusion, etc. configured to selectively engage a portion of the cartridge 2500 when the cartridge 2500 is disposed within the cartridge retainer 2400, as described in further detail herein.

The latch member 2458 can be operable to securely locate the cartridge 2500 against the first contact bracket 2438 and the second contact bracket 2439 with a high degree of accuracy and repeatability. Thus, the latch member 2458, the guide rails 2428 and 2429, and the contact brackets 2438 and 2439 can collectively align the cartridge 2500 as the cartridge 2500 is inserted into the cartridge retainer 2400. In some instances, it may be desirable to closely control the direction of insertion (e.g., insertion of the cartridge 2500 into the cartridge retainer 2400) and/or the alignment of the cartridge 2500 to ensure alignment with the optics assembly 2700. In some instances, the latch member 2458, the guide rails 2428 and 2429, and the contact brackets 2438 and 2439 can be operable to reproducibly locate the cartridge 2500 within a tolerance of, for example, 0.1 mm, 0.05 mm, 0.01 mm, 0.005 mm, or any other suitable distance. Moreover, the cartridge retainer 2400 can include one or more sensors 2488 (see e.g., FIG. 19) configured to detect and/or sense a position or alignment of the cartridge 2500 within the cartridge retainer 2400. For example, the sensor 2488 can be a proximity sensor and/or any suitable switch, plunger, actuator (e.g., mechanical and/or electrical), etc. In some embodiments, the sensor 2488 can send a signal to the motor 2459 indicative of an instruction to rotate the latch arm 2456 when the cartridge 2500 is placed in a desired position within the cartridge retainer 2400.

The manual release member 2465 includes a first end portion 2466, a second end portion 2467, and a contact portion 2468. The first end portion 2466 of the manual release member 2465 is rotatably coupled to the second sidewall 2421 of the frame 2410, as shown in FIG. 18. In addition, a portion of the manual release member 2465 is movably disposed within the notch 2477 defined by the support member 2476. The second end portion 2467 is opposite the first end portion 2466 and can be engaged and/or manipulated by a user to pivot and/or rotate the manual release member 2465 about an axis defined by the first end portion 2466 (e.g., a pin, screw, axle, coupler, bearing, etc.). Moreover, when the manual release member 2465 is rotated about the axis defined by the first end portion 2466, the contact portion 2468 is placed in contact with the pin 2457 of the latch arm 2456. In this manner, a user can exert a force on the second end portion 2467 of the manual release member 2465 to place the contact portion 2468 in contact with the pin 2457 of the latch arm 2456, which in turn, can rotate and/or pivot the latch arm 2456 relative to the frame 2410. Thus, the cartridge 2500 can be manually released from the cartridge retainer 2400 in the event of a failure of the motor 2459 and/or the like.

Figure 20:
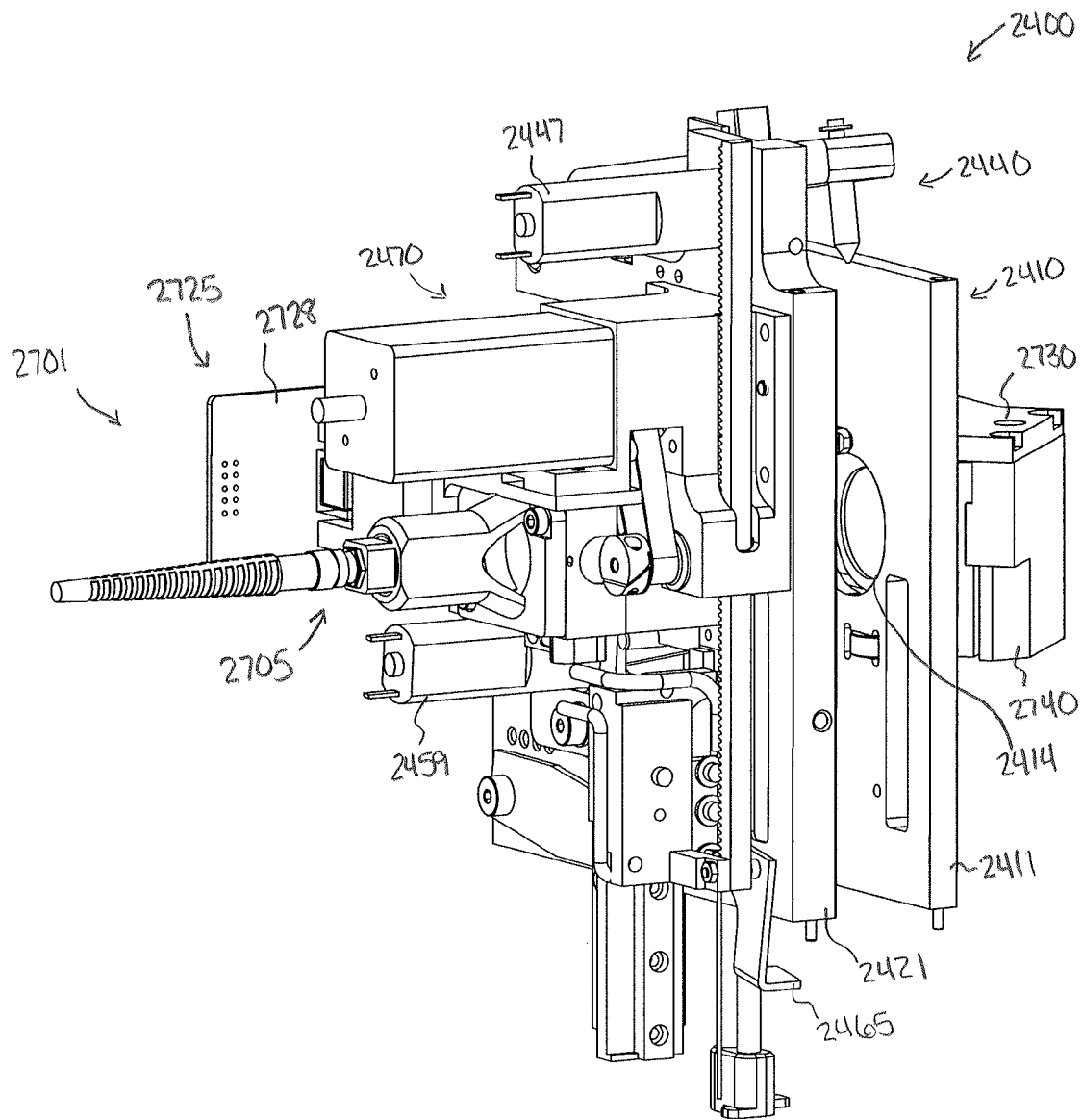
FIG. 20 is a perspective view of the capillary cartridge retainer of FIG. 14 and a single-point detection portion of the optics assembly of FIG. 14.

The optics assembly 2700 of the system 2000 is disposed within the housing 2100 and coupled to the optics support member 2121 of the frame 2120. More specifically the optics assembly 2700 can be disposed within the housing 2100 to at least partially surround the cartridge retainer 2400. As shown in FIGS. 20-28, the optics assembly 2700 includes the single-point detection portion 2701 (FIGS. 20-23) and the full-column detection portion 2750 (FIGS. 24-28). The single-point detection portion 2701 can be any suitable shape, size, and/or configuration. As shown in FIG. 20, the single-point detection portion 2701 is coupled to and/or otherwise disposed about the cartridge retainer 2400 in a predetermined position such that one or more components of the single-point detection portion 2701 is substantially aligned with the first optics openings 2414 and 2424 of the first sidewall 2411 and second sidewall 2421, respectively, to enable the single-point detection portion 2701 to perform a molecular weight analysis on a sample or the like flowing through the cartridge 2500 (e.g., the molecular weight cartridge 2500'). As described in further detail herein, the full-column detection portion 2750 is disposed about the cartridge retainer 2400 in a predetermined position such that one or more components of the full-column detection portion 2750 is substantially aligned with the second optics openings 2415 and 2425 of the first sidewall 2411 and second sidewall 2421, respectively, to enable the full-column detection portion 2750 to detect movement of analytes (e.g., proteins) along the length of the capillary 2500 (e.g., the isoelectric focusing cartridge 3500") before, during, and/or after separation (see e.g., FIG. 24).

Figure 21:
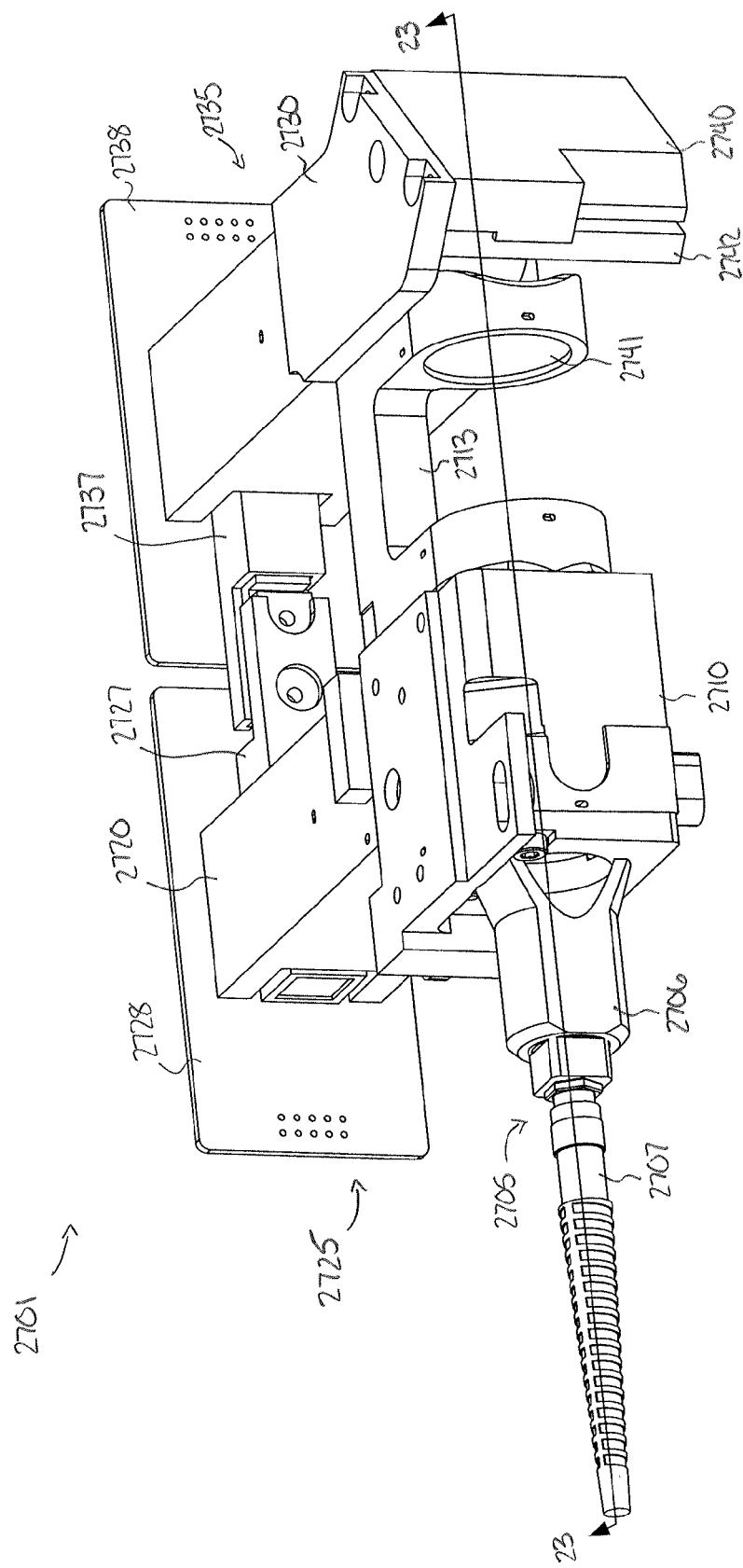
FIG. 21 is a perspective view of the single-point detection portion of the optics assembly illustrated in FIG. 20.
Figure 22:
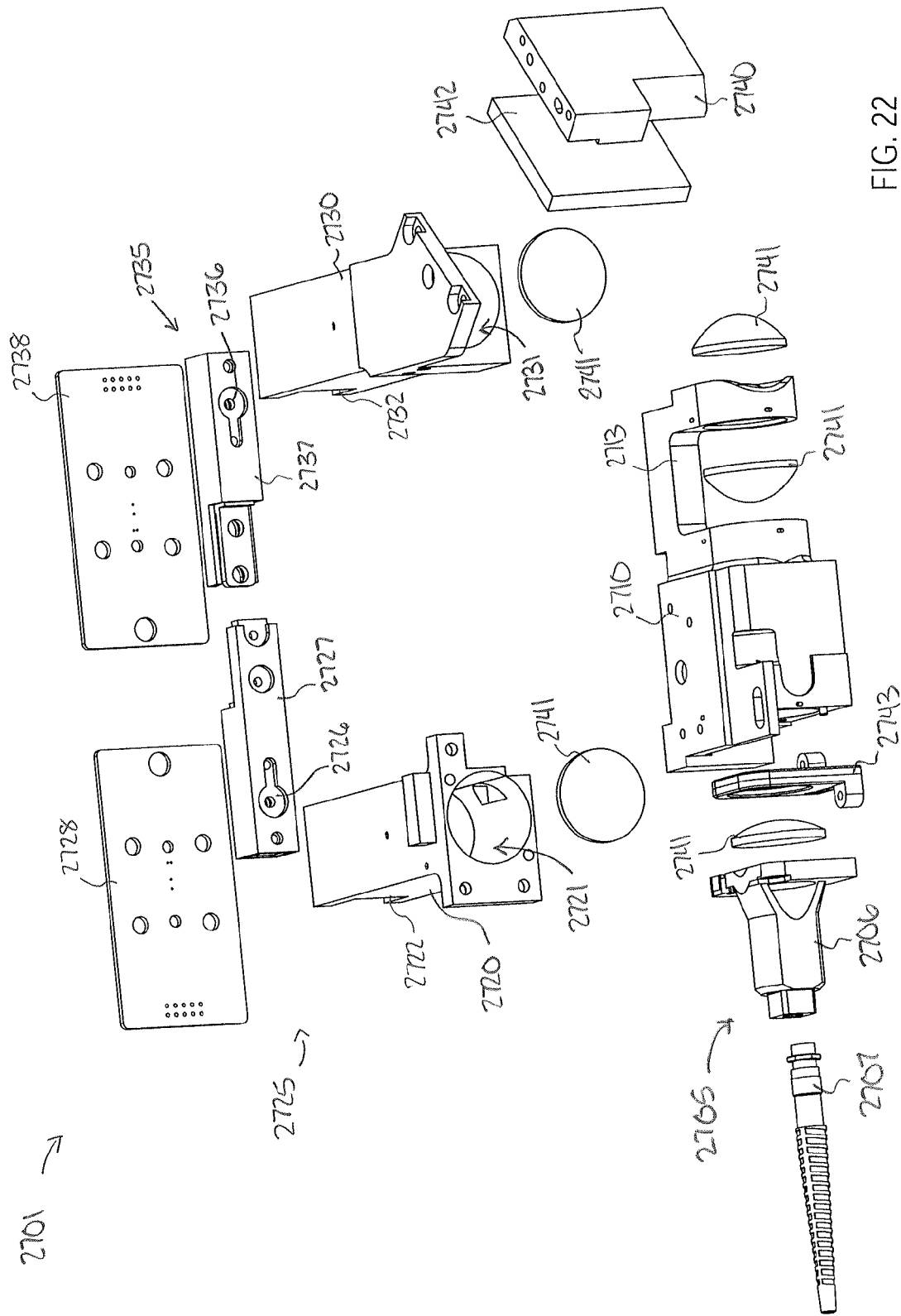
FIG. 22 is an exploded view of the single-point detection portion of the optics assembly illustrated in FIG. 20.
Figure 23:
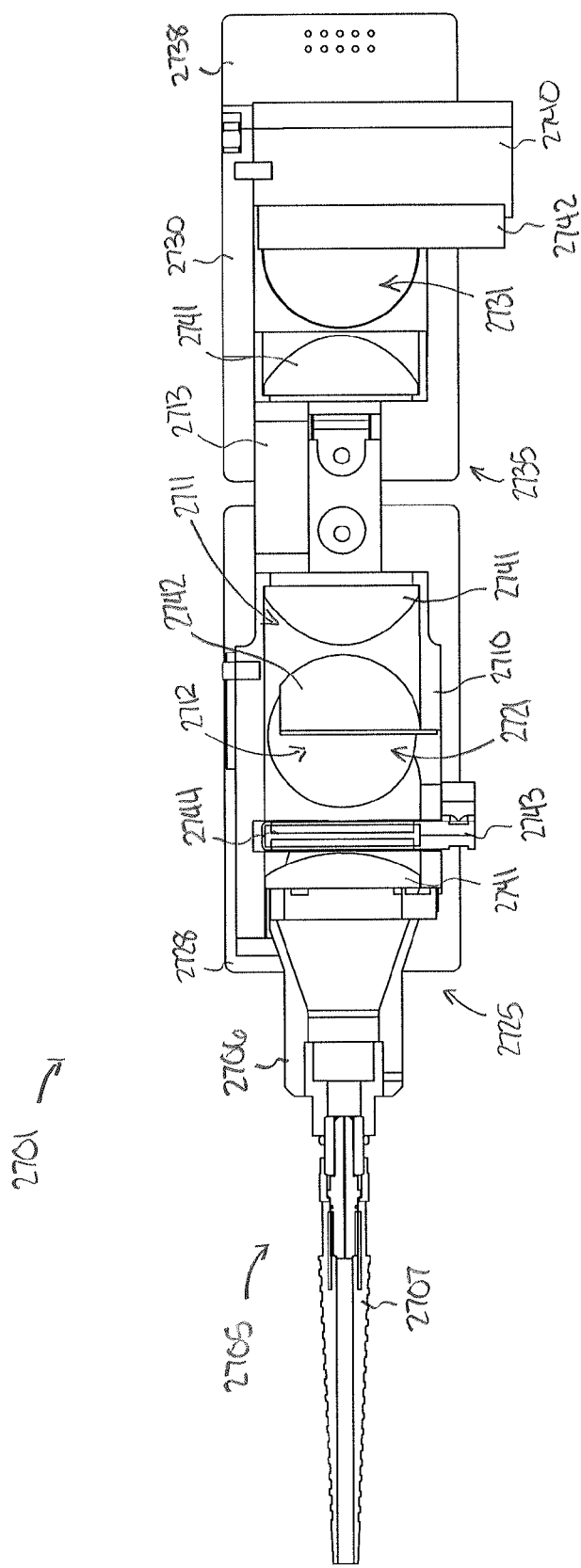
FIG. 23 is a cross-sectional view of the single-point detection portion of the optics assembly taken along the line 23-23 in FIG. 21.
Figure 24:
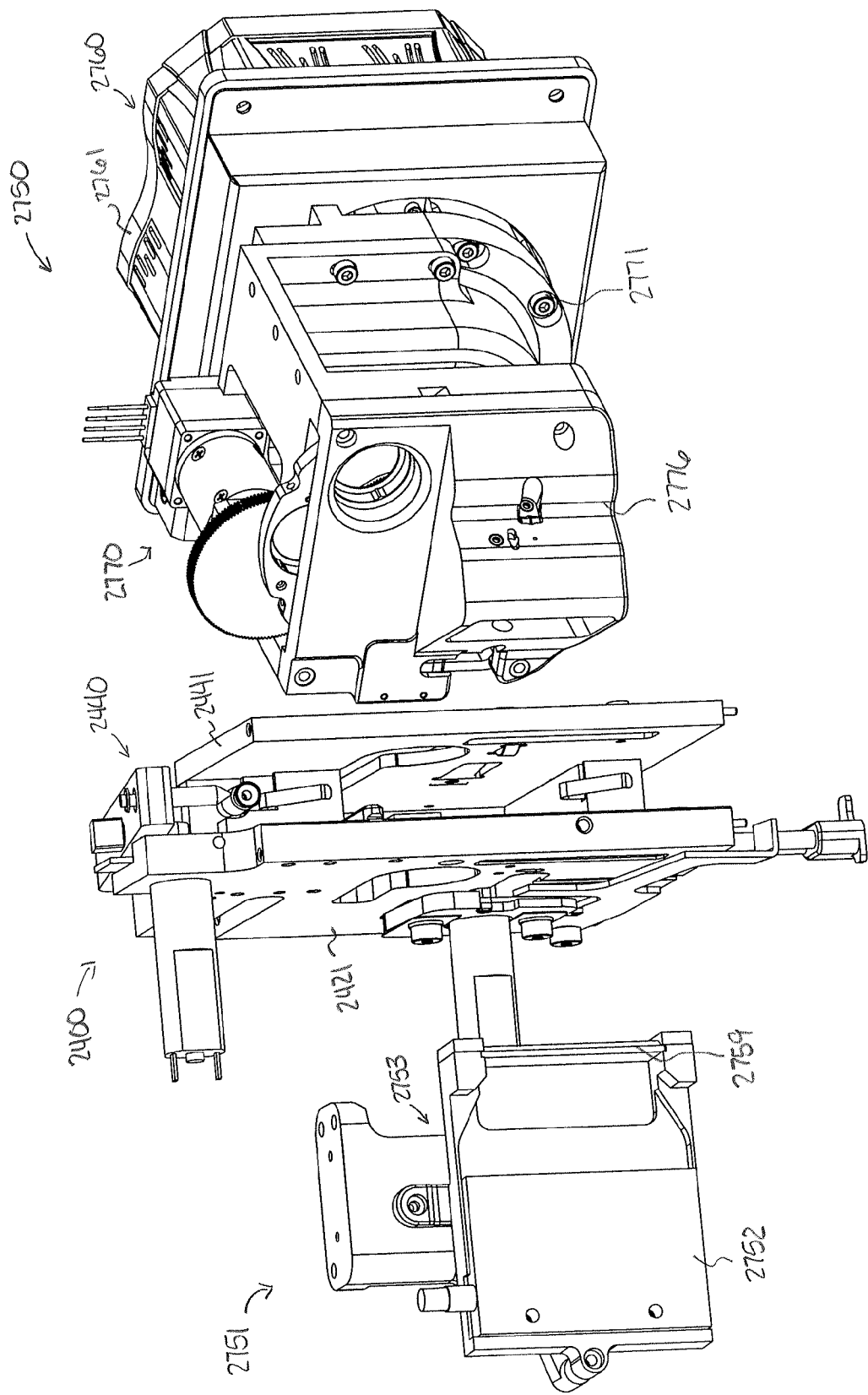
FIG. 24 is a perspective view of the cartridge retainer of FIG. 14 and a full-column detection portion of the optics assembly illustrated in FIG. 14.

As shown in FIGS. 21-23, the single-point detection portion 2701 includes an illumination assembly 2705, a central member 2710, a first side member 2720 coupled to a first imaging device 2725, and a second side member 2730 coupled to a second imaging device 2735. Moreover, the single-point detection portion 2701 can include any number of filters, lenses, holders, mirrors, and/or the like configured to direct at least a portion of light emitted from the illumination assembly 2705, as described in further detail herein.

The illumination assembly 2705 includes an entry block 2706 and a fiber optics member 2707 (also referred to herein as "optical output"). The entry block 2706 is coupled to a side of the central member 2710 and is further coupled to the optical output 2707. In this manner, the entry block 2706 can direct and/or guide a beam of light (e.g., photons) emitted from the optical output 2707 into one or more bores defined by the central member 2710, as described in further detail herein. The optical output 2707 can optically couple to a light source 2795 (see e.g., FIG. 13), such as a deuterium lamp, incandescent light, LED, or any suitable fiber optic light source and/or the like that can be excited and/or otherwise activated in response to a signal and/or electric power received from the electronics assembly 2200 (e.g., the power supply 2210) and/or any other suitable control device. In some embodiments, the optical output 2707 can be configured to emit energy and/or photons generated by the light source 2795 having a desired wavelength (e.g., a wavelength in the infrared spectrum, the visible spectrum, the ultraviolet spectrum, and/or the like).

The central member 2710 can be any suitable shape, size, and/or configuration. For example, as shown in FIGS. 22 and 23, the central member 2710 defines a central bore 2711, a side bore 2712, a cartridge retainer notch 2713, a mirror notch 2714, and a filter notch 2715. The central bore 2711 has a substantially circular cross-sectional shape and extends transversely along a length of the central member 2710. In this embodiment, the central bore 2711 receives, for example, three lenses 2741, a mirror 2742, and a filter holder 2743 holding or including a filter 2744. More particularly, the central bore 2711 has a first lens 2741 disposed adjacent to the entry block 2706 of the illumination assembly 2705, a second lens 2741 disposed adjacent to and on a first side of the cartridge retainer notch 2713, and a third lens 2741 disposed adjacent to and on a second side of the cartridge retainer notch 2713 opposite the first side (see e.g., FIG. 23). The mirror 2742 is disposed in the mirror notch 2714, which places the mirror 2742 in a desired position to direct at least a portion of the light emitted from the optical output 2707 to the side bore 2712, as described in further detail herein. The filter holder 2743 is disposed in the filter notch 2715, which places the filter 2744 (held by and/or coupled to the filter holder 2743) in a desired position between the first lens 2741 and the side bore 2712. In this manner, the first lens 2741 can focus at least a portion of the light emitted from the optical output 2707 and, in turn, the filter 2744 can filter the portion of the light prior to the light entering the side bore 2712 and/or the remaining portions of the central bore 2711 (see e.g., FIG. 23).

Referring back to FIG. 20, the single-point detection portion 2701 of the optics assembly 2700 is positioned relative to the cartridge retainer 2400 such that at least a portion of the cartridge retainer 2400 is disposed within the cartridge retainer notch 2713 defined by the central member 2710. More specifically, the single-point detection portion 2701 and the cartridge retainer 2400 are collectively arranged such that the central bore 2711 of the central member 2710 is substantially aligned with a portion of the first optics openings 2414 and 2424 defined by the first and second sidewalls 2411 and 2421, respectively, of the frame 2410. In this manner, the lenses 2741, the filter 2744, and the mirror 2742 disposed within the central bore 2711 collectively direct a focused and filtered portion of the light emitted by the optical output 2707 through a predetermined portion of the cartridge retainer 2400. Thus, when the cartridge 2500 is retained by the cartridge retainer 2400, the focused and filtered portion of the light similarly passes through a predetermined portion of the cartridge 2500, as described in further detail herein.

The first side member 2720 of the single-point detection portion 2701 defines a bore 2721 and a notch 2722. The first side member 2720 is coupled to the central member 2710 such that the bore 2721 of the first side member 2720 is substantially aligned with the side bore 2712 of the central member 2710. The bore 2721 of the first side member 2720 receives and/or houses a lens 2741. In this manner, the mirror 2742 disposed in the central bore 2711 of the central member 2710 can direct at least a portion of the light emitted by the optical output 2707 into the bore 2721 of the first side member 2720, which is then focused by the lens 2741 disposed therein.

The first side member 2721 is also coupled to the first imaging device 2725 (see e.g., FIG. 21). The first imaging device 2725 includes a thermal mass reference member 2726, an insulator 2727, and a photodiode printed circuit board assembly (PCBA) 2728. The thermal mass reference member 2726 is disposed in the insulator 2727, which insulates (e.g., thermally insulates) the thermal mass reference member 2726, as shown in FIG. 22. The insulator 2727 and the thermal mass reference member 2726 are disposed within the notch 2722 defined by the first side member 2722 (e.g., between the first side member 2722 and the photodiode PCBA 2728). The thermal mass reference member 2726 can be any suitable device, sensor, and/or the like. The thermal mass reference member 2726 can be configured to maintain the first imaging device 2725 at a substantially constant and/or reference temperature. The photodiode PCBA 2728 (also referred to herein as "photodiode") can be any suitable device configured to sense and/or detect an input of light (e.g., photons) and to convert the input into electric current. In this manner, the photodiode 2728 can produce a signal associated with scattering of light emitted by the optical output 2707 and/or an image of a volume of sample flowing through a capillary of the cartridge 2500. Such a signal can be interpreted by a processor (e.g., of the electronics assembly 2200) to determine characteristic molecular weight, electrophoretic mobility, morphology, etc. of analytes within the sample. While described as a photodiode, in other embodiments, the single-point detection portion 2701 can include any suitable imaging device such as a CCD camera or the like.

The second side member 2730 of the s single-point detection portion 2701 includes a mirror block 2740 configured to couple to and/or otherwise retain a mirror 2742 and defines a bore 2731 and a notch 2732. The second side member 2730 is coupled to and/or disposed adjacent to the central member 2710. As shown in FIG. 21, the arrangement of the single-point detection portion 2701 is such that the first side member 2720 is coupled to and/or disposed on a first side of the cartridge retainer notch 2713 and the second side member 2730 is coupled to and/or disposed on a second side of the cartridge retainer notch 2713 opposite the first side. Moreover, the second side member 2730 is positioned relative to the central member 2710 such that a portion of the light emitted from the optical output 2707 is redirected by the mirror 2742 into the bore 2731 defined by the second side member 2730, which in turn is focused by one or more lenses 2741 disposed within the bore 2731.

As described above with reference to the first side member 2720, the second side member 2730 is also coupled to the second imaging device 2735 (see e.g., FIG. 21). The second imaging device 2735 includes a thermal mass reference member 2736, an insulator 2737, and a photodiode PCBA 2738. The second imaging device 2735 can be substantially similar to the first imaging device 2725 described above and therefore, is not specifically described in detail herein.

The first imaging device 2725 and the second imaging device 2735 can individually and/or collectively produce a signal (e.g., an electronic signal including data and/or information) associated with production, scattering and/or absorbance of the light in both the forward and backwards direction influenced by analytes, standards, label moieties, etc. in a volume of sample flowing through a capillary of the cartridge 2500. For example, in some instances, the first imaging device 2725 can be operable to detect light emitted, scattered, and/or absorbed from a dark field and/or backwards viewpoint (e.g., from approximately 95 degrees to 265 degrees opposite of the beam direction), while the second imaging device 2735 can be operable to detect light emitted, scattered, and/or absorbed from a bright filed and/or forward viewpoint (e.g., from approximately 85 degrees to 275 degrees in the direction of the beam). In this way, the single-point detection portion 2701 of the system 2000 can be operable to detect when analytes separated by, for example, molecular weight and/or electrophoretic mobility flow through a portion of a capillary of the cartridge 2500, as described in further detail herein. The molecular weight of each analyte can be determined based on the time and/or sequence in which it is detected. For example, an analyte that is detected after a 10,000 Da standard is detected but before a 15,000 Da standard is detected can be determined to have a molecular weight between 10,000 and 15,000. The molecular weight can be more accurately determined by considering the timing between the detection of the 10,000 Da standard, the analyte, and the 15,000 Da standard.

The full-column detection portion 2750 of the optics assembly 2700 can be any suitable device, mechanism, subassembly, and/or the like. As described above with reference to the single-point detection portion 2701, the optics assembly 2700 is disposed within the housing 2100 such that the full-column detection portion 2750 surrounds at least a portion of the cartridge retainer 2400. The full-column detection portion 2750 and the single-point detection portion 2701 of the optics assembly 2700 can each surround a portion of the cartridge retainer 2400 such that, either imaging mode can be used depending on, for example, a configuration of the cartridge 2500 inserted into the cartridge retainer 2400, as discussed in further detail herein.

Figure 25:
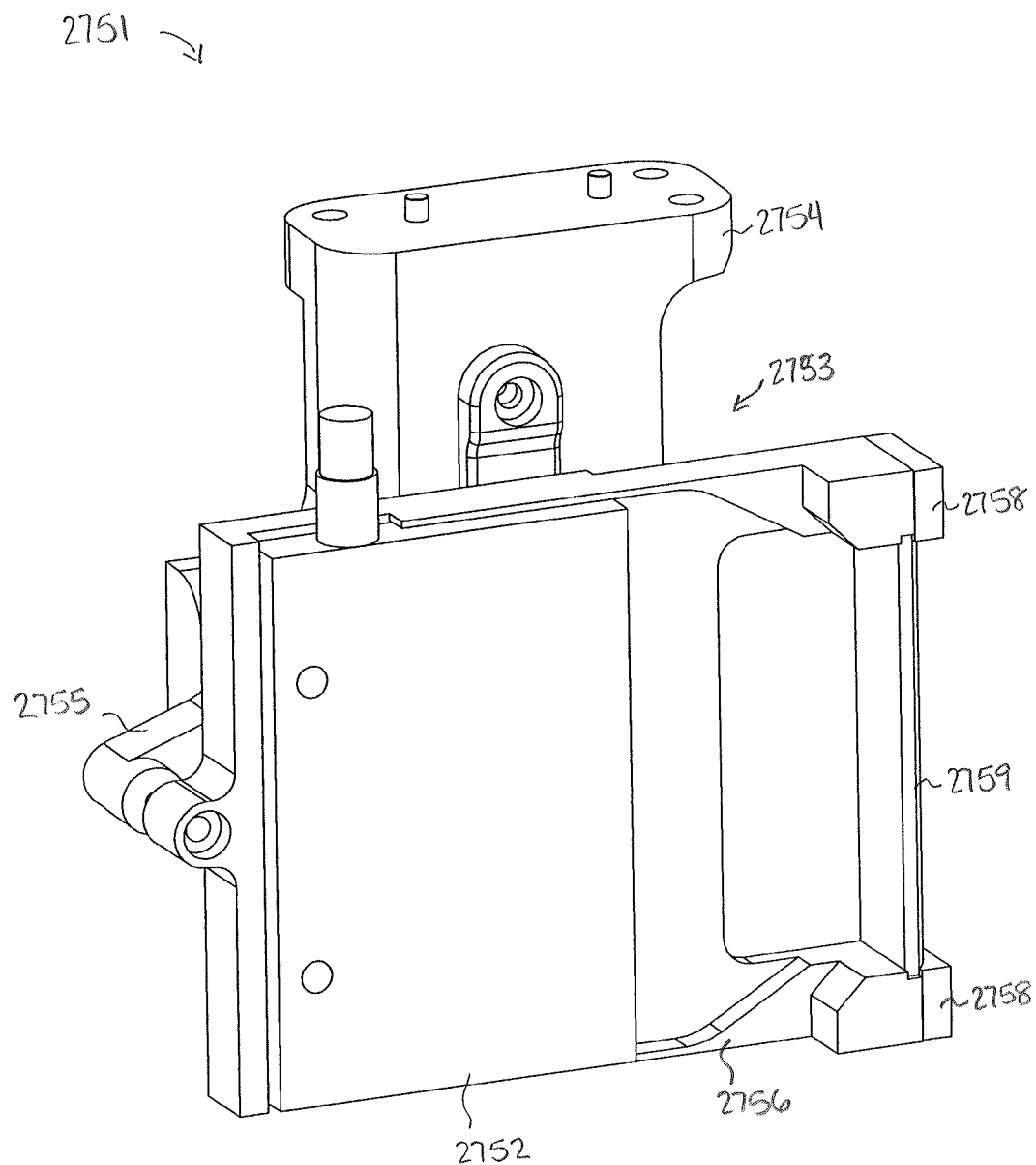
FIGS. 25 and 26 are a perspective view and an exploded view, respectively, of an illumination assembly included in the full-column detection portion of the optics assembly illustrated in FIG. 24.
Figure 26:
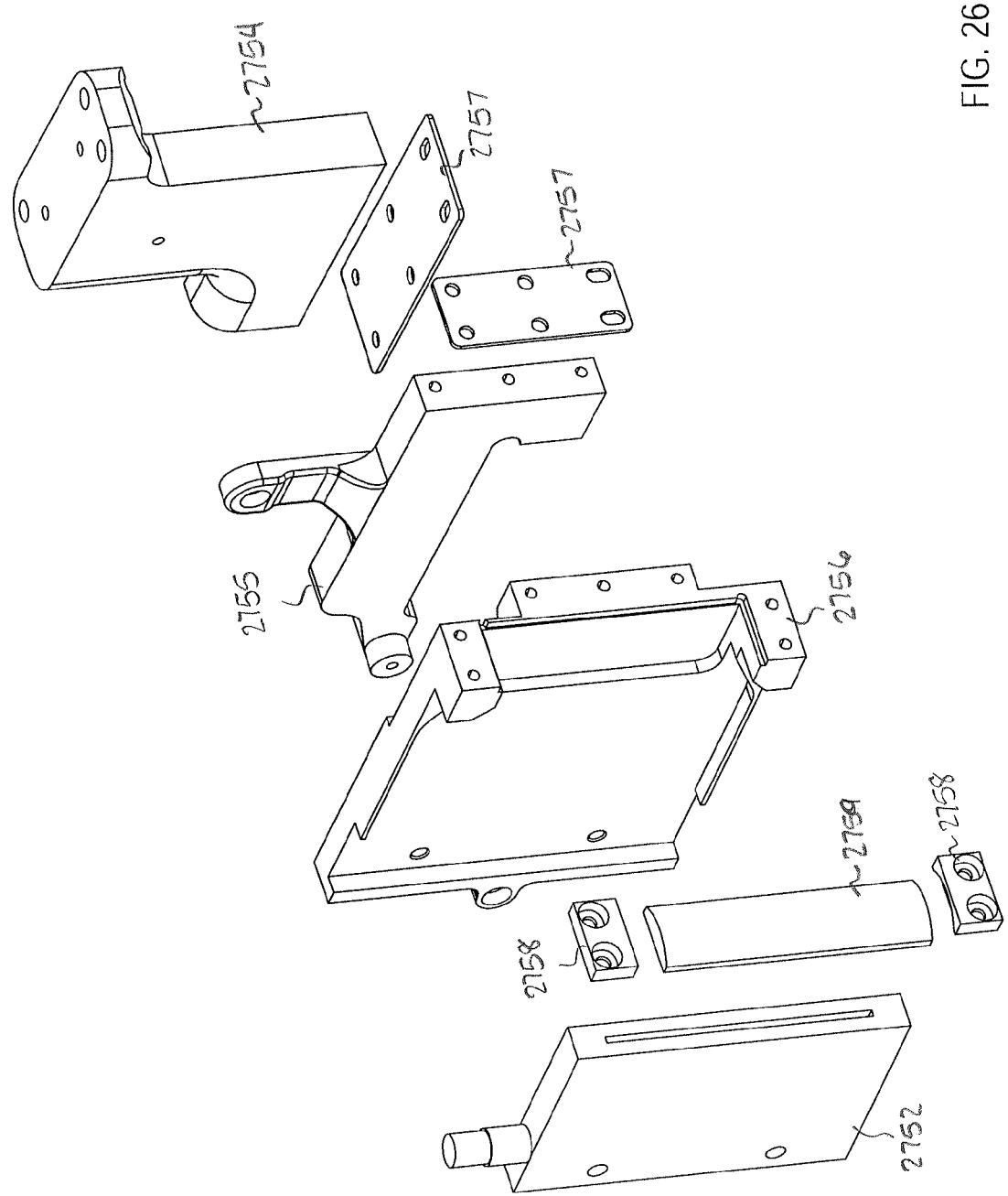

As shown in FIGS. 24-28, the full-column detection portion 2750 includes an illumination assembly 2751, an imaging assembly 2760, and a focusing assembly 2770. The illumination assembly 2751 can be any suitable device and/or assembly configured to produce an output of light energy. As shown in FIGS. 25 and 26, for example, the illumination assembly 2751 includes a linear optical output array 2752, a mounting structure 2753, and a lens 2759. The linear optical output array 2752 (also referred to herein as "optical output") can be any suitable emitter (e.g., light or photon emitter). For example, in some embodiments, the optical output 2752 can be an array of fiber optic outputs configured to emit light energy produced by a light source (e.g., the light source 2795). In some embodiments, the optical output 2752 can be an array of LEDs and/or the like. In still other embodiments, the optical output 2752 can be a single emitter configured to emit light through an elongate aperture or the like defined by the optical output 2752. In this manner, the optical output 2752 can output, for example, a column of light having a predetermined length.

In some embodiments, the optical output 2752 can output light energy and/or photos having a wavelength in the ultraviolet spectrum or the like. In some embodiments, the optical output 2752 can be a narrow-band light source and/or can produce a column of light having a single wavelength. In other embodiments, the optical output 2752 can include a filter or monochromator configured to output the column of light having the single wavelength. In this manner, the optical output 2752 can emit photons having a desired wavelength and/or energy (e.g., an ultraviolet wavelength or energy), which are absorbed by one or more analytes, standards, fluorescent labels, or the like within a sample contained in a capillary of the cartridge 2500. Moreover, the one or more analytes, standards, labels or the like can then emit one or more photons (e.g., via fluorescence, phosphorescence, and/or the like), which in turn, are detected by the imaging assembly 2760, as described in further detail herein.

In some instances, the optical output 2752 can be operable to and/or optimized for full-column and/or real-time detection. For example, the optical output 2752 can be an LED array configured to output, for a relatively long duration, a relatively constant optical output as compared to, for example, a laser light source. More specifically, some known electrophoretic methods use a laser to illuminate a single-point on a column with a high intensity for a relatively short duration. Such methods are suitable for delivering sufficient energy to a single-point to achieve accurate measurements, but because the intensity of the laser can damage the detector if applied for long periods, such methods are generally unsuitable for full-column detection or real-time detection. An LED array, however, can illuminate a full-column at a lower intensity for a longer duration to produce sufficient energy to achieve accurate measurements over the full-column while electrophoresis is occurring.

The mounting structure 2753 includes a first adjustment block 2754, a second adjustment block 2755, an adjustment plate 2756, and a pair of mounting clamps 2758. The mounting clamps 2758 are coupled to an end portion of the adjustment plate 2756 to clamp, couple, and/or otherwise retain the lens 2759 in a fixed position relative to the end portion of the adjustment plate 2756, as shown in FIG. 25. The mounting structure 2753 is configured to adjustably support and/or adjustably mount the optical output 2752, for example, to the optics support plate 2121 of the frame 2120. More specifically, as shown in FIG. 26, the mounting structure 2753 includes a first mounting plate 2757 configured to adjustably couple the first adjustment block 2754 to the second adjustment block 2755 and a second mounting plate 2757 configured to adjustably couple the second adjustment block 2755 to the adjustment plate 2756. In some embodiments, the arrangement of the mounting structure 2753 is such that the first adjustment block 2754 allows for a horizontal adjustment of at least a portion of the illumination assembly 2751 (e.g., relative to the cartridge retainer 2400) and the second adjustment block 2755 allows for a vertical adjustment of at least a portion of the illumination assembly 2751 (e.g., relative to the cartridge retainer 2400). Similarly, the optical output 2752 can be slidably coupled to the adjustment plate 2756 such that the optical output 2752 can be slid along a length of the adjustment plate 2756 to be positioned closer to or further from, for example, the lens 2759. In this manner, the optical output 2752 can be placed in a desired position relative to the cartridge retainer 2400 and/or the cartridge 2500 retained by the cartridge retainer 2400, as described in further detail herein.

Figure 27:
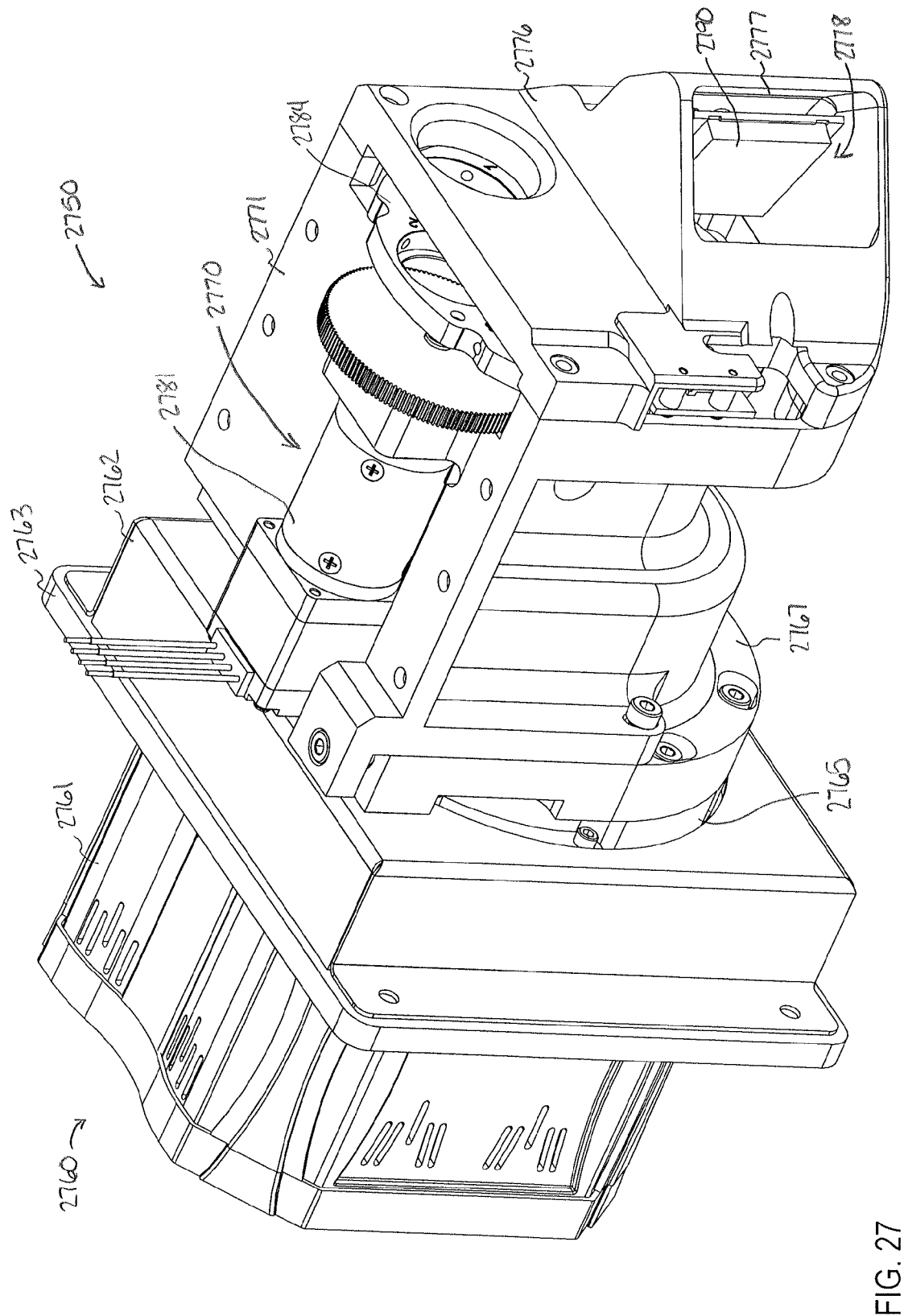
FIGS. 27 and 28 are a perspective view and an exploded view, respectively, of a camera assembly included in the full-column detection portion of the optics assembly illustrated in FIG. 24.
Figure 28:
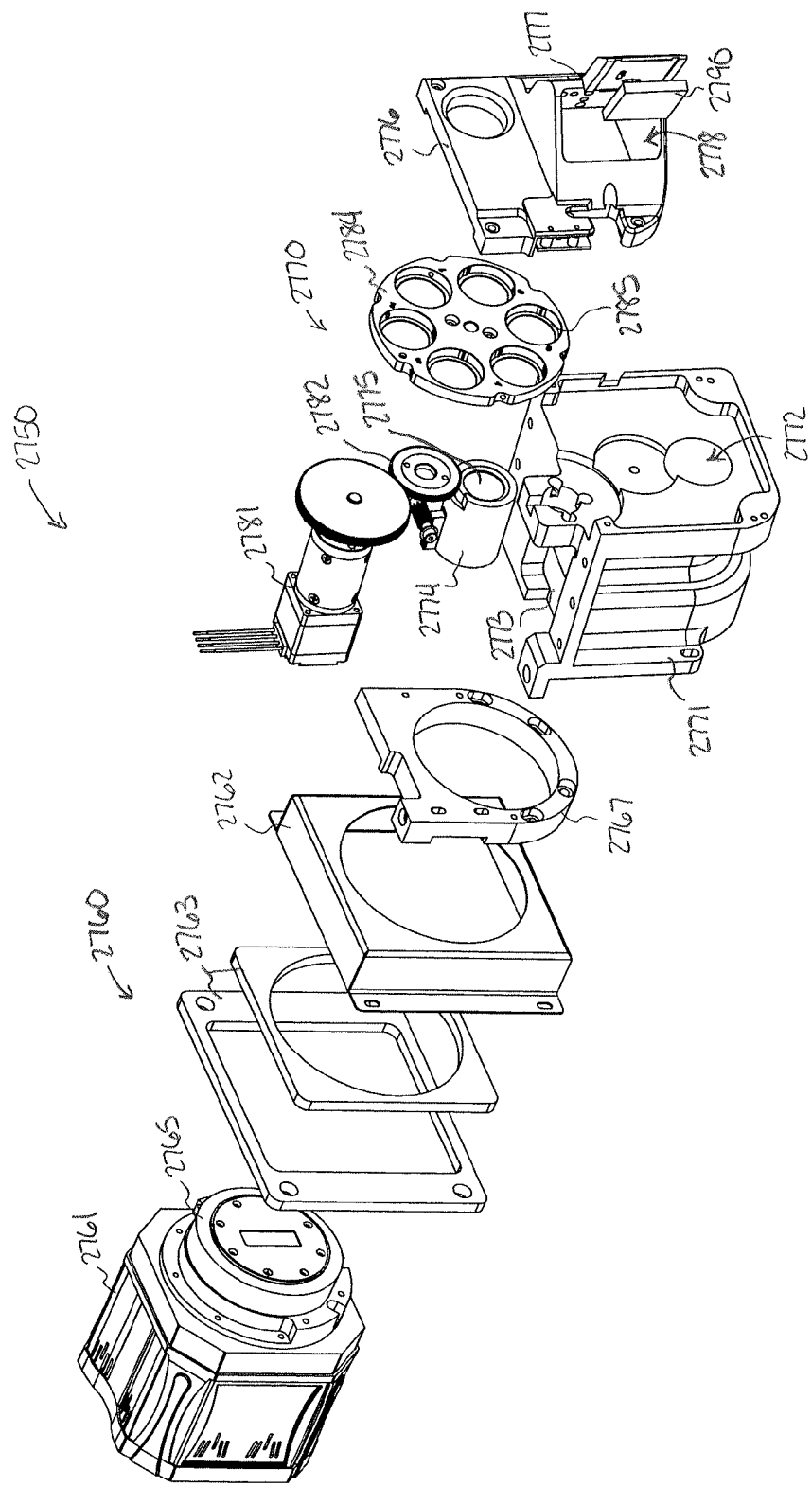

The imaging assembly 2760 of the full-column detection portion 2750 can be and/or can include any suitable device, mechanism, assembly, and/or the like. As shown in FIGS. 27 and 28, the imaging assembly 2760 includes an imaging device 2761, a seal bracket 2762, one or more seals 2763, a rotation flange 2765, and a transition flange 2767. The imaging device 2761 can be any suitable camera or detector configured to detect a signal emitted by, for example, an analyte and/or a standard (described above). For example, the imaging device 2761 can be a charge-coupled device (CCD) array and/or the like that can be used to continuously monitor, in real time, the signal emitted by the analyte and/or the standard to allow a user to rapidly determine whether an analyte is present in the sample, and optionally, the amount or activity of the analyte. In other embodiments, the imaging device 2761 can be a photodiode such as the photodiodes 2728 and 2738 described above.

The seal bracket 2762, the seal(s) 2763, the rotation flange 2765, and the transition flange 2767 are collectively configured to couple the imaging device 2760 to a mounting block 2771 of the focusing assembly 2770. Moreover, the arrangement of the imaging assembly 2760 is such that imaging device 2761 is isolated from light emitted by an external source (e.g., other than the optical output 2752). In other words, the seal bracket 2762, the seal(s) 2763, the rotation flange 2765, and the transition flange 2767 collectively form a light impermeable seal between the imaging device 2761 and the mounting block 2771.

The focusing assembly 2770 includes the mounting block 2771, a lens holder 2774, a lens 2775, a mirror retention block 2776, a motor 2781, and a filter wheel 2784. As described above, the mounting block 2771 is coupled to the imaging assembly 2760 (e.g., the transition flange 2767 or other portion of the imaging assembly 2760). The mounting block 2771 is also coupled to the mirror retention block 2776 (see e.g., FIG. 27). Said another way, the mounting block 2771 is disposed between the imaging assembly 2760 and the mirror retention block 2776. The mounting block 2771 can be any suitable shape, size, and/or configuration. For example, as shown in FIG. 28, the mounting block 2771 defines an opening 2772 and a motor recess 2773. The lens holder 2774 receives the lens 2775 and is movably disposed within the opening 2772. The motor 2781 is at least partially disposed within the motor recess 2773 (see e.g., FIG. 27) and is operable to move the lens holder 2774 within the opening 2772 defined by the mounting block 2771. For example, in some embodiments, the motor 2781 can be configured to rotate a pinion or the like, which in turn, can result in a rack included in and/or formed by the lens holder 2774 being advanced relative to the pinion. As such, the lens holder 2774 can be moved within the mounting block 2771, for example, to focus at least a portion of light (e.g., emitted by the optical output 2752) passing through the lens 2775.

As described above, the mirror retention block 2776 is coupled to mounting block 2771. The mirror retention block 2776 defines an opening 2778 and includes a mirror adjustment mechanism 2777. More specifically, the mirror adjustment mechanism 2777 is disposed within the opening 2778 defined by the mirror retention block 2776 (see e.g., FIG. 27). The mirror adjustment mechanism 2777 is configured to receive and/or couple to a mirror 2790 and can be engaged, manipulated, and/or otherwise reconfigured to adjust and/or move the mirror 2790 within the mirror retention block 2776. The arrangement of the full-column detection portion 2750 is such that the opening 2778 defined by the mirror retention block 2776 is aligned with, for example, the second optics openings 2415 and 2425 of the first side wall 2411 and second side wall 2421, respectively, of the cartridge retainer 2400. In this manner, light emitted from the optical output 2752 can pass through the second optics openings 2415 and 2425 of the cartridge retainer 2400 (and a portion of the cartridge 2500 disposed therein) and into the opening 2778 defined by the mirror retention block 2776. The mirror 2790, in turn, can be adjusted and/or positioned to direct at least a portion of the light toward the imaging device 2761, as described in further detail herein.

The filter wheel 2784 is operably coupled to the motor 2781 (e.g., via one or more gears 2782) and rotatably disposed between the mounting block 2771 and the mirror retention block 2776. The filter wheel 2784 can be any suitable shape, size, and/or configuration. For example, as shown in FIG. 28, the filter wheel 2784 is a relatively thin plate that defines a set of openings 2785. More specifically, in this embodiment, the filter wheel 2784 defines a set of six openings 2785, each of which is configured to receive an optical filter and/or the like (not shown). The optical filters can be any suitable filters, lens, and/or other optical devices configured to focus, filter, convert, and/or otherwise modify at least a portion of light passing therethrough. In some embodiments, each opening 2785 defined by the filter wheel 2784 can include a different filter and/or lens. In this manner, the motor 2781 can rotate the filter wheel 2784 to align any one of the filters with the opening 2772 defined by the mounting block 2771. Thus, at least a portion of the light that is directed by the mirror 2790 toward the imaging device 2761 passes through the desired filter (and lens 2776) prior to entering the imaging device 2761, as described in further detail herein.

In some instances, the filter wheel 2784 can be rotated during an electrophoresis run. In this way, alternative-imaging modes can be used while the electrophoretic process is occurring. For example, the filter wheel 2784 can be placed in a first position such that a first filter is aligned with the opening 2772 defined by the mounting block 2771 and then can be moved (e.g., rotated) to a second position, third position, and/or fourth position to align a second filter, third filter, and/or fourth filter, respectively, with the opening 2772. In some such instances, the first filter, for example, can enable the imaging device 2761 to capture fluorescence induced in a label moiety coupled to an analyte; the second filter, for example, can enable the imaging device 2761 to capture native fluorescence of a first analyte; the third filter, for example, can enable imaging device 2761 to capture native fluorescence of a second analyte; and the fourth filter, for example, can enable the imaging device 2761 to detect absorbance of an analyte. In other embodiments, the filter wheel 2784 can include any other suitable filter or combination of filters. By rotating the filter wheel 2784 alternate images of the full-column (e.g., illuminated by the optical output 2752) can be captured at any point during a run. In this way, as analytes migrate through the column (e.g., capillary), the fluorescence of labels, native fluorescence of analytes, and/or absorbance of analytes can each be tracked separately in a single run.

As described above, the system 2000, and specifically the cartridge retainer 2400, can be configured to accept different cartridges, such as the molecular weight cartridge 2500' and the isoelectric focusing cartridge 2500". Other types of cartridges, such as isotachophoresis cartridges, capillary electrochromatography, etc. are also possible. In some instances, cartridges 2500 can be reusable. Similarly stated, the cartridges 2500 can be suitable to run an analysis multiple times with the same or different sample.

As shown in FIGS. 29-37, the molecular weight cartridge 2500' has a cartridge body 2501' and a capillary 2530'. The cartridge body 2501' defines at least one aperture 2505', at least one vertical registration features 2510', and at least one horizontal registration feature 2515'. As described above with reference to FIGS. 18 and 19, the vertical registration features 2510' can be configured to slidably engage, mate with, and/or otherwise interact with the first guide rail 2428 (e.g., an upper guide rail) and the second guide rail 2429 (e.g., a lower guide rail) of the cartridge retainer 2400. More specifically, in this embodiment, the cartridge body 2501' includes a first vertical registration feature (e.g., an upper registration feature) configured to engage the first guide rail 2428 and a second vertical registration feature (e.g., a lower registration feature) configured to engage the second guide rail 2429. In some embodiments, the vertical registration features 2510' can be, for example, grooves, notches, slots, channels, etc. configured to receive a portion of the first guide rail 2428 or the second guide rail 2429 (see e.g., FIGS. 29, 33, and 34). As such, the guide rails 2428 and 2429 and the vertical registration features 2510' collectively limit and/or substantially prevent movement of the molecular weight cartridge 2500' in the vertical direction.

Figure 33:
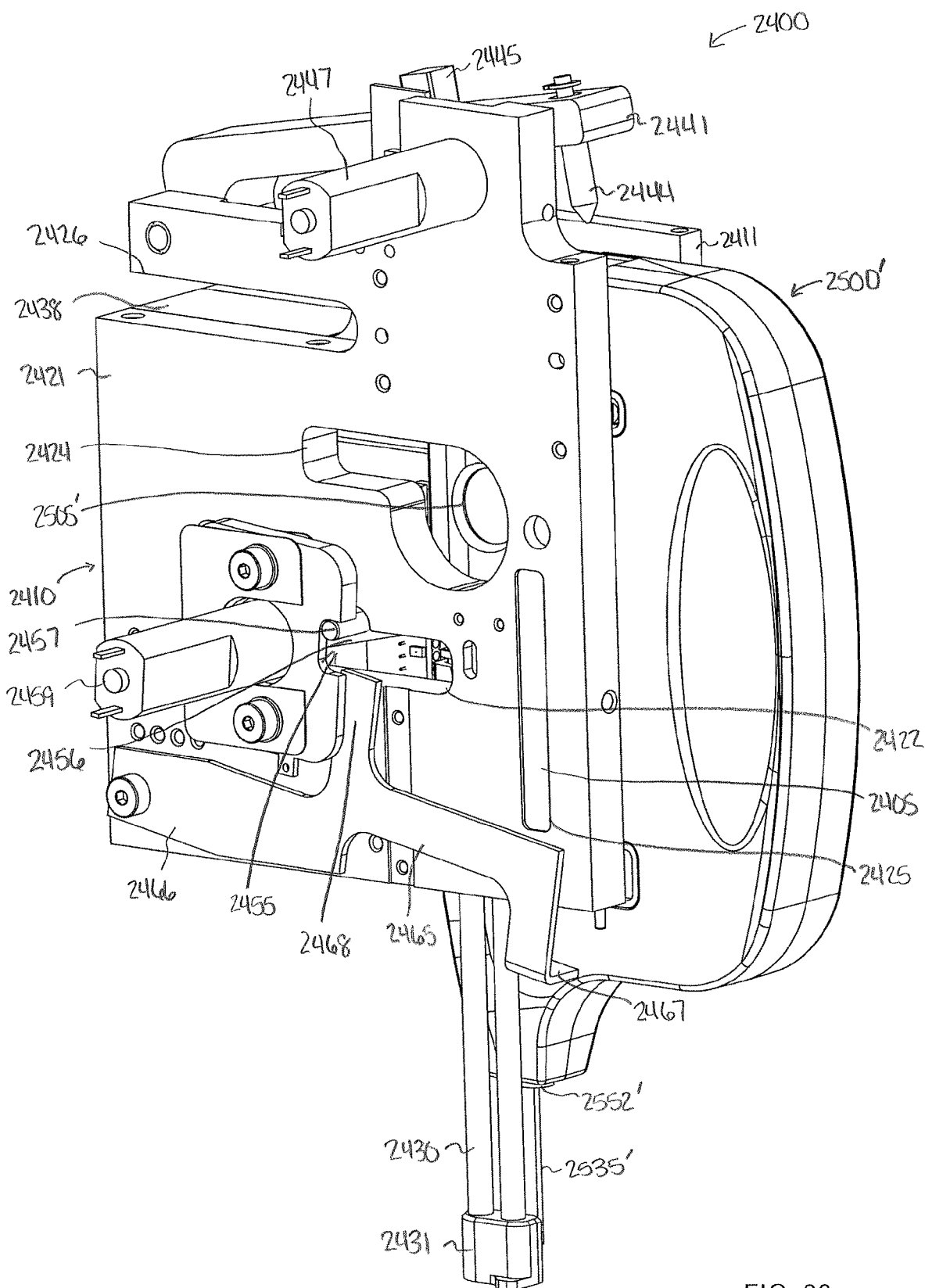
Figure 34:
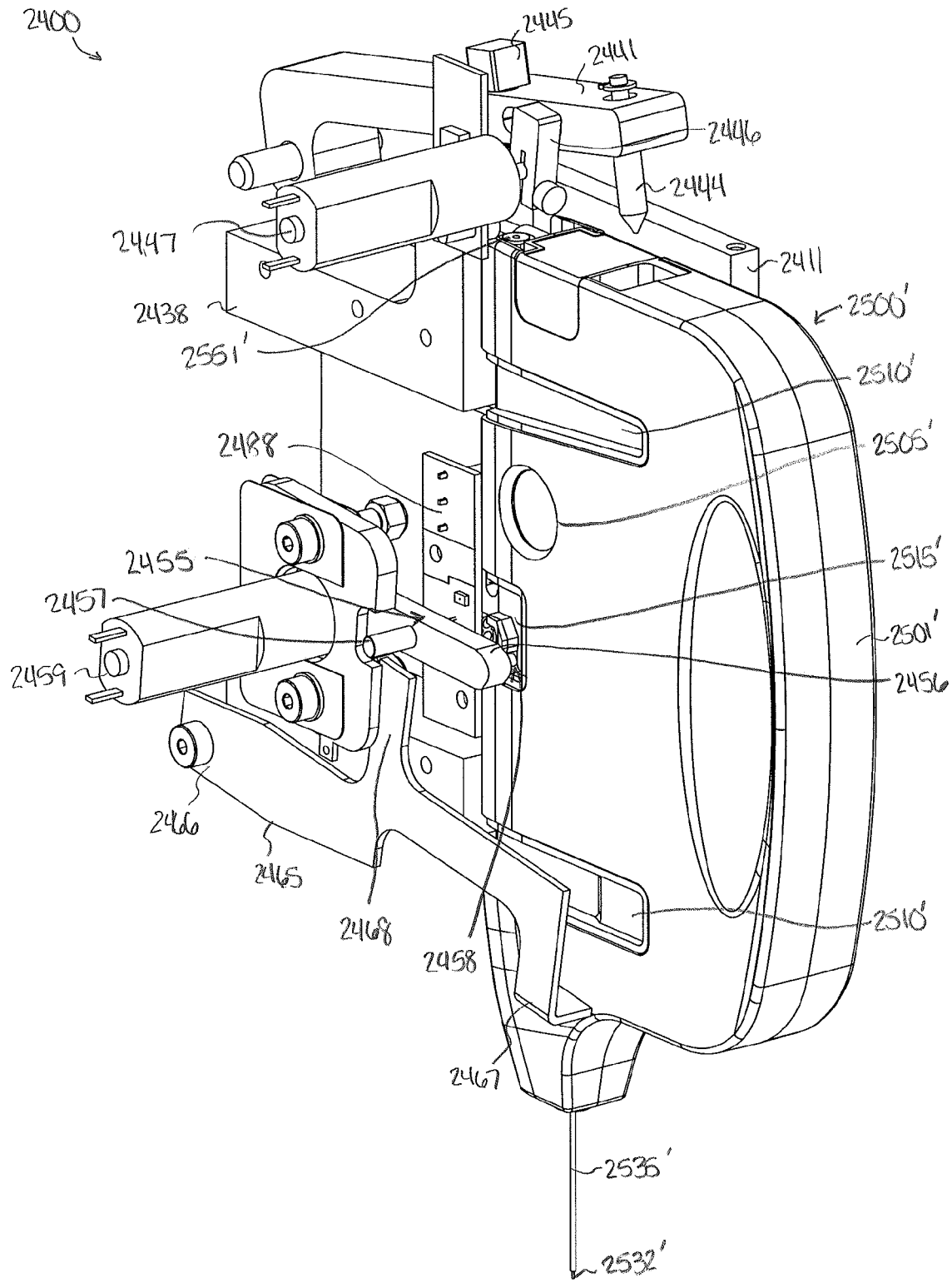
FIG. 34 is a left side perspective view of the capillary cartridge of FIG. 29 and the capillary cartridge retainer of FIG. 14, shown without a sidewall.

The horizontal registration feature 2515' similarly can be configured to mate with the latch member 2458 of the cartridge retainer 2400. For example, the horizontal registration feature 2515' can be, for example, a notch, groove, slot, channel, etc. configured to selectively receive and contact a portion of the latch member 2458 when the latch member 2458 is moved to a latched or locked configuration, as shown in FIGS. 33 and 34. The horizontal registration feature 2515' can have a dog-leg shape such that the latch member 2458 can be rotated into and lock against a surface of the cartridge body 2501' defining the horizontal registration feature 2515'. In this way, the horizontal registration feature 2515' and the latch member 2458 can collectively prevent movement of the molecular weight cartridge 2500' in the horizontal direction (e.g., in the direction of insertion). Moreover, when the latch member 2458 engages the horizontal registration feature 2515', the molecular weight cartridge 2500' can be pulled into the cartridge retainer 2400 such that one or more portions of the molecular weight cartridge 2500' are placed in contact with the contact members 2485, as described in further detail herein. In some embodiments, the latch member 2458 can be moved to contact the horizontal registration feature 2515' in response to a surface of the cartridge body 2501' being placed in contact with the sensor 2488. In some embodiments, the cartridge body 2501' can also abut against an inner surface of the first sidewall 2411 and/or an inner surface of the second sidewall 2421 of the cartridge retainer 2400 to prevent movement of the molecular weight cartridge 2500' in horizontal directions other than the direction of insertion of the cartridge 2500' (e.g., in a transverse or lateral direction). In this way, the cartridge retainer 2400 can limit and/or substantially prevent horizontal and/or vertical movement of the molecular weight cartridge 2500' relative to the cartridge retainer 2400 when the latch member 2458 is engaged.

Figure 30:
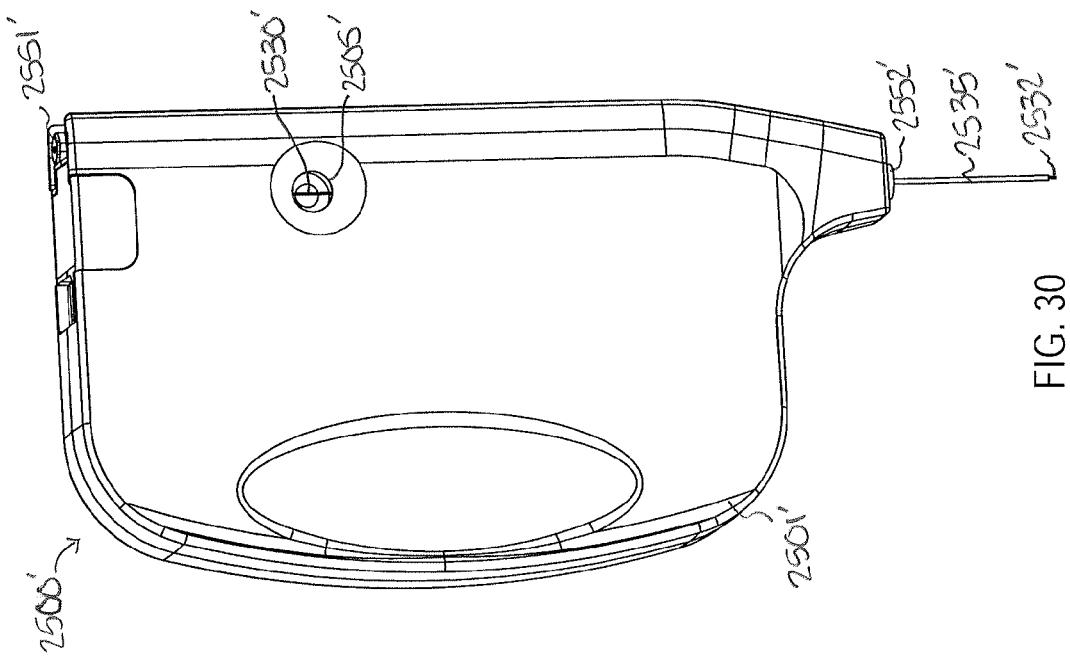
FIGS. 29 and 30 are a left side perspective view and a right side perspective view, respectively, of a capillary cartridge configured for use within the system of FIG. 2 during an molecular weight analysis.
Figure 29:
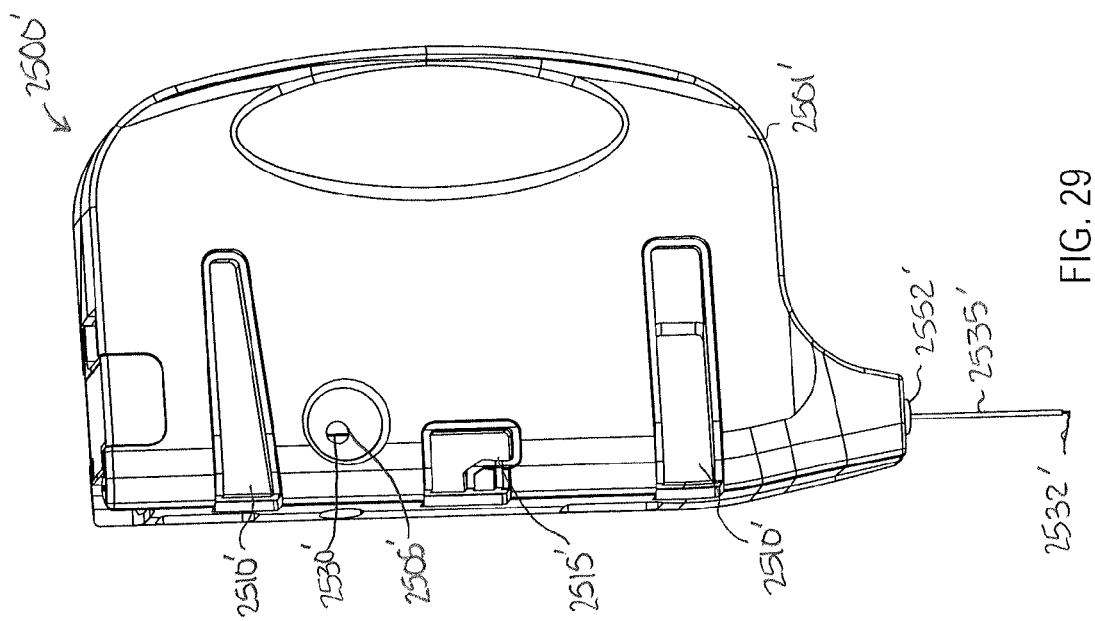
Figure 31:
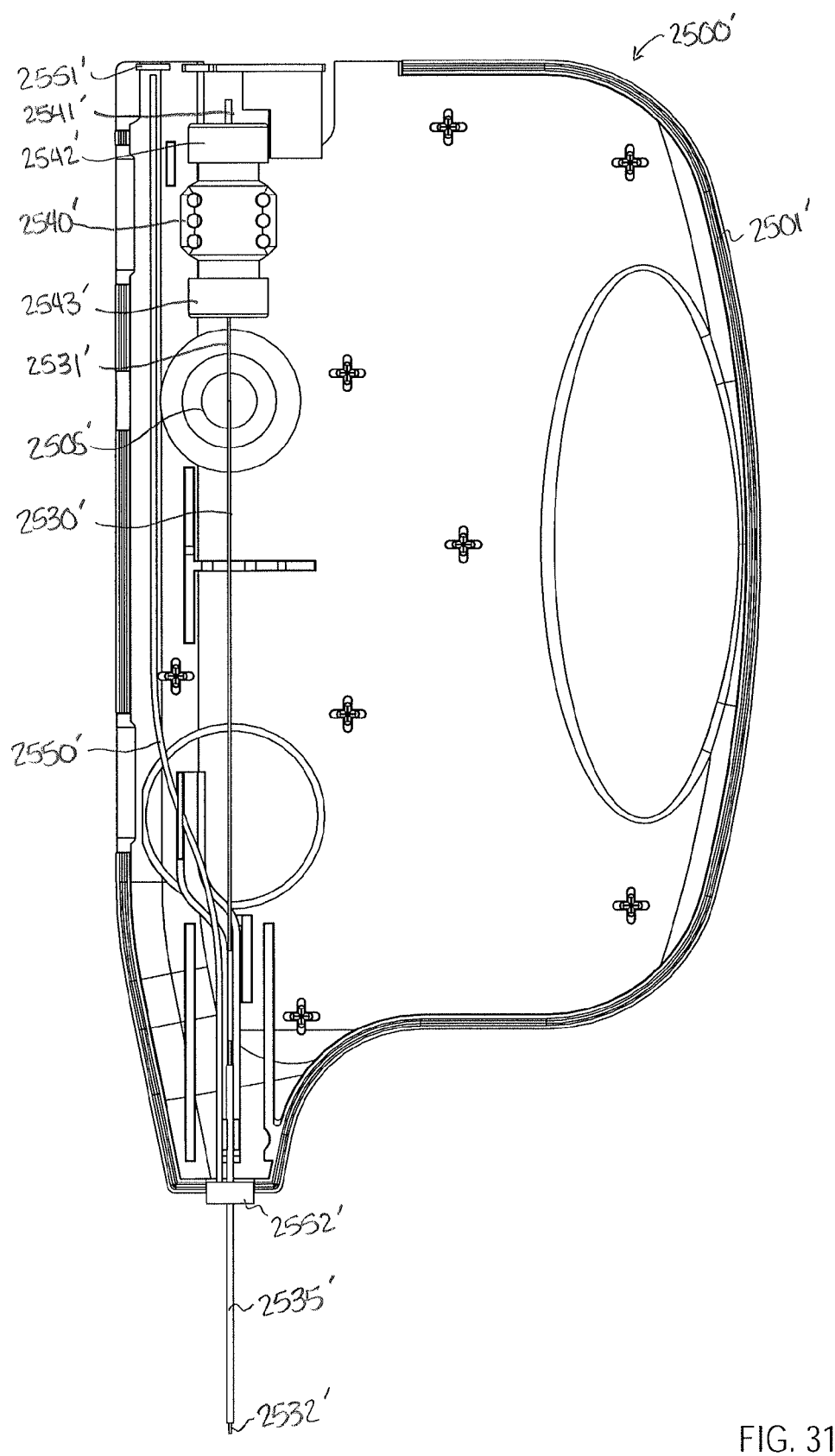
FIG. 31 is a side view of the capillary cartridge of FIG. 29 illustrated without a portion of a cartridge body.
Figure 32:
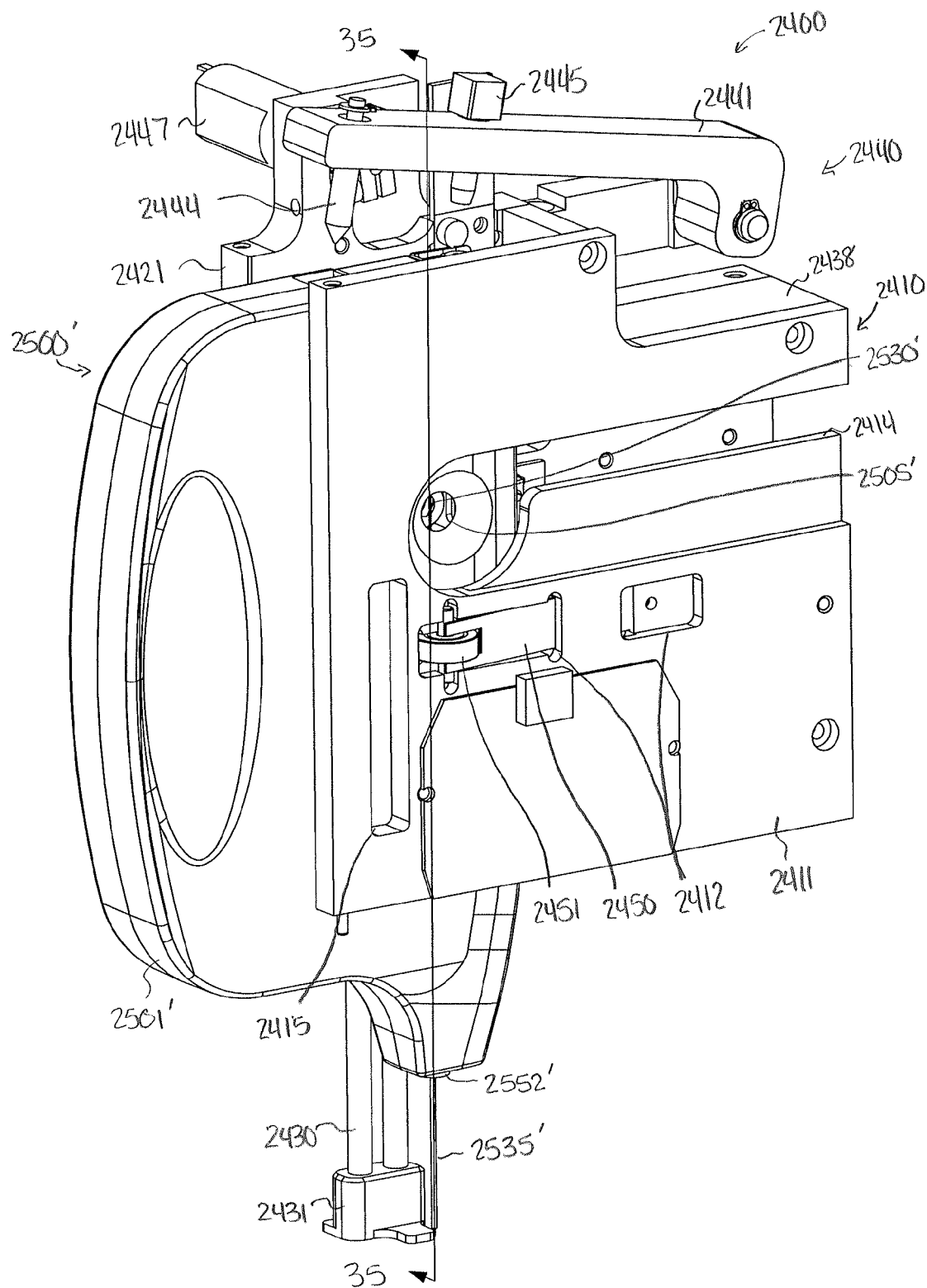
FIGS. 32 and 33 are a right side perspective view and a left side perspective view, respectively, of the capillary cartridge illustrated in FIG. 29 retained within the capillary cartridge retainer illustrated in FIG. 14.

The one or more apertures 2505' defined by the cartridge body 2501' can be any suitable shape, size, or configuration. For example, as shown in FIGS. 29-31. The molecular weight cartridge 2500' includes a first aperture 2505' disposed on a first side of the cartridge body 2501' and a second aperture 2505' disposed on a second side of the cartridge body 2501' opposite the first side. More specifically, the first aperture 2505' and the second aperture 2505' are disposed in opposite and/or aligned positions. The position of the apertures 2505' is such that when the molecular weight cartridge 2500' is positioned within the cartridge retainer 2400, the apertures 2505' are substantially aligned with, for example, the central bore 2711 of the central member 2710 included in the single-point detection portion 2701 of the optics assembly 2700. Moreover, the capillary 2530' is disposed within the cartridge body 2501' such that portion of the capillary 2530' is aligned with and/or between the apertures 2505' (see e.g., FIGS. 29 and 30), thereby allowing the portion of the capillary 2501' to be visualized by the single-point detection portion 2701 of the optics assembly 2700.

The capillary 2530' can be configured to be placed in fluid communication with a sample contained, for example, in a sample vial 2367 disposed in the reagent tray 2365. In some embodiments, an end portion 2532' of the capillary 2530' can extend outside of the cartridge body 2501' of the molecular weight cartridge 2500'. In other embodiments, the capillary 2530' can be placed in fluid communication with a sample in one or more sample vials 2367 and/or wells 2366 via a pipette tip or other suitable structure projecting from the cartridge body 2501'. In some embodiments, a sleeve 2535' such as a plastic or carbon sleeve can be disposed around a portion of the capillary 2530' to, for example, increase the rigidity of the capillary 2530'. In this manner, the sleeve 2535' can protect the end portion 2532' of the capillary 2530' to prevent undesirable deformation or breaking thereof. Such a sleeve 2535' can, for example, have sufficient rigidity to pierce a septa or other covering of a sample vial. In some embodiments, the sleeve 2535' can further provide insulation (e.g., thermal and/or electric insulation) for the end portion 2532' of the capillary 2530'.

The molecular weight cartridge 2500' also includes a pressure line 2550', a pressure port 2551', and a seal 2552', as shown in FIGS. 31-35. When the molecular weight cartridge 2500' is disposed within the cartridge retainer 2400, the pressure line 2550' can be fluidically coupled to the pressure nozzle 2445 via the pressure port 2551' (see e.g., FIG. 35). The seal 2552' is configured to be pressed against the sample vial(s) 2367 or container(s) when the reagent tray 2365 is moved relative to the molecular weight cartridge 2500'. For example, the reagent tray 2365 can be configured to be moved in a vertical direction to place the capillary 2530' in fluid communication with a sample vial such that the seal 2552' abuts the sample vial. The system 2000 can be configured to actuate the pressure source 2497, which can pressurize the sample vial, urging the sample from the vial into the capillary 2530'. In addition or alternatively, the capillary 2530' can be fluidically coupled to the vacuum source 2496 via the vacuum port 2448 and a vacuum interface 2541'. The system 2000 can be configured to actuate the vacuum source 2496 and/or the pressure source 2497 to urge a flow of the sample from the vial into the capillary 2530'. In some instances, by applying both a negative pressure and a positive pressure to the sample vial, a volume and/or flow of sample can be drawn into the capillary 2530' with a desired set of characteristics (e.g., with less air bubbles, turbulence, and/or the like).

Figure 35:
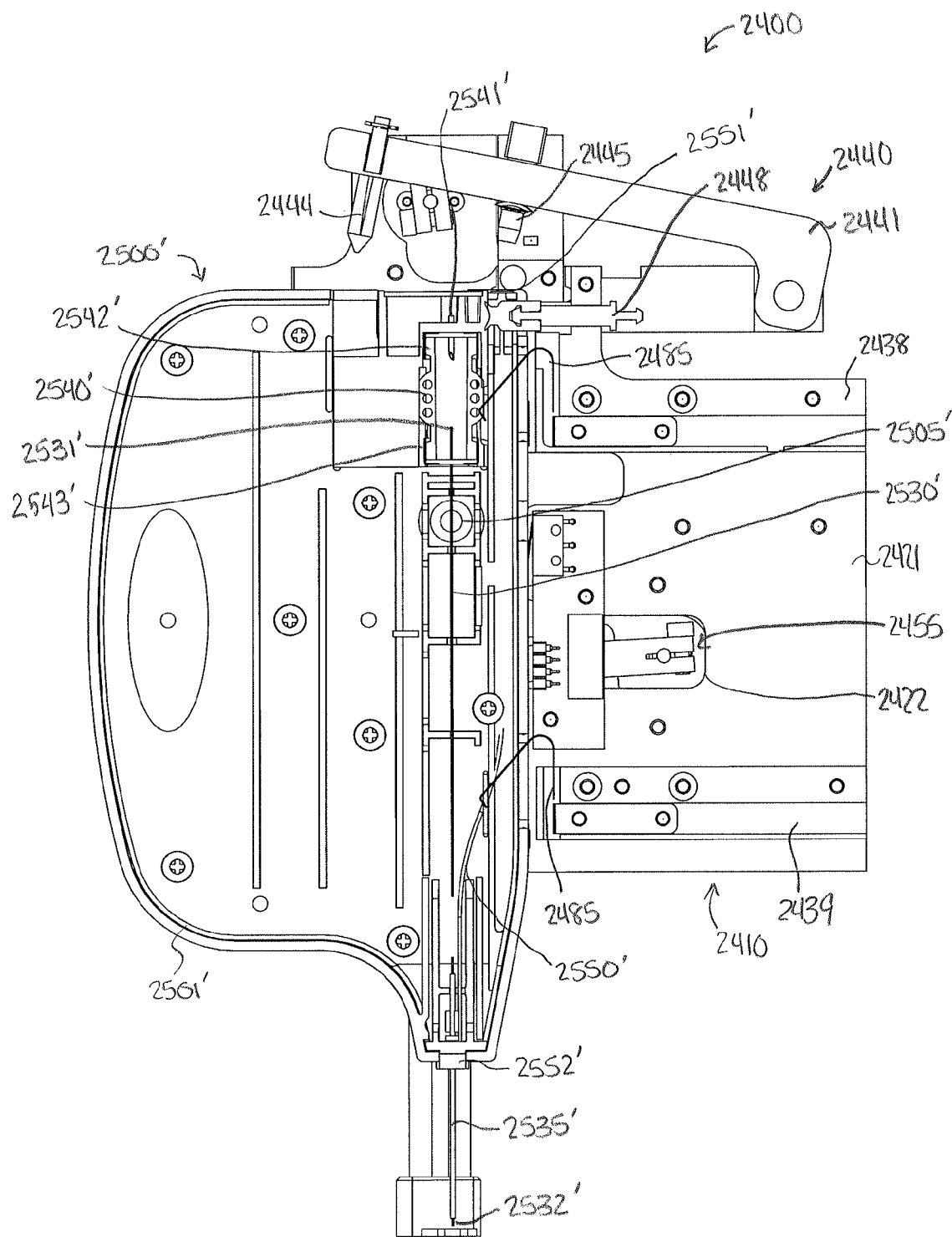
FIG. 35 is a cross-sectional view of the capillary cartridge and capillary cartridge retainer taken along the line 35-35 in FIG. 31.

The molecular weight cartridge 2500' further includes a dual septa vial 2540' having an inlet septa 2543' and an outlet septa 2542' (see e.g., FIGS. 31 and 35). The inlet septa 2543' and/or the outlet septa 2542' can be substantially impervious to liquid. The inlet septa 2543' is configured to be pierced by an end portion 2531' of the capillary 2530' (opposite the end portion 2532') to place the capillary 2530' in fluid communication and electrical communication with an interior volume of the dual septa vial 2540'. For example, the dual septa vial 2540' can contain a run buffer that can be delivered to the capillary 2530' and/or can receive and store waste samples from the capillary 2530' during a current run or during previous runs. Moreover, at least the end portion 2531' of the capillary 2530' is electrically conductive and thus, electrically connects or electrically couples the capillary 2530' to the dual septa vial 2540' when the end portion 2531' pierces the inlet septa 2543'.

In some embodiments, the outlet septa 2542' can be gas permeable, such that when the sample is drawn through the capillary 2530' into the dual septa vial 2540', air, but not liquid, can be expelled through the outlet septa 2542'. In addition or alternatively, the dual septa vial 2540' can contain a sponge, filter, and/or other absorbent material to impede the sample from exiting the molecular weight cartridge 2500'. In this embodiment, the outlet septa 2542' is pierced by the vacuum interface 2541'. In some instances, upon completion of a run, the system 2000 can be configured to dry the dual septa vial 2540', for example by cycling air through the dual septa vial 2540'. In some embodiments, the system 2000 can be configured to track and/or determine the quantity of sample aspirated into the dual septa vial 2540' and alert the user to replace the dual septa vial 2540' and/or the molecular weight cartridge 2500' when the dual septa vial 2540' is full and/or after a predetermined number of runs. In some instances, the system 2000 can be configured to block an operation of at least a portion thereof when the dual septa vial 2540' is full.

The dual septa vial 2540' is configured to be electrically coupled to at least a portion of the system 2000 when the molecular weight cartridge 2500' is disposed within the cartridge retainer 2400'. For example, when the molecular weight cartridge 2500' is retained by the cartridge retainer 2400 a portion of the contact member 2485 extending from the first contact bracket 2438 is disposed within the molecular weight cartridge 2500' and in contact with the dual septa vial 2540'. As described above, the contact members 2485 are electrically coupled to a voltage (or current) source such as, for example, the power supply 2210. Thus, the contact member 2485 places the dual septa vial 2540' in electrical contact with the voltage (or current) source. Similarly, the contact member 2485 extending from the second contact bracket 2439 can be placed in contact with a portion of the molecular weight cartridge 2500' and/or a portion of the capillary 2530' to establish an electrical connection therebetween. Therefore, an electric potential can be applied to the capillary 2530' via the contact brackets 2485 and the dual septa vial 2540' that can induce an electromotive force on analytes within the capillary 2530'. In instances in which the analytes are electrically charged, the electric potential can attract the analytes to the end portion 2531' of the capillary 2530' (e.g., toward the dual septa vial 2540'). In some instances, the analytes and/or other portions of the sample can flow toward the end portion of the capillary 2530' with a set of characteristics (e.g., mobility parameters, etc.) based at least in part on molecular weight, wherein analytes with a smaller molecular weight can travel faster than analytes with a larger molecular weight.

Figure 36:
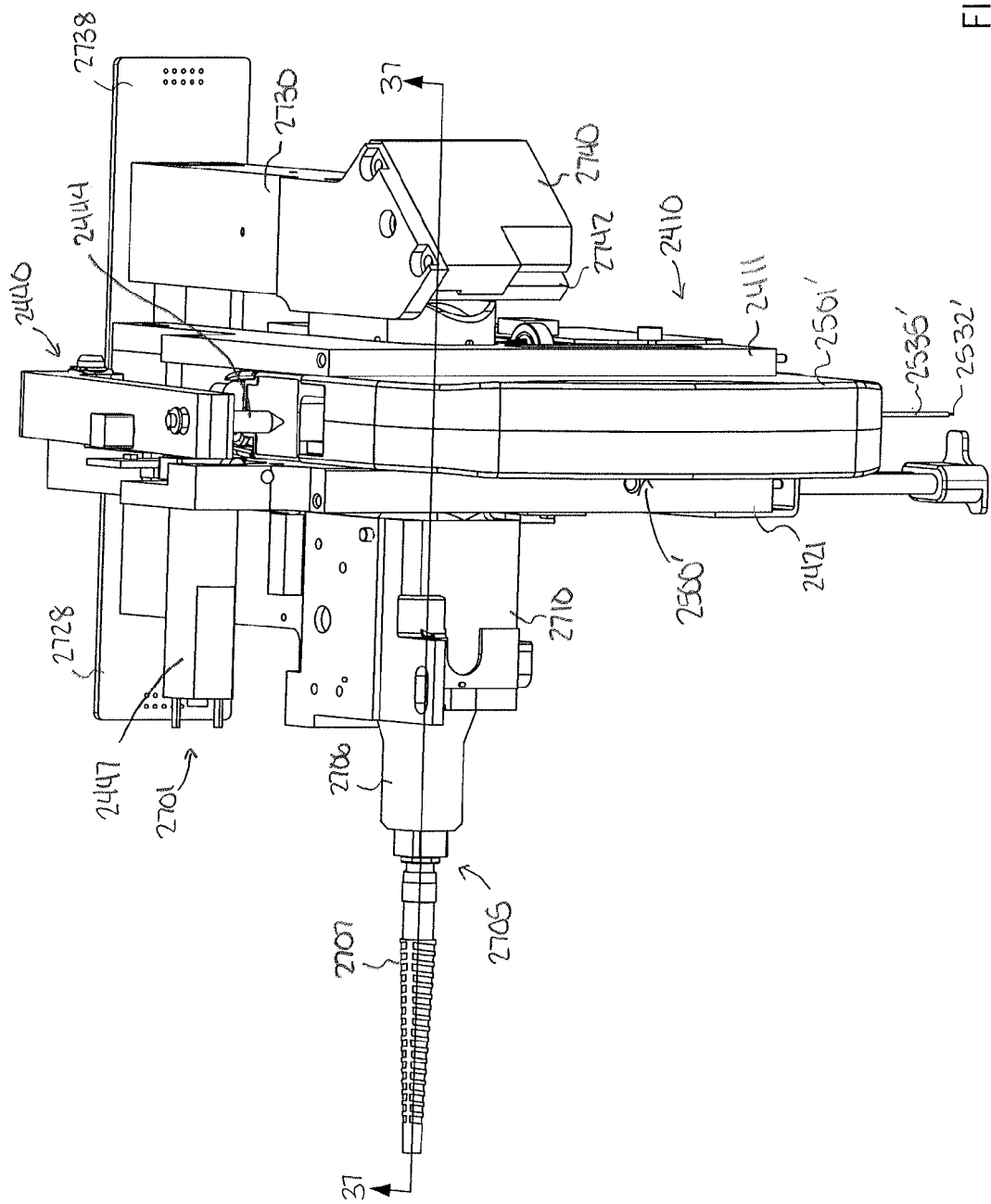
FIG. 36 is a front perspective view of the capillary cartridge of FIG. 29, the single-point detection portion of the optics assembly illustrated in FIG. 20, and a portion of the capillary cartridge retainer of FIG. 14.
Figure 37:
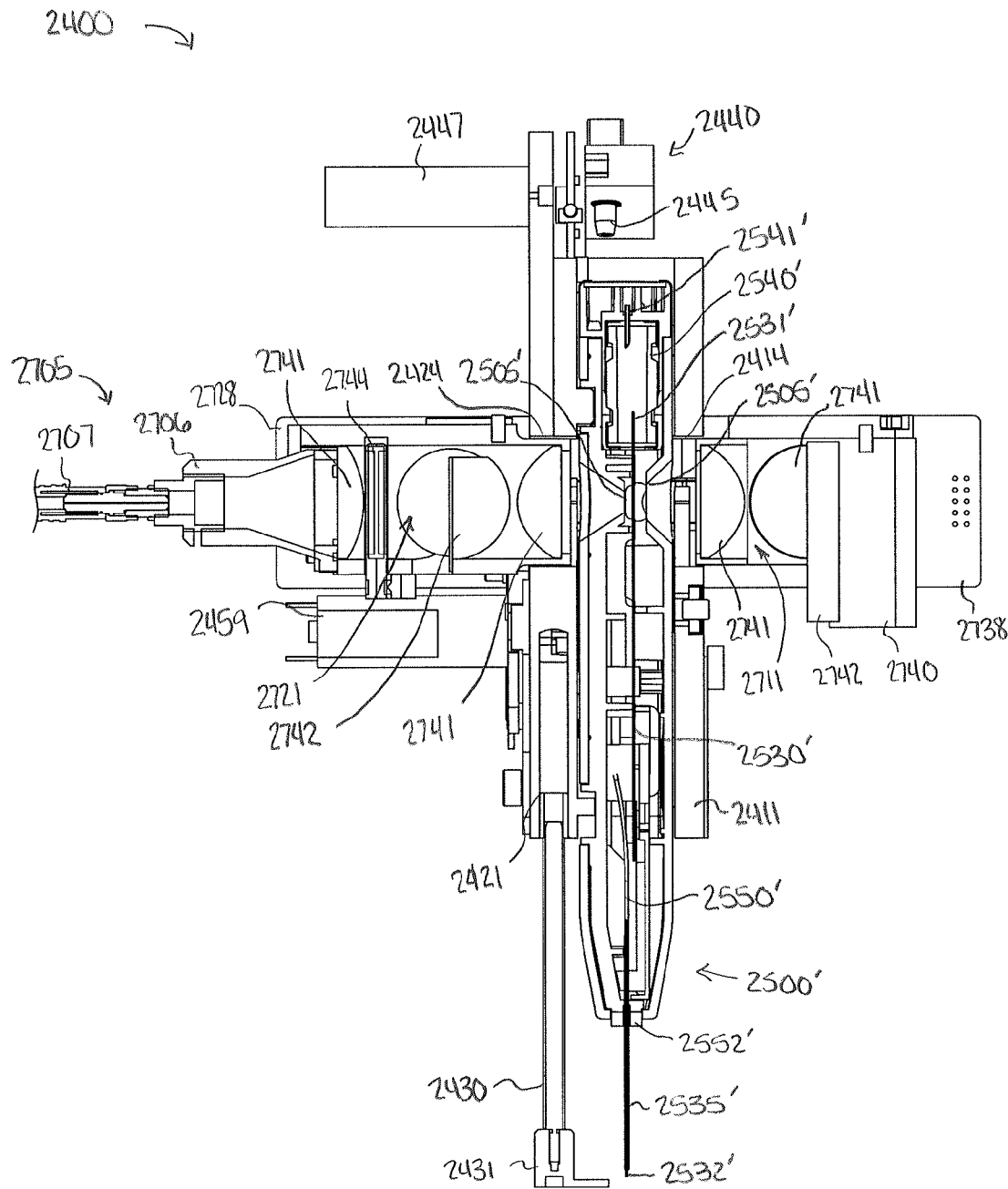
FIG. 37 is a cross-sectional view of the capillary cartridge, the single-point detection portion of the optics assembly, and the capillary cartridge retainer taken along the line 37-37 in FIG. 36.
Figure 39:
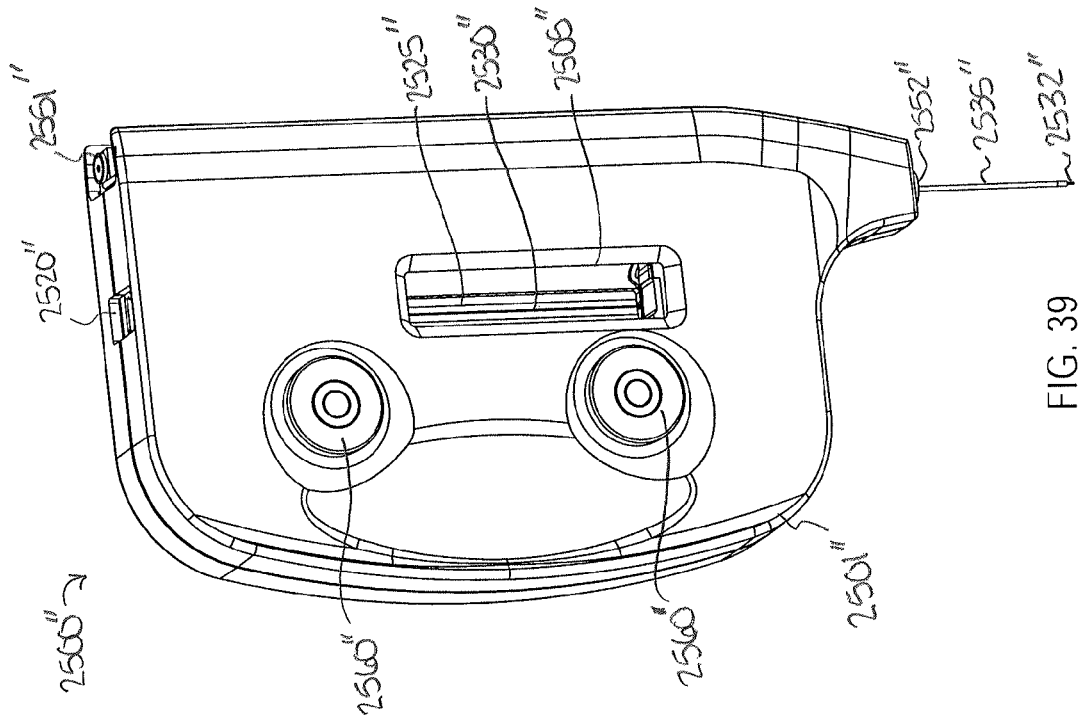
FIGS. 38 and 39 are a left side perspective view and a right side perspective view, respectively, of a capillary cartridge configured for use within the system of FIG. 2 during a capillary electrophoresis analysis.
Figure 38:
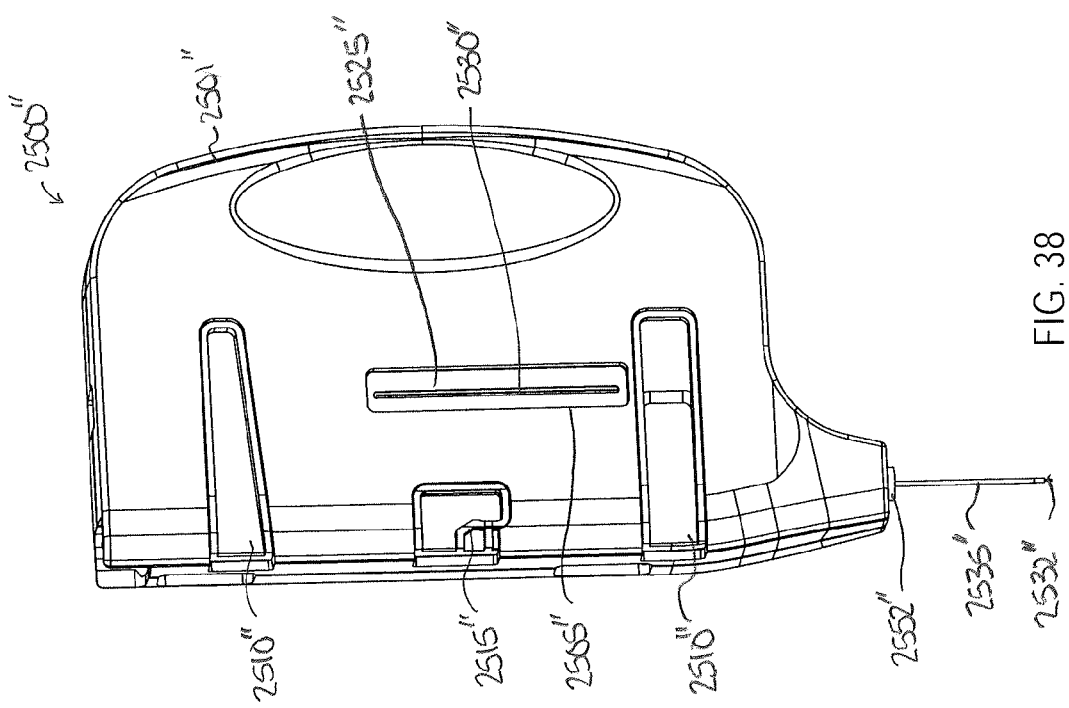

As shown in FIGS. 35-37, the molecular weight cartridge 2500' can be disposed within the cartridge retainer 2400 and the system 2000 can be set to perform a molecular weight analysis. In some instances, prior to inserting the molecular weight cartridge 2500', the user can prepare the reagent tray 2365 and/or the molecular weight cartridge 2500'. As described above, the user can then insert the molecular weight cartridge 2500' into the cartridge retainer 2400 in a single, predetermined orientation. In this manner, the molecular weight cartridge 2500' can be placed in a desired position within the cartridge retainer 2400 such that the apertures 2505' are aligned with the single-point detection optics portion 2701, as shown in FIG. 37. More specifically, the molecular weight cartridge 2500' is positioned within the system 2000 such that the apertures 2505' and thus, the capillary 2530', is aligned with the central bore 2711 of the central member 2710. Thus, by aligning the molecular weight cartridge 2500' with the single-pointe detection optics portion 2701, energy and/or photons emitted by the optical output 2707 can be directed to a predetermined portion of the capillary 2530'.

Once the molecular weight cartridge 2500' is retained in the cartridge retainer 2400, the reagent tray 2365 can be moved relative to the molecular weight cartridge 2500' to position at least a portion of the capillary 2530' in a well and/or sample vial of the reagent tray 2365, as described above. Moreover, the capillary 2530' is fluidically coupled to the vacuum source 2496 when the molecular weight cartridge 2500' is positioned within the cartridge retainer 2400. Accordingly, the vacuum source 2496 can then be activated (e.g., at least semi-automatically) to produce a negative pressure differential within the capillary 2530' that is operable to draw sample into the capillary 2530'. Once the capillary 2530' is disposed within the well and/or sample vial the contact members 2485 can transfer electric energy (e.g., current) to the dual septa vial 2540' and the portion of the molecular weight cartridge 2500' and/or capillary 2530' to apply an electric potential to the sample, which results in analytes migrating within the sample. The rate at which an analyte migrates within the capillary 2540' can be correlated to one or more mobility factors such as, for example, molecular weight, and/or the like.

In this manner, with the analyte migrating within the capillary 2530', the optical output 2707 can emit the energy or photons, which in turn, illuminates and/or energizes a volume of sample flowing through the predetermined portion of the capillary 2530' (at which the energy or photons are directed). The photodiodes 2728 and 2738, in turn, capture and/or detect at least a portion of the energy and/or photons that are reflected, refracted, and/or absorbed by the illuminated and/or energized analytes, standards, label moieties, etc. within that volume of sample. The photodiodes 2728 and 2738 can then send a signal associated with and/or including data regarding the detection and the system 2000 (e.g., a processor in the electronics assembly 2200) can analyze the data to determine molecular weight-based and/or electrophoretic mobility data associated with the analytes in the sample. For example, the length of time between the electric potential being applied and an analyte being detected can be correlated to molecular weight and/or mobility factor of the analyte. In other embodiments, a flow of sample can be induced by the vacuum source 2496 and/or pressure source 2497.

While the system 2000 is described above as receiving the molecular weight cartridge 2500' and performing a molecular weight analysis, in other instances, the system 2000 can receive the isoelectric focusing cartridge 2500" and can be set to a configuration to perform electrophoresis followed by visualization and detection. As shown in FIGS. 38-44, the isoelectric focusing cartridge 2500" has a cartridge body 2501", a capillary 2530", and a set of electrodes 2560". The cartridge body 2501" defines at least one aperture 2505", at least one vertical registration feature 2510", and at least one horizontal registration feature 2515". The vertical registration feature(s) 2510" and the horizontal registration features 2515" can be similar to those described above with reference to the molecular weight cartridge 2500'. Thus, the isoelectric focusing cartridge 2500" can be disposed and temporarily fixed within the cartridge retainer 2400 in a similar manner.

The aperture(s) 2505" defined by the cartridge body 2501" can be any suitable shape, size, and/or configuration. For example, as shown in FIGS. 38-41, the apertures 2505" are elongate openings that are disposed on opposite sides of the cartridge body 2501" (as described above with the molecular weight cartridge 2500'). Thus, the apertures 2505" can be optically aligned with the second optics openings 2415 and 2425 of the cartridge retainer 2400 when the isoelectric focusing cartridge 2500" is positioned therein. Moreover, the apertures 2505" can provide optical access to the length of the capillary 2530" such that the full-column detection portion 2750 of the optical assembly 2700 can image the sample before, during, and/or after isoelectric focusing. The apertures 2505" and the full-column detection portion 2750 of the optics assembly 2700 can collectively be configured for full-column imaging. Similarly stated, the apertures 2505" can expose substantially the entire length (e.g., greater than 90% of the length) of the capillary 2530" disposed between the set of electrodes 2560".

The isoelectric focusing cartridge 2500" further includes a slit plate 2520". The slit plate 2520" can be optically aligned with the apertures 2505" and/or the capillary 2530". The slit plate 2520" can improve resolution of images of isoelectric focusing by, for example, reducing lensing effects associated with the curve of the capillary 2530". Similarly stated, the slit plate 2520" can expose the central portion of the capillary 2530" to the full-column detection portion 2750 of the optics assembly 2700 while occluding the edges of the capillary 2530". In some embodiments, the slit plate 2520" can define a 100 micron, 200 micron, 300 micron, 500 micron, or any other suitable slit width.

Figure 41:
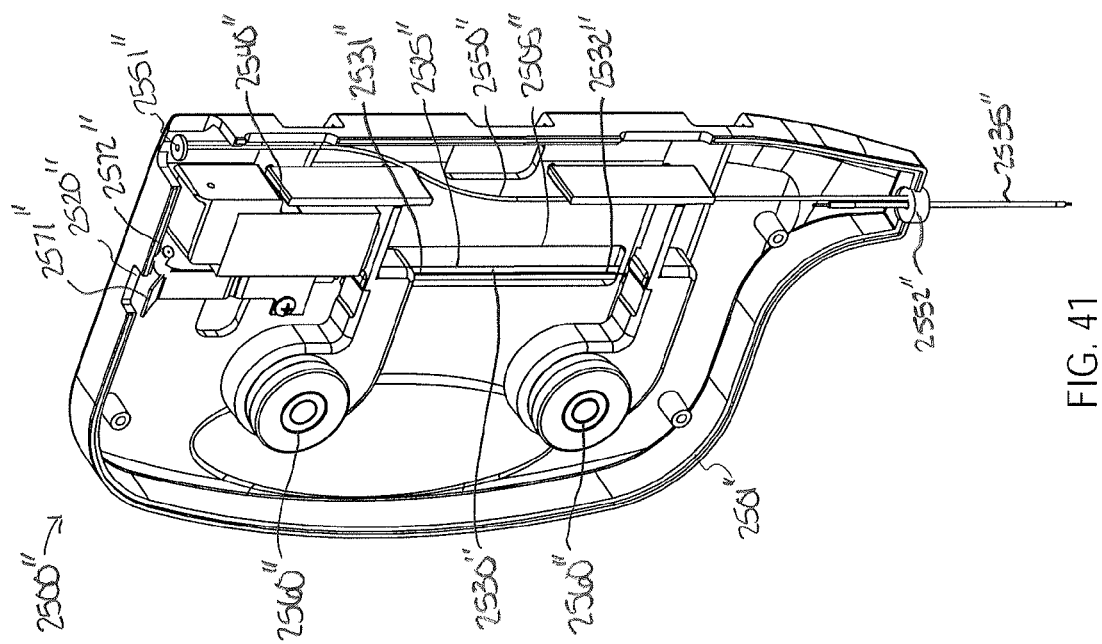
FIGS. 40 and 41 are a side view and a perspective view of the capillary cartridge of FIG. 38 illustrated without a portion of a cartridge body.
Figure 40:
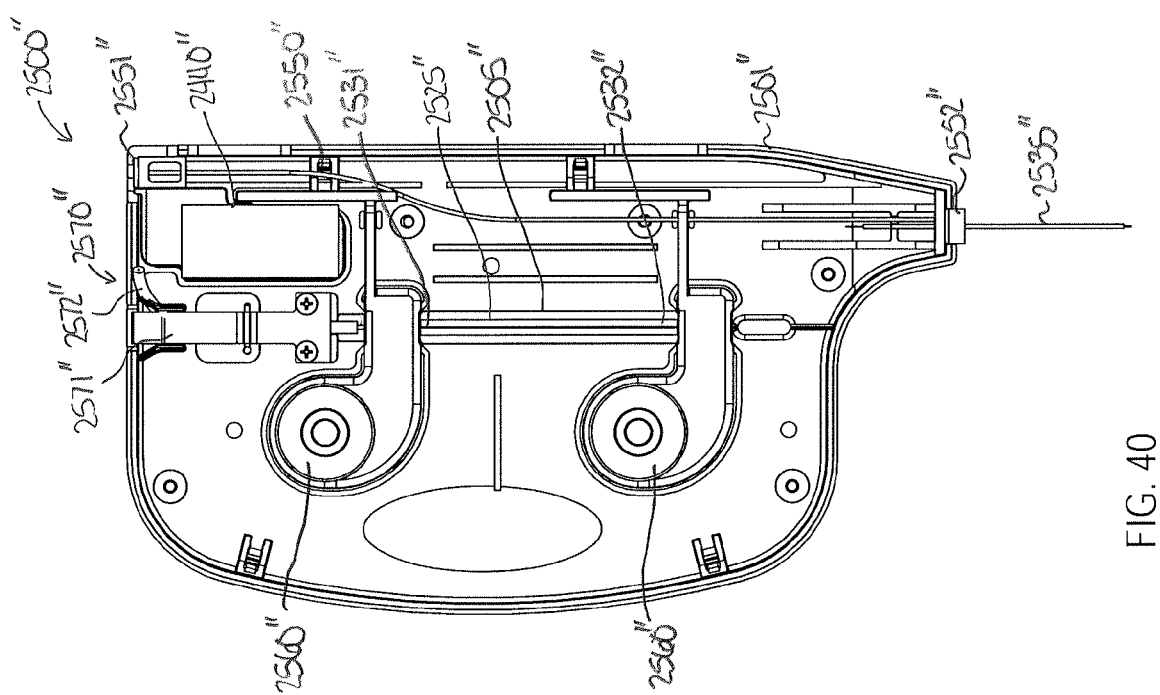

As shown in FIGS. 40 and 41, the isoelectric focusing cartridge 2500" includes the capillary 2530", a pressure line 2550", a pressure port 2551", a seal 2552", and a sleeve 2535", each of which can be structurally and/or functionally similar to the capillary 2530', the pressure line 2550', the pressure port 2551", the seal 2552', and the sleeve 2535' described above with reference to the molecular weight cartridge 2500'. Thus, a sample from one or more vials 2367 or wells 2366 of the reagent tray 2365 can be aspirated into the capillary 2530" in a manner similar to that described above with reference to the molecular weight cartridge 2500'. The isoelectric focusing cartridge 2500" can be configured to analyze the sample with substantially no bulk fluid flow. Thus, once a sample has been aspirated into capillary 2500", bulk fluidic flow can be arrested, as described in further detail herein.

As shown in FIGS. 40-44, the isoelectric focusing cartridge 2500" includes a pinch valve assembly 2570" including a vacuum line 2572" and a pinch plate 2571". A pinch valve opening 2520" defined by the cartridge body 2501" is configured to receive the pinch valve actuator 2444 described above with reference to the vacuum portion 2440 of the cartridge retainer 2400. The vacuum line 2572" is fluidically coupled to a top portion of the capillary 2530". Once the sample has been aspirated into the capillary 2530", the lever arm 2441 of the cartridge retainer 2400 can be rotated such that the pinch valve actuator 2444 applies a force to the vacuum line 2572". The force can result in a deformation of the vacuum line 2572" against the pinch plate 2571" reducing the cross section of the vacuum line 2572", thereby, closing the pinch valve assembly 2570". When the pinch valve assembly 2570" is closed, bulk fluid flow within the capillary 2530" can be arrested or impeded. In some instances, the pinch valve assembly 2570" can be closed while a vacuum is applied, such that a negative pressure is applied to the top portion of the capillary 2530". Such a negative pressure can counteract and/or overcome the force of gravity. Similarly stated, the pinch valve assembly 2570" and/or a negative pressure applied to the capillary 2530" can prevent or impede bulk fluid movement within a vertical column under the force of gravity.

Although not shown, the isoelectric focusing cartridge 2500" can include a dual septa vial fluidically coupled to the capillary 2530" similar to the dual septa vial 2540' of the molecular weight cartridge 2500'. The dual septa vial 2540" can contain a run buffer, such as a solution having a relatively high or low pH. The bottom septa can be configured to allow ionic flow between the run buffer and the capillary 2530" while preventing and/or limiting bulk fluidic flow. In this way, the dual septa vial can induce a pH gradient within the capillary 2530".

In addition to the dual septa vial, the isoelectric focusing cartridge 2500" includes a waste receptacle 2540". The waste receptacle 2540" can also be fluidically coupled to the capillary 2530". Similarly stated, the waste receptacle 2540" can be fluidically parallel to the dual septa vial. The waste receptacle 2540" can contain a sponge, filter, or other suitable material. Once the run has been completed, pinch valve assembly 2570" can be opened and the sample can be aspirated into the waste receptacle 2540" via the vacuum source 2496. For example, the bottom septa of the dual septa vial can direct the sample into the waste receptacle 2540", preventing the fluid sample from being drawn out of the cartridge 2500". In some embodiments, the waste receptacle 2540" can function similarly to the waste receptacle 2540' included in the molecular weight cartridge 2500'.

Figure 44:
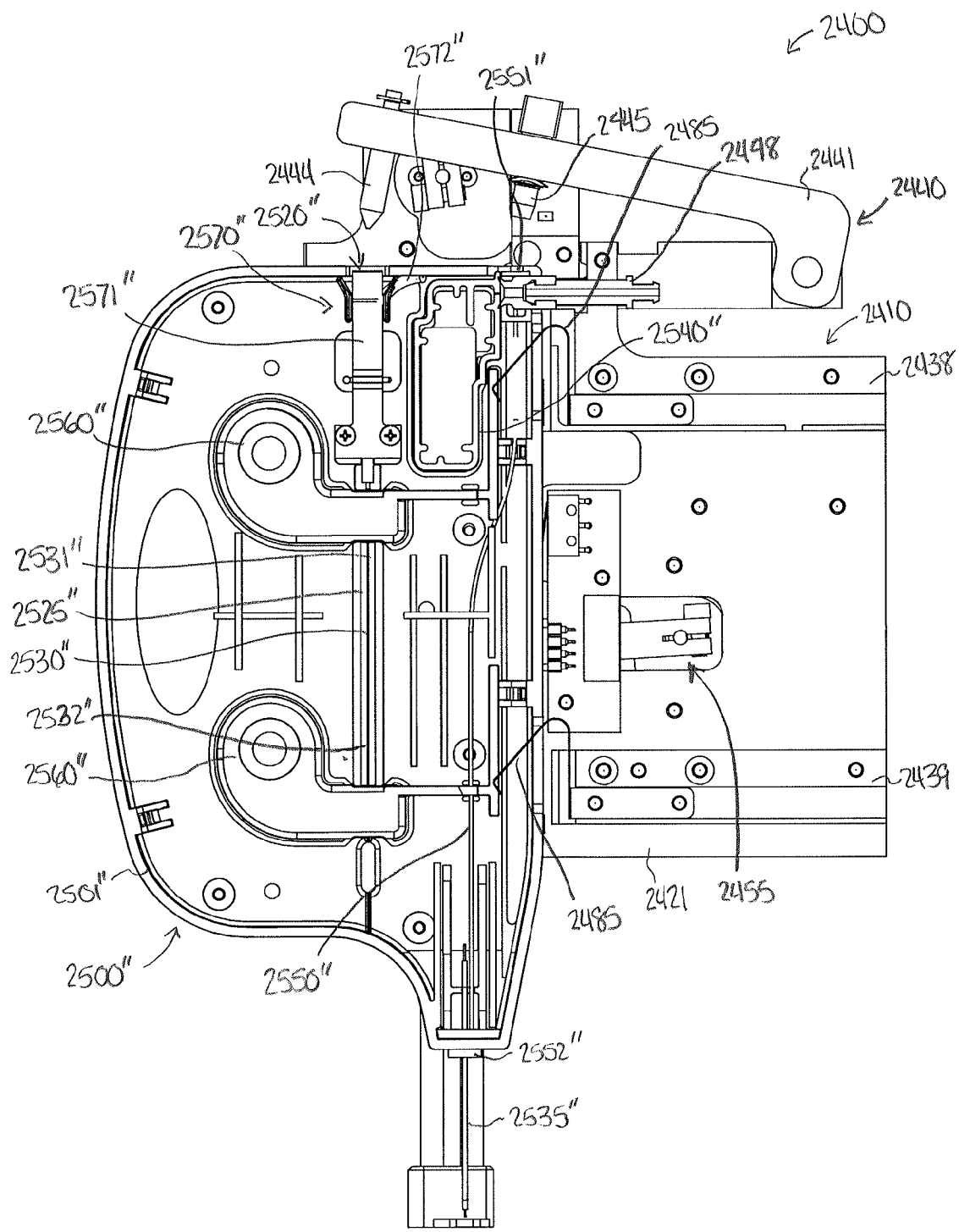
FIG. 44 is a cross-sectional view of the capillary cartridge and capillary cartridge retainer taken along the line 44-44 in FIG. 43.

The isoelectric focusing cartridge 2500" further includes the set of electrodes 2560". In this embodiment, the set of electrodes 2560" includes two electrodes. The electrodes 2560" can be configured to abut corresponding contact members 2485 when the isoelectric focusing cartridge 2500" is disposed within the cartridge retainer 2400 (FIG. 44). The contact members 2485 can, in turn be electrically coupled to a voltage (or current) source such as, for example, the power supply 2210 of the electronics assembly 2200. The two electrodes 2560" are also electrically coupled to the capillary 2530" and/or sample within the capillary 2530". For example, in some embodiments, the capillary 2530" can be electrically conductive with a first end portion 2531" electrically coupled to a first electrode 2560" and a second end portion 2532" electrically coupled to a second electrode 2560", as shown in FIG. 44. In some embodiments, one electrode 2560" can be coupled to the dual septa vial described above. In such embodiments, the dual septa vial can be electrically conductive such that run buffer within the dual septa vial can be electrically coupled to the electrode 2560". The system 2000 can be configured to energize the power supply 2210 such that an electric potential is induced along the capillary 2530" containing a sample. The electric potential can cause analytes within the sample to migrate along the pH gradient within the capillary 2530" to their isoelectric points, as described in detail above.

Figure 42:
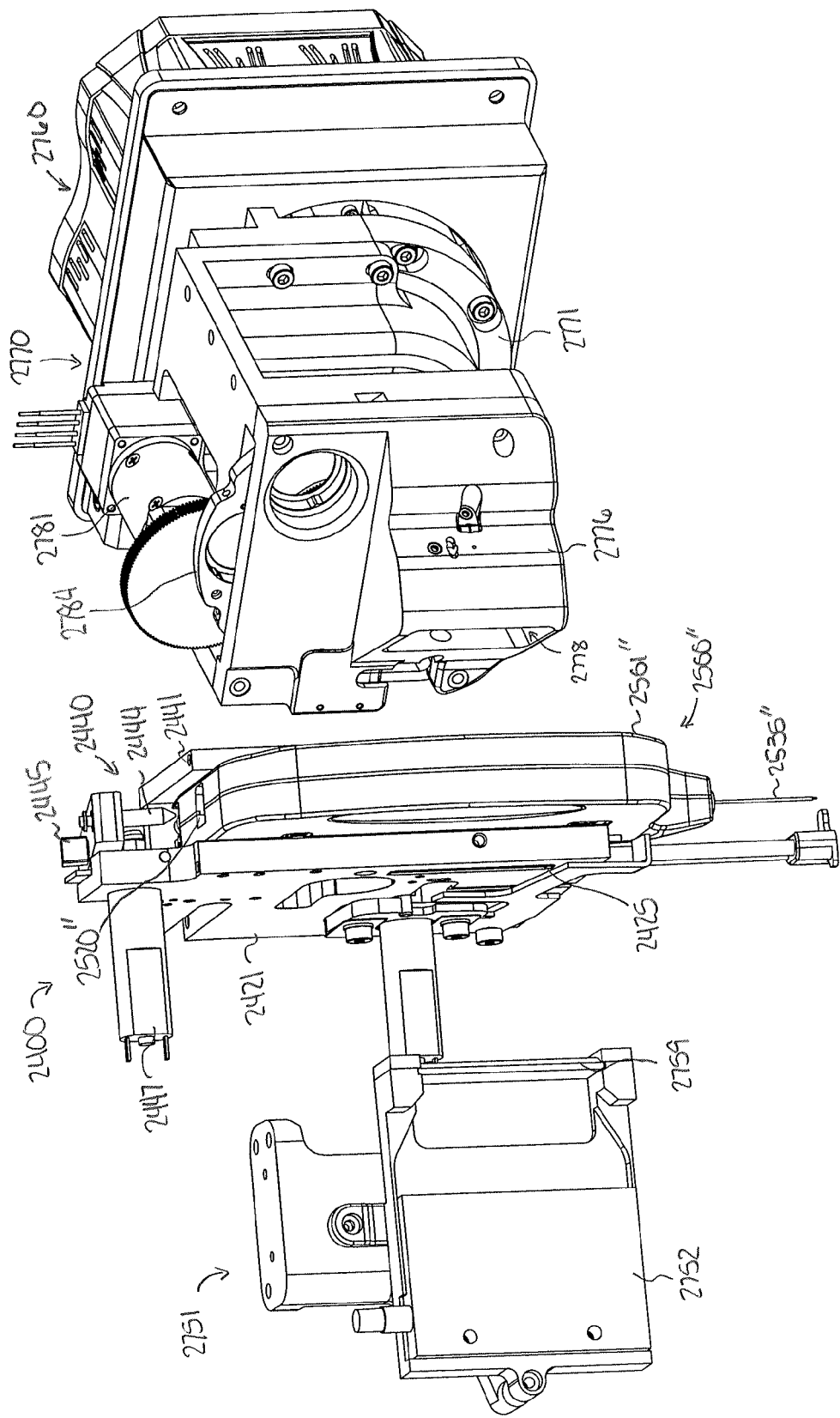
FIG. 42 is a perspective view of the capillary cartridge of FIG. 38, the full-column imaging portion of the optics assembly illustrated in FIG. 24, and the cartridge retainer of FIG. 14.
Figure 43:
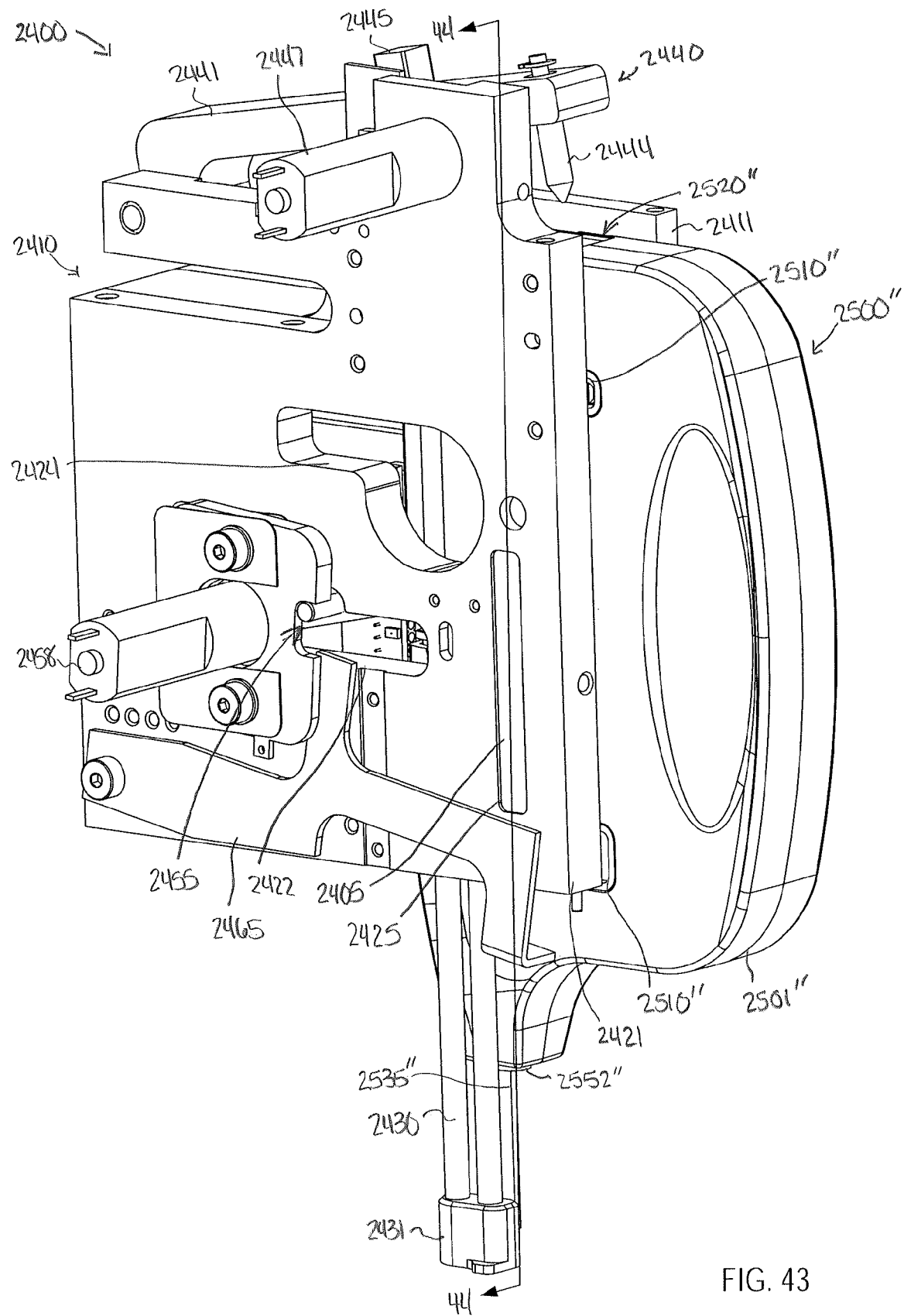
FIG. 43 is a left side perspective view of the capillary cartridge of FIG. 38 retained within the capillary cartridge retainer illustrated in FIG. 14.

As described above with reference to the molecular weight cartridge 2500', a user can position the isoelectric focusing cartridge 2500" within the cartridge retainer 2400 and can set the system 2000, for example, to an electrophoretic analysis setting and/or configuration. In some instances, prior to inserting the isoelectric focusing cartridge 2500", the user can prepare the reagent tray 2365 and/or the isoelectric focusing cartridge 2500". As described above, the user can then insert the isoelectric focusing cartridge 2500" into the cartridge retainer 2400 in a single, predetermined orientation. In this manner, the isoelectric focusing cartridge 2500" can be placed in a desired position within the cartridge retainer 2400 such that the apertures 2505" are aligned with the full-column detection portion 2750 of the optics assembly 2700, as shown in FIG. 42. More specifically, the isoelectric focusing cartridge 2500" is positioned within the system 2000 such that the apertures 2505" and thus, the capillary 2530", are aligned with the second optics openings 2415 and 2425 of the cartridge retainer 2400, the optical output 2752, and the opening 2778 of the mirror retention block 2776. Thus, by aligning the isoelectric focusing cartridge 2500" with the full-column detection 2750, energy and/or photons emitted by the optical output 2752 can be directed to a predetermined portion of the capillary 2530".

Once the isoelectric focusing cartridge 2500" is retained in the cartridge retainer 2400, the reagent tray 2365 can be moved relative to the isoelectric focusing cartridge 2500" to position at least a portion of the capillary 2530" in a well and/or sample vial of the reagent tray 2365, as described above. Moreover, the capillary 2530" is fluidically coupled to the vacuum source 2496 when the isoelectric focusing cartridge 2500" is positioned within the cartridge retainer 2400. Accordingly, the vacuum source 2496 can then be activated (e.g., at least semi-automatically) to produce a negative pressure differential within the capillary 2530" that is operable in drawing a volume of sample into the capillary 2530".

Once a mixture (e.g., a sample) having desired constituents is drawn into the capillary 2530", the system 2000 can actuate, for example, the vacuum portion 2440 of the cartridge retainer 2400 to insert at least a portion of the pinch valve actuator 2444 into the pinch valve opening 2520" of the cartridge body 2501" and into contact with the pinch valve assembly 2570" of the isoelectric focusing cartridge 2500". As such, the pinch valve actuator 2444 can place the pinch valve assembly 2570" in a closed configuration by deforming a portion of the vacuum line 2572" against the pinch plate 2571", as described above. Thus, with the pinch valve assembly 2570" in the closed configuration, bulk fluid flow through the capillary 2530" is limited, restricted, and/or substantially prevented. The system 2000 can then apply an electric field to the capillary 2530", for example, by delivering a flow of electric currently to the contact members 2485. Therefore, with the contact members 2485 in contact with the electrodes 2560", the electric current similarly energizes the electrodes 2560" to produce the voltage differential between the end portions 2531" and 2532" of the capillary 2530". Thus, in response to the electric current supplied to the capillary 2530", analytes in the sample migrate and/or are separated along a length of the capillary 2530" according to each analyte's isoelectric point and/or the like, as described in detail above.

In some instances, the full-column detection portion 2750 can detect "full-column" images or signals and/or otherwise can perform "full-column" detection of the sample within the capillary 2530". Similarly stated, the imaging device 2761 can be operable to capture more than a single-point along the capillary 2530". For example, the imaging device 2761 can be operable to capture and/or detect a sufficient length to visualize separation and/or focusing of analytes during the electrophoresis process (e.g., a length of about 1 cm, about 3 cm, about 5 cm, about 10 cm, about 20 cm, about 50 cm, or any other suitable length of the capillary 2530"). In addition or alternatively, the imaging device 2761 can be operable to capture and/or detect native fluorescence, and absorbance of analytes within the capillary 2530". For example, the filter wheel 2784 can be rotated to change the optical signal presented to the imaging device 2761 while analytes are being separated and/or focused within the capillary 2530". Thus, during a single run, a sample can be characterized for native fluorescence, absorbance, and/or any other suitable optical characteristic along the full-column while the analytes separate and/or are focused.

In some embodiments, reagents, reagent trays, capillary cartridges, and/or the like can be packaged separately or can be packaged collectively as, for example, kits for analyte detection using any of the systems or methods described herein. In some embodiments, a kit can include materials for making a molecular weight, isoelectric point, and/or any other suitable standard(s) such as those described herein. Additionally, one or more mobility moieties, one or more reactive moieties, one or more label moieties can be packaged independently or collectively. In some embodiments, a kit can include one or more electrophoresis standards including a peptide, one or more fluorescent dyes, and one or more photoreactive groups. In addition, buffers, polymeric or polymerizable materials, blocking solutions, and washing solutions can be packaged together with a reagent, reagent tray, capillary cartridge, etc. or can be packaged independently from the reagent, the reagent tray, the capillary cartridge, etc. Components can be provided separately from each other or mixed together in dry or liquid form.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. An apparatus, comprising:
a cartridge retainer configured to receive any of a plurality of a capillary cartridges, each capillary cartridge from the plurality of capillary cartridges including a capillary and configured to separate a sample;
at least one optical emitter; and
at least one detector, the at least one optical emitter and the at least one detector collectively configured to transition between a first configuration in which the at least one detector receives an optical signal from a point of a capillary and a second configuration in which the at least one detector receives a signal associated with at least a 1 cm length of the capillary based on which cartridge from the plurality of cartridges is disposed in the cartridge retainer.

2. The apparatus of claim 1, wherein:
the plurality of capillary cartridges includes a molecular weight cartridge and an isoelectric focusing cartridge;
the at least one optical emitter and the at least one detector are collectively configured to operate in the first configuration when the molecular weight cartridge is disposed in the cartridge retainer; and
the at least one optical emitter and the at least one detector are collectively configured to operate in the second configuration when the isoelectric focusing cartridge is disposed in the cartridge retainer.

3. The apparatus of claim 1, wherein the apparatus further comprises a reagent tray holder configured to move relative to the cartridge retainer to place a capillary of a capillary cartridge from the plurality of capillary cartridges in fluid communication with a reagent.

4. The apparatus of claim 1, further comprising:
a vacuum source fluidically coupled to the cartridge retainer, the cartridge retainer configured to place a portion of a capillary cartridge from the plurality of capillary cartridges in fluid communication with the vacuum source when that capillary cartridge is disposed within the cartridge retainer.

5. The apparatus of claim 1, wherein:
the at least one detector includes a first optical detector configured to detect a first optical output associated with a first sample being illuminated by a first beam of light emitted from the at least one optical emitter that substantially converges to a point; and
the at least one detector includes a second optical detector configured to detect a second optical output associated with a second sample being illuminated by a second beam of light emitted from the at least one optical emitter that forms a column of light.

6. An apparatus, comprising:
a cartridge retainer configured to receive any of a plurality of a capillary cartridges, each capillary cartridge from the plurality of capillary cartridges including a capillary and configured to separate a sample;
one or more optical emitters; and
one or more detectors, the one or more optical emitters and the one or more detectors collectively configured to automatically enter a molecular weight imaging mode when a molecular weight cartridge from the plurality of cartridges is disposed in the cartridge retainer and to automatically enter an isoelectric focusing imaging mode when an isoelectric focusing cartridge from the plurality of cartridges is disposed in the cartridge retainer.

7. The apparatus of claim 6, wherein:
at least one of the one or more detectors is configured to detect a first optical output associated with a first sample being illuminated by a first beam of light produced by at least one of the one or more emitters that substantially converges to a point when the one or more detectors and the one or more emitters are in the molecular weight imaging mode; and
at least one of the one or more detectors is configured to detect a second optical output associated with a second sample being illuminated by a second beam of light produced by at least one of the one or more optical emitters that forms a column of light when the one or more detectors and the one or more optical emitters are in the isoelectric focusing imaging mode.

8. The apparatus of claim 7, wherein:
the first beam of light is configured to illuminate a point of a first capillary of a molecular weight capillary cartridge from the plurality of capillary cartridges; and
the second beam of light is configured to illuminate at least 2 cm of a second capillary of an isoelectric focusing capillary cartridge from the plurality of capillary cartridges.

9. The apparatus of claim 7, wherein the first optical output is at least one of an absorbance of the first beam of light, a fluorescence of a label moiety induced by the first beam of light, or a native fluorescence of an analyte induced by the first beam of light.

10. An apparatus, comprising:
a cartridge configured to be oriented such that a longitudinal axis of the cartridge is vertical when in use;
a capillary disposed within the cartridge, the capillary disposed parallel to a longitudinal axis of the cartridge, the capillary defining an interior volume configured to contain a sample including an analyte; and
a vial constructed of a conductive material and containing a buffer disposed within the cartridge, the vial configured to be electrically coupled to a first end of the interior volume of the capillary via the buffer.

11. The apparatus of claim 10, further comprising:
a first electrode coupled to the vial; and
a second electrode electrically coupled to the capillary between the vial and a second end of the capillary such that the first electrode, the second electrode, and the sample define a portion of a circuit when the interior volume contains the sample.

12. The apparatus of claim 10, wherein the buffer is a first buffer, the apparatus further comprising:
a reagent tray holder constructed of a conductive material and configured to contain a second buffer;
a first electrode coupled to the vial; and
a second electrode electrically coupled to the reagent tray holder such that the first electrode, the second electrode, and the sample define a portion of a circuit when the interior volume contains the sample.

13. The apparatus of claim 10, wherein the vial includes a septum, a first end portion of the capillary disposed through the septum such that the buffer electrically coupled to the first end of the interior volume of the capillary via the buffer.

14. An apparatus, comprising:
a cartridge;
a capillary disposed within the cartridge, the capillary defining an interior volume configured to contain a sample including an analyte, the capillary configured for analyte separation;
a tube disposed within the cartridge body and coupled to an end of the capillary such that at least one of a pressure or a vacuum can be applied to the capillary via the tube; and
an opening defined by the cartridge, at least a portion of the tube exposed via the opening, the opening configured to receive a portion of a pinch valve configured to pinch the tube.

15. The apparatus of claim 14, further comprising a vial constructed of conductive material and containing a buffer disposed within the cartridge, the vial configured to be electrically coupled to a first end of the interior volume of the capillary via the buffer.

16. The apparatus of claim 14, further comprising a septum disposed between the vial and the interior volume of the capillary, the septum configured to prevent bulk fluid flow from the vial to the interior volume of the capillary, the septum configured to permit an exchange of ions between the buffer and the interior volume of the capillary.

17. An apparatus, comprising:
a cartridge;
a capillary disposed within the cartridge, the capillary defining an interior volume configured to contain a sample including an analyte, the capillary configured for analyte separation; and
a vial constructed of conductive material and containing a buffer disposed within the cartridge, the vial configured to be electrically coupled to a first end of the interior volume of the capillary via the buffer, the vial having a septum that is configured to be penetrated when the cartridge is disposed within a system configured to perform electrophoresis such that the capillary is fluidically coupled to the system via the electrically vial.

18. The apparatus of claim 17, further comprising a tube disposed within the cartridge and coupled to an end of the capillary, the tube configured to apply at least one of a pressure or a vacuum to the capillary.

19. The apparatus of claim 18, wherein at least a portion of the tube is exposed via an opening in the cartridge that is configured to receive a portion of a pinch valve actuator configured to pinch the tube.

20. The apparatus of claim 19, wherein the pinch valve actuator is configured to pinch the tube while the analyte migrates within the capillary such that bulk flow is inhibited.

21. The apparatus of claim 17, further comprising a septum disposed between the vial and the interior volume of the capillary, the septum configured to prevent bulk fluid flow from the vial to the interior volume of the capillary.

* * * * *